US012283212B2

(12) United States Patent
Zhu et al.

(10) Patent No.: US 12,283,212 B2
(45) Date of Patent: Apr. 22, 2025

(54) ELECTRONIC DEVICES AND CORRESPONDING METHODS FOR MATCHING CONTENT PRESENTATION COMPANION DEVICE ASPECT RATIOS

(71) Applicant: Motorola Mobility LLC, Chicago, IL (US)

(72) Inventors: Xiaofeng Zhu, Nanjing (CN); Sanjay Dhar, Algonquin, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 18/225,506

(22) Filed: Jul. 24, 2023

(65) Prior Publication Data

US 2025/0006091 A1 Jan. 2, 2025

Related U.S. Application Data

(63) Continuation of application No. PCT/CN2023/103699, filed on Jun. 29, 2023.

(51) Int. Cl.
*G09G 3/00* (2006.01)

(52) U.S. Cl.
CPC ..... *G09G 3/035* (2020.08); *G09G 2340/0442* (2013.01); *G09G 2370/042* (2013.01); *G09G 2380/02* (2013.01)

(58) Field of Classification Search
CPC ........... G09G 3/035; G09G 2340/0442; G09G 2370/042; G09G 2380/02
See application file for complete search history.

(56) References Cited

U.S. PATENT DOCUMENTS

| | | | | |
|---|---|---|---|---|
| 9,307,204 | B1 | 4/2016 | Garg | |
| 11,526,198 | B1 * | 12/2022 | Kanas | G06F 1/1624 |

(Continued)

FOREIGN PATENT DOCUMENTS

| | | |
|---|---|---|
| CN | 108064371 | 5/2018 |
| CN | 105247853 | 8/2018 |

(Continued)

OTHER PUBLICATIONS

"Auto Low Latency Mode (ALLM)", HDMI; Unknown publication date but believed to be prior to filing of present application; Viewed online at https://www.hdmi.org/spec21sub/autolowlatencymode#:~:text=Auto%20Low%20Latency%20Mode%20enables,and%20uninterrupted%20viewing%20and%20interactivity.

(Continued)

*Primary Examiner* — Ricardo Osorio
(74) *Attorney, Agent, or Firm* — Philip H. Burrus, IV

(57) ABSTRACT

A method in an electronic device includes establishing, with a communication device, an electrical communication channel with a content presentation companion device. A communication device then queries the content presentation companion device for an identification of an aspect ratio of the content presentation companion device. A translation mechanism then causes a blade assembly carrying a flexible display to slide around a device housing sufficiently to reveal a front-facing area amount of the flexible display having dimensions corresponding to the aspect ratio. The method can also cause the front-facing area amount of the electronic device to match aspect ratios of other electronic device electronically in communication with the content presentation companion device.

20 Claims, 21 Drawing Sheets

(56) References Cited

U.S. PATENT DOCUMENTS

| | | | | |
|---|---|---|---|---|
| 2010/0259463 | A1* | 10/2010 | Sip | H04M 1/0247 345/1.3 |
| 2018/0018929 | A1 | 1/2018 | Xun | |
| 2018/0262812 | A1 | 9/2018 | Chai | |
| 2020/0004297 | A1 | 1/2020 | Rekapalli | |
| 2020/0105228 | A1 | 4/2020 | Chen | |
| 2021/0373603 | A1* | 12/2021 | Feng | G06F 1/1624 |
| 2022/0060660 | A1* | 2/2022 | Chou | H04N 7/147 |
| 2022/0355212 | A1 | 11/2022 | Louden | |
| 2022/0368784 | A1 | 11/2022 | Koh | |
| 2022/0417568 | A1 | 12/2022 | Tanaka | |
| 2023/0040976 | A1 | 2/2023 | Lee | |
| 2023/0044285 | A1* | 2/2023 | Jin | G06F 1/1652 |
| 2023/0090109 | A1 | 3/2023 | Kosonen | |
| 2023/0305785 | A1 | 9/2023 | Park | |
| 2024/0121482 | A1 | 4/2024 | Li | |
| 2024/0205498 | A1 | 6/2024 | Lu | |

FOREIGN PATENT DOCUMENTS

| | | | | | |
|---|---|---|---|---|---|
| CN | 113741853 | A | * | 12/2021 | G06F 1/1624 |
| CN | 113778297 | A | * | 12/2021 | |
| CN | 114500704 | A | * | 5/2022 | G06F 1/1624 |
| CN | 114968002 | A | * | 8/2022 | |
| CN | 115809033 | A | * | 3/2023 | |
| JP | 3727966 | B2 | * | 12/2005 | G03B 19/07 |
| JP | 2023509032 | A | * | 3/2023 | |
| KR | 20200075809 | | | 6/2020 | |
| WO | WO-2021098704 | A1 | * | 5/2021 | G06F 1/1643 |
| WO | 2022108110 | | | 5/2022 | |

OTHER PUBLICATIONS

"Samsung Help Page—Anynet+", Viewed online https://www.samsung.com/au/support/tv-audio-video/what-is-anynet-plus/; Last Update Sep. 15, 2023.

Katzmaier, David , "LG Display's crazy 65-inch OLED TV can roll up like a poster", Published Jan. 9, 2018; Available online at https://www.cnet.com/tech/home-entertainment/lg-display-crazy-65-inch-oled-tv-can-roll-up-like-a-poster-ces-2018/.

Keller, Joseph , "Should I use Game Mode on my LG 27UD88?", Gaming Mode LG Monitors; Published Dec. 21, 2018; https://www.imore.com/should-i-use-game-mode-my-lg-27ud88.

Kumar Agrawal, et al., "Electronic Devices and Corresponding Methods for Identifying a Content Presentation Companion Device Gaming Mode of Operation", Application as Filed; U.S. Appl. No. 18/195,227, filed May 9, 2023.

Kumar Agrawal, et al., "Electronic Devices with Translating Flexible Displays and Corresponding Methods for Automatic Translation when Operating as a Controller for Another Electronic Device", Application as Filed; U.S. Appl. No. 18/123,303, filed Mar. 19, 2023.

Matthes, Jonah , "What is HDMI EDID? Everything You Need to Know!", Published Feb. 24, 2022; available online at https://thehometheaterdiy.com/hdmi-edid/.

Venkata, et al., "Electronic Devices with Translating Flexible Display and Corresponding Methods", Application as Filed; U.S. Appl. No. 18/116,091, filed Mar. 1, 2023.

"PCT Search Report", International Application No. PCT/CN2023/103699; Filed Jun. 29, 2023; Mailed Nov. 16, 2023.

Davies, Daniel, "GB Search Report", GB Application No. GB2315569.0; Mailed Apr. 12, 2024.

Lin, Chun-Nan , "NonFinal Office Action", U.S. Appl. No. 18/123,303, filed Mar. 19, 2023; Mailed Dec. 28, 2023.

Le, Rong , "NonFinal Office Action", U.S. Appl. No. 18/195,227, filed May 9, 2023; Mailed Oct. 23, 2024.

Lin, Chun-Nan , "Notice of Allowance", U.S. Appl. No. 18/123,303, filed Mar. 19, 2023; Mailed Jun. 17, 2024.

Le, Rong , "NonFinal Office Action", U.S. Appl. No. 18/195,229, filed May 9, 2023; Mailed Oct. 23, 2024.

Le, Rong , "Final Office Action", U.S. Appl. No. 18/195,227, filed May 9, 2023; mailed Mar. 11, 2025.

Le, Rong , "Final Office Action", U.S. Appl. No. 18/195,229, filed May 9, 2023; Mailed Mar. 11, 2025.

* cited by examiner

| ADDRESS | DATA | GENERAL DESCRIPTION |
|---|---|---|
| 0-7 | Header | Constant Fixed Pattern |
| 8-9<br>10-11<br>12-14<br>16-17 | Manufacturer ID<br>Product ID Code<br>Serial Number<br>Manufacture Date | Display Product Identification |
| 18<br>19 | EDID Version No.<br>EDID Revision No. | EDID Version Information |
| 20<br>21<br>22<br>23<br>24 | Video Input Type<br>Horizontal Size (cm)<br>Vertical Size (cm)<br>Display Gamma<br>Supported Features | Basic display parameters. Video input type, display size, power management, sync, color space, timing capabilities and preferences. |
| 25-34 | Color Characteristicis | Color space Definition |
| 35-36<br>37<br>38-53<br>54-71<br>72-89<br>90-107<br>108-125 | Established Supported Timings<br>Manufacturer's Reserved Timing<br>EDOD Standard Timings Supported<br>Detailed Timing Descriptior Block 1<br>Detailed Timing Descriptor Block 2<br>Detailed Timing Descriptor Block 3<br>Detailed Timing Descriptor Block 4 | Timing information for all resolutions supported by the display. |
| 126 | Extension Fiag | Number of optional extension blocks |
| 127 | Checksum | |

3002

3001

3000

*FIG. 30*

*-- PRIOR ART --*

| ADDRESS | GENERAL DESCRIPTION |
|---|---|
| 0 | Always "N," where N is the new extension |
| 1 | Revision number |
| 2 | Pointer to timing descriptors |
| 3 | Number of timing descriptors |
| 4 to d-1 | Data block description indicating aspect ratios of other electronic devices that are electronically in communication with the companion electronic device |
| d to d+17 | First 18-byte detailed timing descriptor |
| | • • • |
| d+18(n-1) to d+18n-1 | Final 18-byte detailed timing descriptor |
| d+18n to 126 | "0" Padding |
| 127 | Checksum |

3101

3100

FIG. 31

ELECTRONIC DEVICES AND CORRESPONDING METHODS FOR MATCHING CONTENT PRESENTATION COMPANION DEVICE ASPECT RATIOS

CROSS REFERENCE TO PRIOR APPLICATIONS

This application is a continuation claiming priority and benefit under 35 U.S.C. § 120, pursuant to 35 U.S.C. § 365(a), to PCT Application Ser. No. PCT/CN2023/103699, filed Jun. 29, 2023, which is incorporated by reference for all purposes. See MPEP § 1895.

BACKGROUND

Technical Field

This disclosure relates generally to electronic devices, and more particularly to electronic devices having one or more displays.

Background Art

The advanced processing power available in modern electronic communication devices, examples of which include smartphones, tablet computers, and laptop computers, enable voice and video communications between people. Additionally, such devices can also engage in videoconferences, stream content such as movies, videos, and television shows, play music, and offer other forms of entertainment. In addition to being tools for communicating with friends, family, and work colleagues, these devices are also real-time multimedia content entertainment devices.

Some electronic devices are equipped with a content redirection feature that allows this multimedia content to stream through a first device, such as a smartphone, and then to be redirected to a second device having a larger display. While this makes events such as movies, television shows, and videoconferences easier to see, it also allows a content presentation companion device having a larger display serve as the primary display for the electronic device itself. While a neat feature, ensuring that a companion device is optimally configured for a given usage situation can be difficult. It would be advantageous to have electronic devices and systems that make this process simpler.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 30 illustrates one explanatory prior art extended display identification data (EDID) file structure.

FIG. 31 illustrates one explanatory EDID extension in accordance with one or more embodiments of the disclosure.

Figure 1:
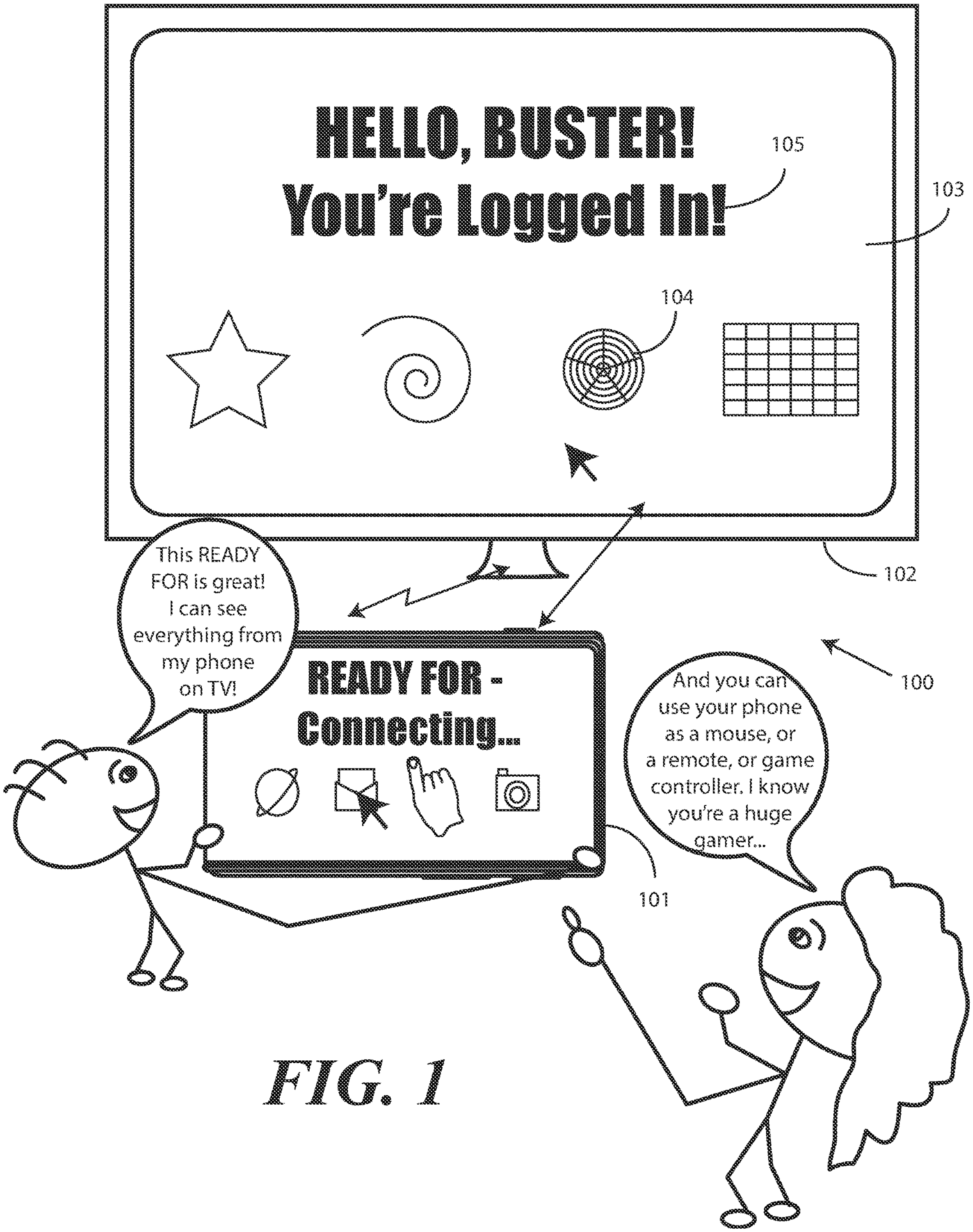
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to causing, in response to determining an aspect ratio of a content presentation companion device, causing a blade assembly supporting a flexible display that is slidable around a device housing between an extended position where the blade assembly extends beyond the edge of the device housing and a retracted position where a major surface to the blade assembly abuts a major surface of the device housing without extending beyond the edge of the device housing to transition to a position where a front-facing portion of the flexible display has dimensions corresponding to the aspect ratio of the content presentation companion device. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of querying, with a communication device, a content presentation companion device across a communication channel for an identification of an aspect ratio of the content presentation companion device and, in response, causing a translation mechanism to translate a blade assembly carrying a flexible display to slide around a device housing to sufficiently reveal a front-facing area amount of the flexible display having dimensions corresponding to the aspect ratio. The non-processor circuits may include, but are not limited to, a radio receiver, a radio transmitter, signal drivers, clock circuits, power source circuits, and user input devices.

As such, these functions may be interpreted as steps of a method to perform establishment of an electrical communication channel within a content presentation companion device and, in response, causing the blade assembly to transition to a position where a front-facing portion of the flexible display has dimensions corresponding either to the content presentation companion device or another electronic device in communication with the content presentation companion device. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, some modern portable electronic devices are equipped with a content redirection feature. Using smartphones manufactured by Motorola Mobility.sup.™ as one illustrative example, some models are equipped with their Ready For.sup.™, which is a feature that allows the Ready For.sup.™-equipped device to connect to a content presentation companion device such as a larger monitor, television, or other device having a larger screen. Using the Ready For.sup.™ feature, users can wirelessly stream video content to the larger display of a content presentation companion device with no loss in performance. Illustrating by example, resolution of the images on the content presentation companion device is up to 4K with a frame rate that presents content without flicker or distortion.

While the Ready For.sup.™ feature does not require a cable or a docking station, many electronic devices do require a physical connection between the electronic device and the content presentation companion device for a content redirection feature to work properly. To wit, many standards such as the highly popular and ubiquitous high-definition multimedia interface (HDMI) interface standard require a physical wire be connected between a source device and a display device for content redirection to work. Additionally, even some users of advanced content redirection technologies such as Ready For.sup.™ even prefer to use a docking station and/or physical cable to couple their electronic device to a content presentation companion device because a physical cable defining a display data channel invariably offers a more reliable and faster data connection than do most wireless connections. Indeed, coupling a smartphone having Ready For.sup.™ capability to a monitor having a defined display size is a quite popular way to view content on a larger display.

Regardless of whether a wireless electrical communication channel or a wired electrical communication channel is being used, embodiments of the disclosure contemplate that it can be advantageous to have the content presentation companion device and electronic device match in dimensions. Illustrating by example, when a user is using a content presentation companion device as a monitor for a desktop computer application, while also using a smartphone as a control device to move a cursor along the display of the content presentation companion device, it can be advantageous when the aspect ratio of the electronic device and the aspect ratio of the content presentation companion device match. This is true because it can prevent the user's finger from going "off screen" thereby pegging the cursor on the content presentation companion device to the side of the display.

Sadly, with prior art devices the content presentation companion device and the electronic device itself each have displays that are fixed in size. If the dimensions of the electronic device correspond to a 4:3 aspect ratio and the content presentation companion device has a display with dimensions that correspond to a 16:9 aspect ratio, there is really nothing that can be done to make the aspect ratios of the two devices to match.

Advantageously, embodiments of the disclosure provide a solution to this problem. In one or more embodiments, an electronic device includes a device housing and a blade assembly supporting a flexible display. In one or more embodiments, the blade assembly is slidable around the device housing between an extended position where the blade assembly extends beyond an edge of the device housing and a retracted position where a major surface of the blade assembly abuts a major surface of the device housing without extending beyond the edge of the device housing.

In one or more embodiments, a communication device detects establishment of an electrical communication channel with a content presentation companion device. One or more processors are operable with the communication device. In one or more embodiments, the one or more processors, in response to determining an aspect ratio of the content presentation companion device, cause the blade assembly to transition to a position where a front-facing portion of the flexible display has dimensions corresponding to the aspect ratio of the content presentation companion device.

Accordingly, if the aspect ratio of the content presentation companion device is 4:3, the translation mechanism can transition the blade assembly to a position between the extended position and the retracted position where the front-facing portion of the flexible display has dimensions corresponding to the 4:3 aspect ratio. Similarly, if the aspect ratio of the content presentation companion device is 16:9, 20:9, or some other aspect ratio, the translation mechanism can transition the blade assembly to a position where the dimensions of the front-facing portion of the flexible display are such that the aspect ratio of the front-facing portion of the flexible display match the aspect ratio of the content presentation companion device.

In one or more embodiments, a method in an electronic device comprises establishing, with a communication device, an electrical communication channel with a content presentation companion device. In one or more embodiments, the method comprises querying, with the communication device, the content presentation companion device for an identification of an aspect ratio of the content presentation companion device. In one or more embodiments, the method comprises causing, by a translation mechanism, a blade assembly carrying a flexible display to slide around a device housing sufficiently to reveal a front-facing area amount of the flexible display having dimensions corresponding to the aspect ratio of the content presentation companion device.

In one or more embodiments, the one or more processors of the electronic device determine the aspect ratio of the content presentation companion device by extracting this information from EDID received by the content presentation companion device in response to the query. Alternatively, the one or more processors determine the aspect ratio of the content presentation companion device by parsing a product identification code from EDID received by the communication device from the content presentation companion device in response to the query. The one or more processors can parse the product identification code by transmitting an aspect ratio query comprising the product identification code to a remote electronic device. The remote electronic device can then send response comprising the aspect ratio of the content presentation companion device.

In one or more embodiments, the one or more processors can prompt the user of an electronic device before automatically transitioning the blade assembly to a position where the dimensions of a front-facing portion of the flexible display match the aspect ratio of the content presentation companion device. Illustrating by example, the one or more processors can cause the user interface to present a prompt saying something like, "The monitor you're using has a 16:9 aspect ratio. You might find easier control of the monitor if the flexible display had a 16:9 aspect ratio as well. Would you like this to happen?" Alternatively, so as not to disrupt a current application operating on the one or more processors, one example of which is a gaming application, the one or more processors of the electronic device could cause an audio user interface to deliver such a prompt in the form of an audible announcement with the same message.

In addition to notifying the user that there is a disparity between the aspect ratio of the content presentation companion device electronically communicating with the electronic device and the electronic device itself and/or automatically adjusting the flexible display so that the aspect ratio of the content presentation companion device and the electronic device match, in still other embodiments the one or more processors can instruct the user to manually adjust the aspect ratio by causing the translation mechanism to slide the blade assembly around the device housing, as some users may prefer manual control to automatic operation of the electronic device. Illustrating by example, where the one or more processors present the prompt on the display of the electronic device (or the content presentation companion device for that matter), the prompt may instruct the user to use the user interface to cause the blade assembly to translate toward the extended position or toward the retracted position, as necessary, such that the aspect ratio of the flexible display and the aspect ratio of the content presentation companion device match.

In most embodiments, this transition of the blade assembly such that the aspect ratio of the front-facing portion of the flexible display and the aspect ratio of the content presentation companion device match can occur automatically. Illustrating by example, the prompt may ask the user, "do you want to change the position of the display so that its aspect ratio matches that of the external monitor?" In one or more embodiments, when the display presenting the prompt receives user input interacting with the prompt, the one or more processors, in response to the user input, cause the translation mechanism to slide around the device housing sufficiently to reveal a front-facing area amount of the flexible display having dimensions corresponding to the aspect ratio of the content presentation companion device.

In other embodiments, to provide the user with a more seamless experience, the electronic device simply does this upon determining that there is a mismatch between the aspect ratio of the content presentation companion device and that of the content presentation companion device for a particular position of the blade assembly. In one or more embodiments the one or more processors cause the blade assembly to transition to a position where a front-facing portion of the flexible display has dimensions corresponding to the aspect ratio of the content presentation companion device.

Advantageously, embodiments of the disclosure allow for either the automatic transition of a blade assembly carrying a flexible display to a position where the front-facing area amount has dimensions corresponding to the aspect ratio of a content presentation companion device or the ability to alert a person to the fact that their content presentation companion device supports a different aspect ratio than does the electronic device for the current position of the blade assembly, thereby allowing the user to change the position of the blade assembly manually so that the aspect ratio of the front-facing portion of the flexible display matches the aspect ratio of the content presentation companion device for a better user experience.

Other advantages will be described below. Others will be obvious to those of ordinary skill in the art having the benefit of this disclosure.

Turning now to FIG. 1, illustrated therein is one explanatory system 100 configured in accordance with one or more embodiments of the disclosure illustrating an electronic device 101 operating in conjunction with a content presentation companion device 102 in accordance with one or more embodiments of the disclosure. In FIG. 1, the electronic device 101 and the content presentation companion device 102 operate in tandem as a system, with the electronic device 101 providing the processing power to generate and/or receive content that could be presented on the display of the electronic device 101, but that is instead redirected for presentation on the content presentation companion device 102 while the content presentation companion device 102 serves as the primary display device for the electronic device 101.

As shown in FIG. 1, the electronic device 101 is electronically in communication with the content presentation companion device 102. When the electronic device 101 is electronically in communication with the content presentation companion device 102, this allows the electronic device 101 to use the larger display 103 of the content presentation companion device 102 to present content. Illustrating by example, in one or more embodiments the electronic device 101 can operate in a "content redirection" mode by presenting content such as movies, videos, images, and even a traditional computer user interface, that are generated or received by the electronic device 101 and are redirected to the display 103 of the content presentation companion device 102.

Embodiments of the disclosure contemplate that with the advanced computing power available in smartphones and other electronic devices, users often consume movies, videos, television shows, and other content using these devices. Additionally, they can perform work operations such as sending email, managing files, working on documents and spreadsheets, and so forth. By establishing an electronic communication channel between the electronic device 101 and the content presentation companion device 102, the processing power of the electronic device 101 can be leveraged to deliver this content to the content presentation companion device 102 for presentation of that content on the display 103 of the content presentation companion device 102. This allows a user to watch television, play video games, work on homework or office work, video call friends and family, or perform other tasks using the one or more processors of the electronic device 101 combined with the large display 103 of the content presentation companion device 102.

Using a content redirection feature, a small electronic device 101 such as the smartphone shown in FIG. 1 can connect to connect to a content presentation companion device 102 such as a larger monitor, television, or other device having a larger screen. Using the content redirection feature, users can wirelessly stream video content from the electronic device 101 to the larger display 103 of the content presentation companion device 102 with no loss in performance. Resolution of the images 104 on the content presentation companion device 102 can be as high as 4K with frame rates that present the content 105 without flicker or distortion. In the illustrative embodiment of FIG. 1, neither a cable nor a docking station is required to use the content redirection feature.

When using the content redirection feature, the electronic device 101 can function as a mouse, trackpad, or other control device while the content 105 is being presented on the content presentation companion device 102. The content redirection feature can be used for presenting pictures, videos, television shows, or movies on the larger display 103 of a content presentation companion device 102 while a controller user interface used to control the content is presented locally on the display of the electronic device 101. Additionally, the controller user interface presented on the electronic device 101 can be used to control gaming applications, video conferences, and other content presentation tasks.

Embodiments of the disclosure advantageously provide a more intelligent system that dynamically enhances the feature set offered by the electronic device 101 by causing the electronic device 101 to deliver content to the content presentation companion device 102 while at the same time serving as a controller for the content presentation companion device 102. When a controller user interface is presented on the display of the electronic device 101, a user can deliver user input to the controller user interface to control the content being presented on the content presentation companion device 102. For instance, in one or more embodiments a user interface feature being presented on the content presentation companion device 102 can be adjusted using a controller user interface that is presented on a display of the electronic device 101.

Before turning to the user interface enhancements and how they are provided a deeper look into the hardware of the electronic device 101 and the content presentation companion device 102 will be provided. Beginning with the content presentation companion device 102, and turning now to FIG. 2, illustrated therein is one explanatory content presentation companion device 102 configured in accordance with one or more embodiments of the disclosure.

Figure 2:
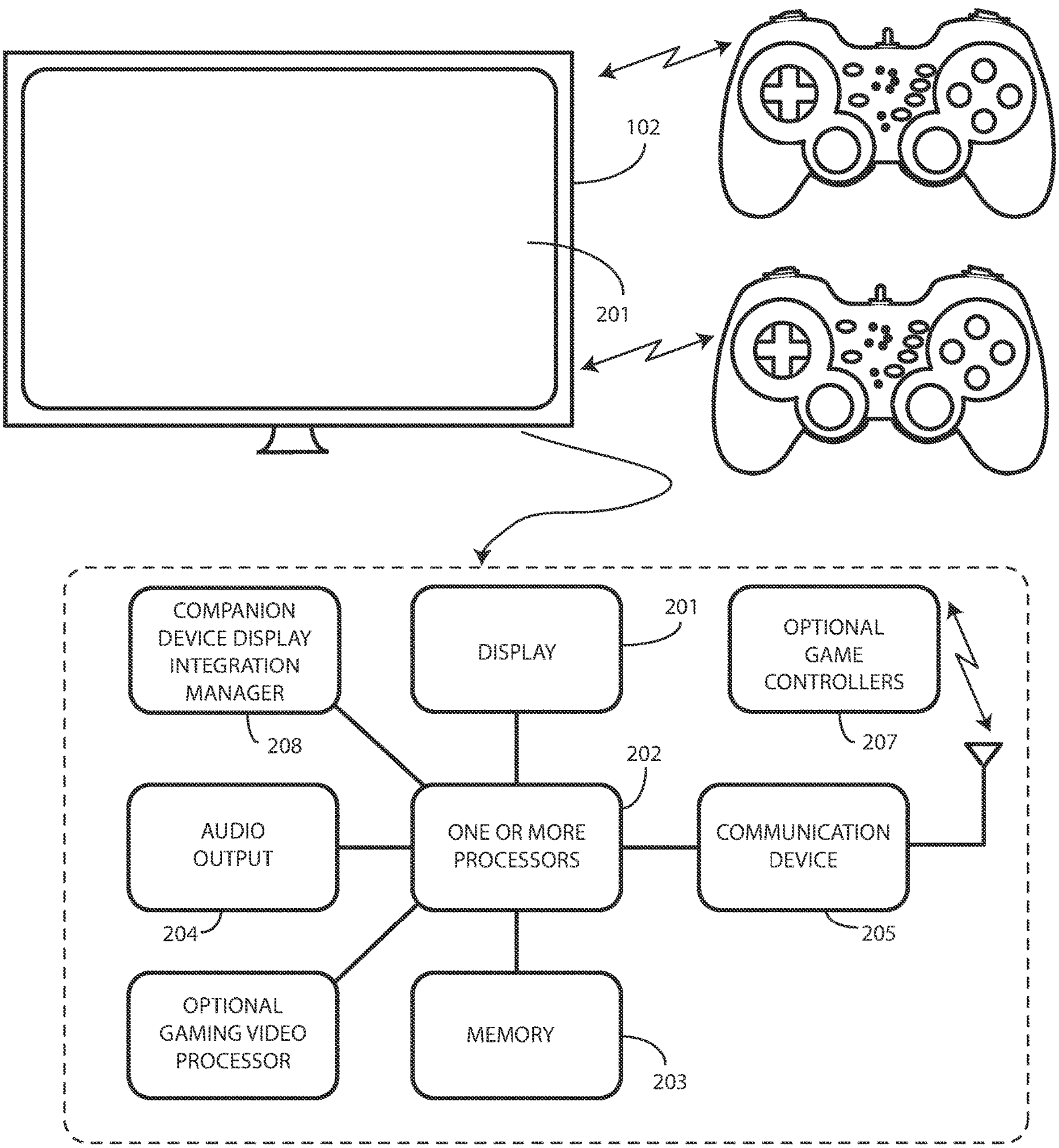
FIG. 2 illustrates one explanatory content presentation companion device in accordance with one or more embodiments of the disclosure.

Illustrated in FIG. 2 is one explanatory content presentation companion device 102 in accordance with one or more embodiments of the disclosure. In this illustrative embodiment, the content presentation companion device 102 comprises a color video monitor. In other embodiments, the content presentation companion device 102 can take other forms. Illustrating by example, the content presentation companion device 102 can be a television, a computer display, a laptop display, a tablet computer, gaming console that includes one or more game controllers 207, or a projector projecting content onto a screen. Other examples of content presentation companion devices will be obvious to those of ordinary skill in the art having the benefit of this disclosure. Regardless of configuration, in one or more embodiments the content presentation companion device 102 includes one or more processors 202, a display 201, a memory 203, an audio output 204, and a communication device 205 capable of wired or wireless communication with an electronic device such as the electronic device (101) of FIG. 1.

In one or more embodiments, when communicating across an electrical communication channel with such an electronic device (101), the content presentation companion device 102 can function as a primary display for the electronic device (101). The electronic device (101) can receive content from a terrestrial broadcast network, cable television network, Internet streaming service, or combinations thereof, and redirect this content to the content presentation companion device 102 using the content presentation companion device integration manager 208 since its display 201 is larger than the display of the electronic device (101). Effectively, the electronic device (101) is the source of content that could be presented on the display of the electronic device (101) but that is instead redirected to the content presentation companion device 102. This allows people within the environment of the electronic device (101) or content presentation companion device 102 to more easily see the content. In one or more embodiments, content flows from the electronic device (101) to the content presentation companion device 102 through the communication device 205.

Figure 3:
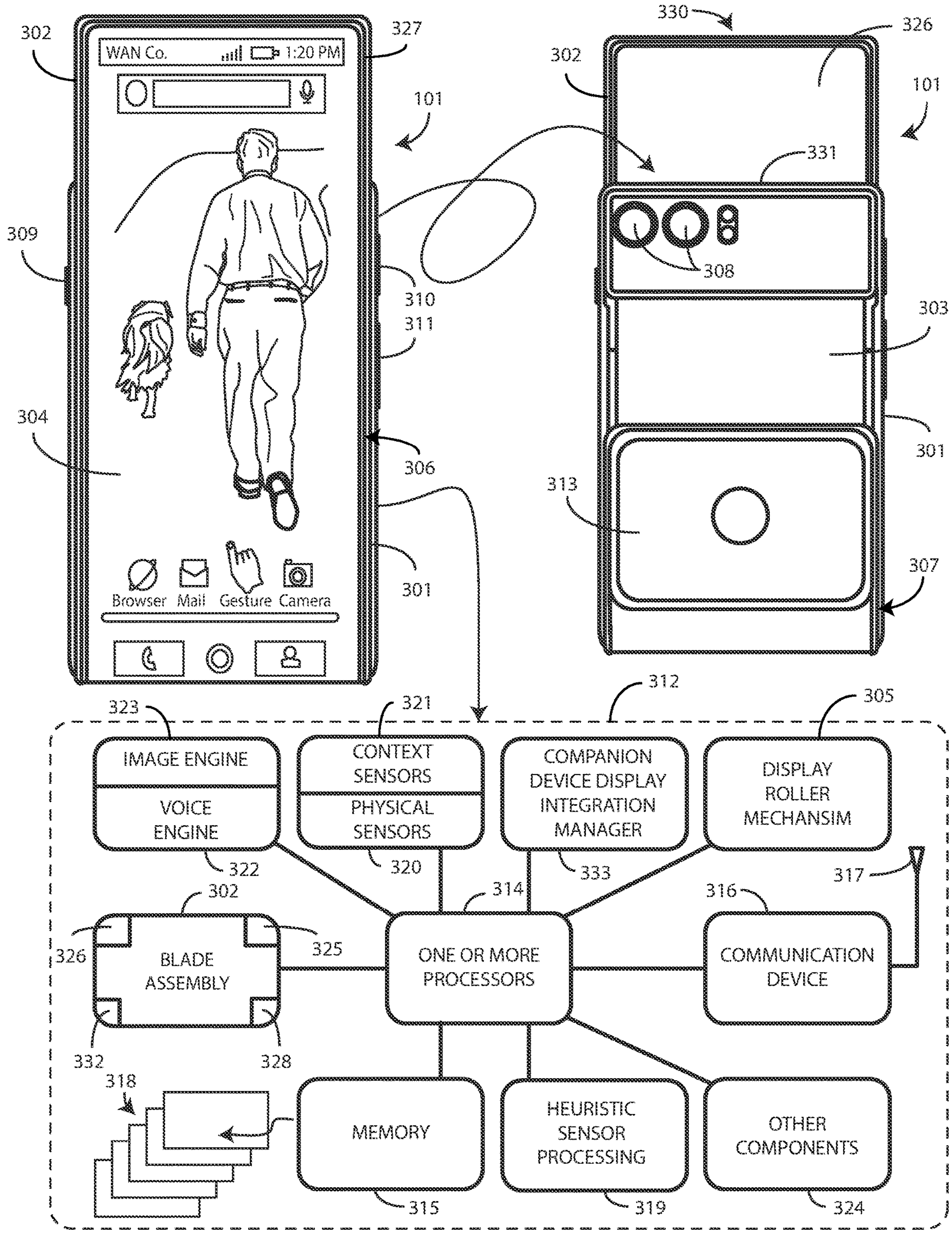
FIG. 3 illustrates one explanatory electronic device in accordance with one or more embodiments of the disclosure.

Turning now to FIG. 3, illustrated therein is one explanatory electronic device 101 configured in accordance with one or more embodiments of the disclosure. The electronic device 101 of FIG. 1 is a portable electronic device. For illustrative purposes, the electronic device 101 is shown as a smartphone. However, the electronic device 101 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 101 includes a single device housing 301. In one or more embodiments, a blade assembly 302 carrying a flexible display 304 wraps around the single device housing 301. As will be described in more detail below, in one or more embodiments the blade assembly 302 is configured to "slide" along the first major surface (covered by the flexible display in the front view of the electronic device 101 on the left side of FIG. 3) of the single device housing 301 and second major surface 303 situated on the rear side of the single device housing 301.

In one or more embodiments the single device housing 301 is manufactured from a rigid material such as a rigid thermoplastic, metal, or composite material, although other materials can be used. Illustrating by example, in one illustrative embodiment the single device housing 301 is manufactured from aluminum. Still other constructs will be obvious to those of ordinary skill in the art having the benefit of this disclosure.

In the illustrative embodiment of FIG. 3, the blade assembly 302 carries the flexible display 304. The flexible display 304 can optionally be touch-sensitive. Users can deliver user input to the flexible display 304 of such an embodiment by delivering touch input from a finger, stylus, or other objects disposed proximately with the flexible display 304.

In one embodiment, the flexible display 304 is configured as an organic light emitting diode (OLED) display fabricated on a flexible plastic substrate. The blade assembly 302 is fabricated on a flexible substrate as well. This allows the blade assembly 302 and flexible display 304 to deform around a display roller mechanism 305 when a first portion 306 of the blade assembly 302 abutting a first major surface of the single device housing 301 and a second portion 307 of the blade assembly 302 abutting a second major surface 303 of the single device housing 301 move symmetrically in opposite directions around the single device housing 301. In one or more embodiments, the blade assembly 302 and flexible display 304 are both constructed on flexible metal substrates can allow each to bend with various bending radii around the display roller mechanism 305.

In one or more embodiments the flexible display 304 may be formed from multiple layers of flexible material such as flexible sheets of polymer or other materials. In this illustrative embodiment, the flexible display 304 is fixedly coupled to the blade assembly 302, which wraps around the display roller mechanism 305.

Features can be incorporated into the single device housing 301. Examples of such features include one or more cameras or image capture devices or an optional speaker port. In this illustrative embodiment, user interface components 309,310,311, which may be buttons, fingerprint sensors, or touch sensitive surfaces, can also be disposed along the surfaces of the single device housing 301. Any of these features are shown being disposed on the side surfaces of the electronic device 101 could be located elsewhere. In other embodiments, these features may be omitted.

A block diagram schematic 312 of the electronic device 101 is also shown in FIG. 3. The block diagram schematic 312 includes one or more electronic components that can be coupled to a printed circuit board assembly disposed within the single device housing 301. Alternatively, the electronic components may be carried by the blade assembly 302. Illustrating by example, in one or more embodiments electronic components can be positioned beneath a "backpack" 313 carried by the blade assembly 302.

The components of the block diagram schematic 312 can be electrically coupled together by conductors or a bus disposed along one or more printed circuit boards. For example, some components of the block diagram schematic 312 can be configured as a first electronic circuit fixedly situated within the single device housing 301, while other components of the block diagram schematic 312 can be configured as a second electronic circuit carried by the blade assembly 302 in the backpack 313. A flexible substrate can then extend from the first electronic circuit in the single device housing 301 to the second electronic circuit carried by the blade assembly 302 in the backpack 313 to electrically couple the first electronic circuit to the second electronic circuit.

The illustrative block diagram schematic 312 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 3, and other components that are shown may not be needed and can therefore be omitted.

In one or more embodiments, the electronic device 101 includes one or more processors 314. In one embodiment, the one or more processors 314 can include an application processor and, optionally, one or more auxiliary processors. One or both of the application processor or the auxiliary processor(s) can include one or more processors. One or both of the application processor or the auxiliary processor (s) can be a microprocessor, a group of processing components, one or more ASICs, programmable logic, or other type of processing device.

The application processor and the auxiliary processor(s) can be operable with the various components of the electronic device 101. Each of the application processor and the auxiliary processor(s) can be configured to process and execute executable software code to perform the various functions of the electronic device 101. A storage device, such as memory 315, can optionally store the executable software code used by the one or more processors 314 during operation.

In one embodiment, the one or more processors 314 are responsible for running the operating system environment of the electronic device 101. The operating system environment can include a kernel and one or more drivers, and an application service layer, and an application layer. The operating system environment can be configured as executable code operating on one or more processors or control circuits of the electronic device 101. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In this illustrative embodiment, the electronic device 101 also includes a communication device 316 that can be configured for wired or wireless communication with one or more other devices or networks. The networks can include a wide area network, a local area network, and/or personal area network. The communication device 316 may also utilize wireless technology for communication, such as, but are not limited to, peer-to-peer or ad hoc communications such as HomeRF, Bluetooth and IEEE 802.11, and other forms of wireless communication such as infrared technology. The communication device 316 can include wireless communication circuitry, one of a receiver, a transmitter, or transceiver, and one or more antennas 317.

In one embodiment, the one or more processors 314 can be responsible for performing the primary functions of the electronic device 101. For example, in one embodiment the one or more processors 314 comprise one or more circuits operable with one or more user interface devices, which can include the flexible display 304, to present, images, video, or other presentation information to a user. The executable software code used by the one or more processors 314 can be configured as one or more modules 318 that are operable with the one or more processors 314. Such modules 318 can store instructions, control algorithms, logic steps, and so forth.

In one embodiment, the one or more processors 314 may generate commands or execute control operations based on information received from the various sensors of the electronic device 101. As shown in FIG. 1, these sensors can be categorized into physical sensors 320 and context sensors 321.

Generally speaking, physical sensors 320 include sensors configured to sense or determine physical parameters indicative of conditions in an environment about the electronic device 101. Illustrating by example, the physical sensors 320 can include devices for determining information such as motion, acceleration, orientation, proximity to people and other objects, lighting, capturing images, and so forth. The physical sensors 320 can include various combinations of microphones, location detectors, temperature sensors, barometers, proximity sensor components, proximity detector components, wellness sensors, touch sensors, cameras, audio capture devices, and so forth. Many examples of physical sensors 320 will be described below with reference to FIG. 8. Others will be obvious to those of ordinary skill in the art having the benefit of this disclosure.

By contrast, the context sensors 321 do not measure physical conditions or parameters. Instead, they infer context from data of the electronic device. Illustrating by example, when a physical sensor 320 includes a camera or intelligent imager, the context sensors 321 can use data captured in images to infer contextual cues. An emotional detector may be operable to analyze data from a captured image to determine an emotional state. The emotional detector may identify facial gestures such as a smile or raised eyebrow to infer a person's silently communicated emotional state, e.g., joy, anger, frustration, and so forth. Other context sensors 321 may analyze other data to infer context, including calendar events, user profiles, device operating states, energy storage within a battery, application data, data from third parties such as web services and social media servers, alarms, time of day, behaviors a user repeats, and other factors.

The context sensors 321 can be configured as either hardware components, or alternatively as combinations of hardware components and software components. The context sensors 321 can be configured to collect and analyze non-physical parametric data.

Figure 8:
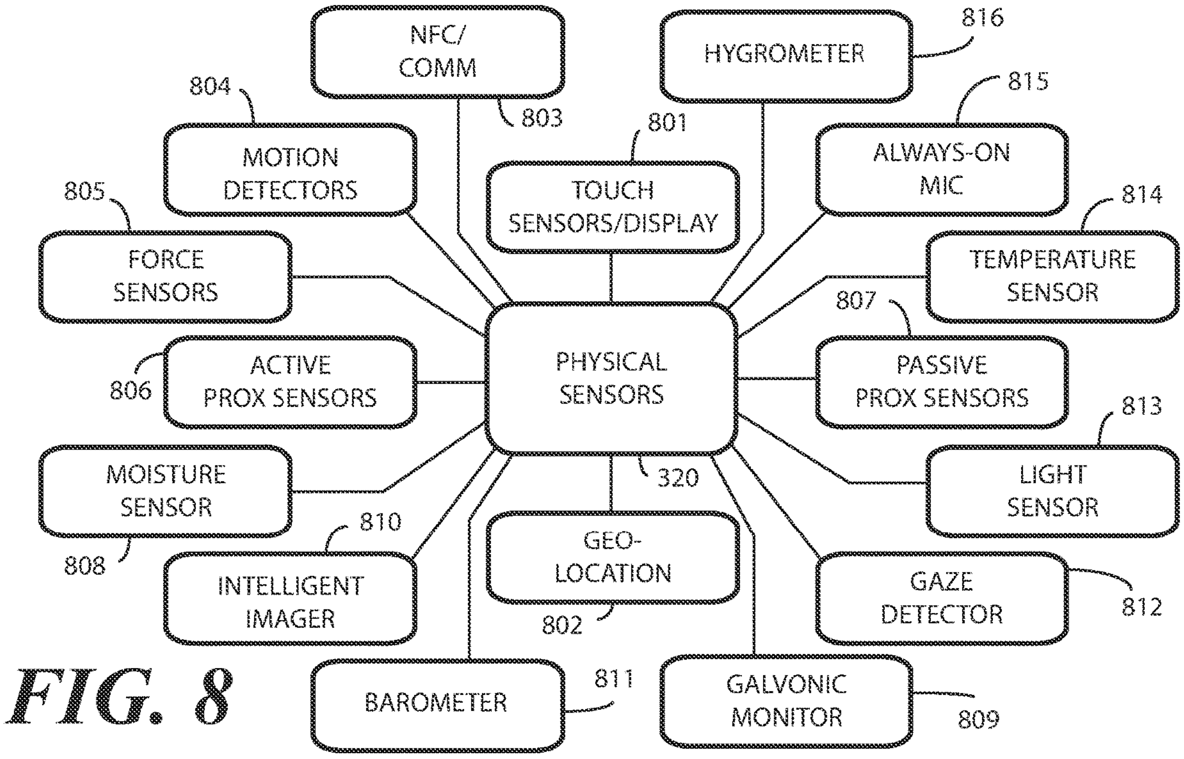
FIG. 8 illustrates one or more explanatory physical sensors suitable for use, alone or in combination, in an electronic device in accordance with one or more embodiments of the disclosure.
Figure 9:
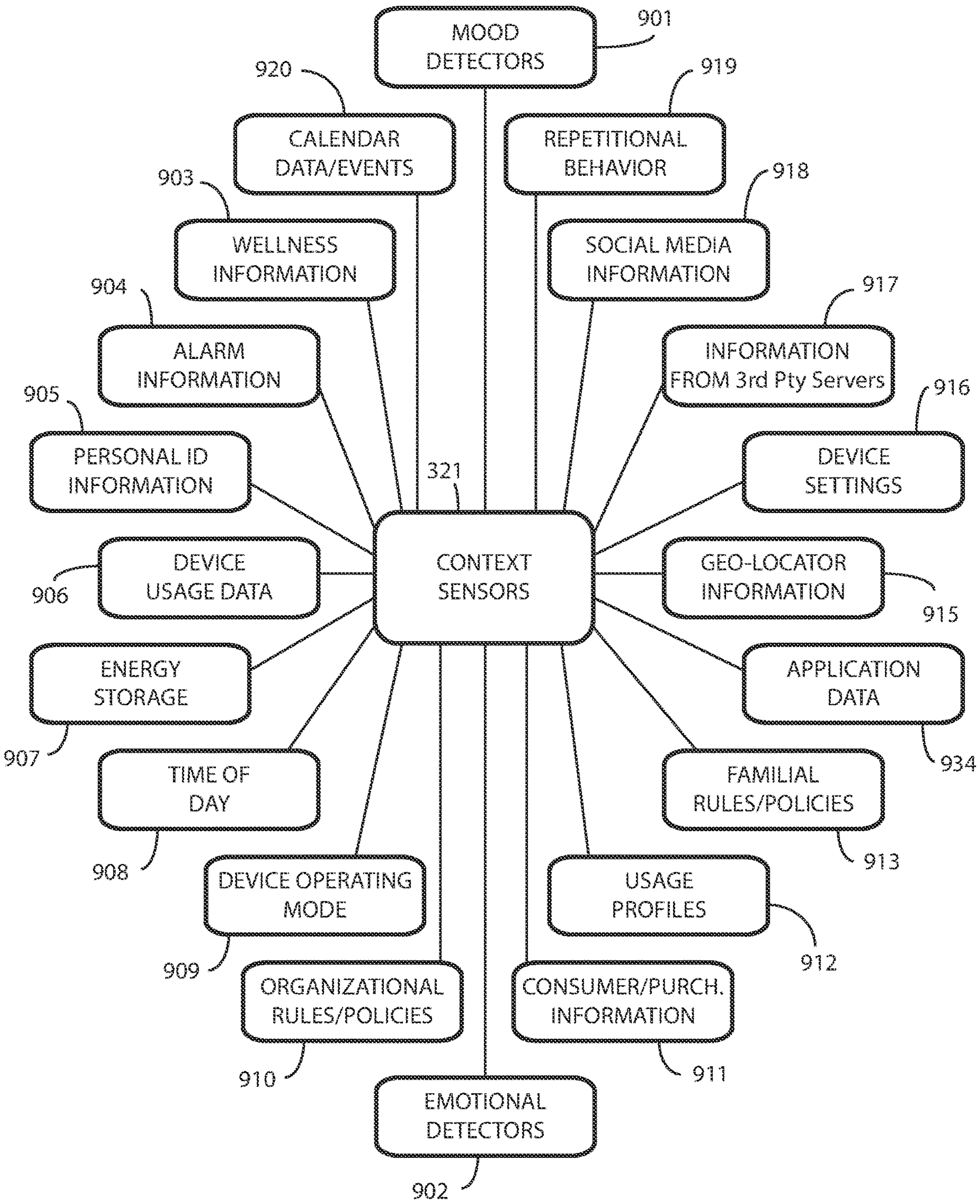
FIG. 9 illustrates one or more explanatory context sensors suitable for use, alone or in combination, in an electronic device in accordance with one or more embodiments of the disclosure.

Examples of the physical sensors 320 and the context sensors 321 are shown in FIGS. 8 and 9. These examples are illustrative only, as other physical sensors 320 and context sensors 321 will be obvious to those of ordinary skill in the art having the benefit of this disclosure.

Turning briefly to FIG. 8, illustrated therein are various examples of the physical sensors 320. In one or more embodiments, the physical sensors 320 sense or determine physical parameters indicative of conditions in an environment about an electronic device. FIG. 8 illustrates several examples physical sensors 320. It should be noted that those shown in FIG. 8 are not comprehensive, as others will be obvious to those of ordinary skill in the art having the benefit of this disclosure. Additionally, it should be noted that the various physical sensors 320 shown in FIG. 8 could be used alone or in combination. Accordingly, many electronic devices will employ only subsets of the physical sensors 320 shown in FIG. 8, with the particular subset chosen being defined by device application.

A first example of a physical sensor 320 is a touch sensor 801. The touch sensor 801 can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors (314), to detect an object in close proximity with—or touching—the surface of the display or the housing of an electronic device by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a physical sensor 320 is a geo-locator that serves as a location detector 802. In one embodiment, location detector 802 is operable to determine location data when an image is captured from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, and other similar satellite positioning systems. The location detector 802 can make location determinations autonomously or with assistance from terrestrial base stations, for example those associated with a cellular communication network or other ground-based network, or as part of a Differential Global Positioning System (DGPS), as is well known by those having ordinary skill in the art. The location detector 802 may also be able to determine location by locating or triangulating terrestrial base stations of a traditional cellular network, or from other local area networks, such as Wi-Fi networks.

Another physical sensor 320 is a near field communication circuit 803. The near field communication circuit 803 can be included for communication with local area networks to receive information regarding the context of the environment in which an electronic device is located. Illustrating by example, the near field communication circuit 803 may obtain information such as weather information and location information. If, for example, a user is at a museum, they may be standing near an exhibit that can be identified with near field communication. This identification can indicate that the electronic device is both indoors and at a museum. Accordingly, if the user requests additional information about an artist or a painting, there is a higher probability that the question is a device command asking the one or more processors (314) to search for than information with a web browser. Alternatively, the near field communication circuit 803 can be used to receive contextual information from kiosks and other electronic devices. The near field communication circuit 803 can also be used to obtain image or other data from social media networks. Examples of suitable near field communication circuits include Bluetooth communication circuits, IEEE 801.11 communication circuits, infrared communication circuits, magnetic field modulation circuits, and Wi-Fi circuits.

Another example of a physical sensor 320 is the motion detector 804. Illustrating by example, an accelerometer, gyroscopes, or other device can be used as a motion detector 804 in an electronic device. Using an accelerometer as an example, an accelerometer can be included to detect motion of the electronic device. Additionally, the accelerometer can be used to sense some of the gestures of the user, such as one talking with their hands, running, or walking.

The motion detector 804 can also be used to determine the spatial orientation of an electronic device as well in three-dimensional space by detecting a gravitational direction. In addition to, or instead of, an accelerometer, an electronic compass can be included to detect the spatial orientation of the electronic device relative to the earth's magnetic field. Similarly, one or more gyroscopes can be included to detect rotational motion of the electronic device.

Another example of a physical sensor 320 is a force sensor 805. The force sensor can take various forms. For example, in one embodiment, the force sensor comprises resistive switches or a force switch array configured to detect contact with either the display or the housing of an electronic device. The array of resistive switches can function as a force-sensing layer, in that when contact is made with either the surface of the display or the housing of the electronic device, changes in impedance of any of the switches may be detected. The array of switches may be any of resistance sensing switches, membrane switches, force-sensing switches such as piezoelectric switches, or other equivalent types of technology. In another embodiment, the force sensor can be capacitive. In yet another embodiment, piezoelectric sensors can be configured to sense force as well. For example, where coupled with the lens of the display, the piezoelectric sensors can be configured to detect an amount of displacement of the lens to determine force. The piezoelectric sensors can also be configured to determine force of contact against the housing of the electronic device rather than the display.

Another example of physical sensors 320 includes proximity sensors. The proximity sensors fall in to one of two camps: active proximity sensors and "passive" proximity sensors. These are shown as proximity detector components 806 and proximity sensor components 807 in FIG. 8. Either the proximity detector components 806 or the proximity sensor components 807 can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components 807 comprise a signal receiver to receive signals from objects external to the housing of an electronic device. In one embodiment, the signal receiver is an infrared signal receiver to receive an infrared emission from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components 807 have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

Proximity sensor components 807 are sometimes referred to as a "passive IR system" due to the fact that the person is the active transmitter. Accordingly, the proximity sensor component 807 requires no transmitter since objects disposed external to the housing deliver emissions that are received by the infrared receiver. As no transmitter is required, each proximity sensor component 807 can operate at a very low power level.

In one embodiment, the signal receiver of each proximity sensor component 807 can operate at various sensitivity levels so as to cause the at least one proximity sensor component 807 to be operable to receive the infrared emissions from different distances. For example, the one or more processors (314) can cause each proximity sensor component 807 to operate at a first "effective" sensitivity so as to receive infrared emissions from a first distance. Similarly, the one or more processors (314) can cause each proximity sensor component 807 to operate at a second sensitivity, which is less than the first sensitivity, so as to receive infrared emissions from a second distance, which is less than the first distance. The sensitivity change can be made by causing the one or more processors (314) to interpret readings from the proximity sensor component 807 differently.

By contrast, proximity detector components 806 include a signal emitter and a corresponding signal receiver. While each proximity detector component 806 can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components 806 comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component 806 can be an infrared proximity sensor set that uses a signal emitter that transmits a beam of infrared light that reflects from a nearby object and is received by a corresponding signal receiver. Proximity detector components 806 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

Another example of a physical sensor is a moisture detector 808. A moisture detector 808 can be configured to detect the amount of moisture on or about the display or the housing of the electronic device. This can indicate various forms of context. Sometimes, it can indicate rain or drizzle in the environment about the electronic device. Accordingly, if a user is frantically asking "Call a cab!" the fact that moisture is present may increase the likelihood that this ask is a device command. The moisture detector 808 can be realized in the form of an impedance sensor that measures impedance between electrodes. As moisture can be due to external conditions, e.g., rain, or user conditions, perspiration, the moisture detector 808 can function in tandem with ISFETS configured to measure pH or amounts of NaOH in the moisture or a galvanic sensor 809 to determine not only the amount of moisture, but whether the moisture is due to external factors, perspiration, or combinations thereof.

An intelligent imager 810, configured as an imager or image capture device, can be configured to capture an image of an object and determine whether the object matches predetermined criteria. For example, the intelligent imager 810 operate as an identification module configured with optical recognition such as include image recognition, character recognition, visual recognition, facial recognition, color recognition, shape recognition and the like. Advantageously, the intelligent imager 810 can be used as a facial recognition device to determine the identity of one or more persons detected about an electronic device.

For example, in one embodiment when the one or more proximity sensor components 807 detect a person, the intelligent imager 810 can capture a photograph of that person. The intelligent imager 810 can then compare the image to a reference file stored in memory (315), to confirm beyond a threshold authenticity probability that the person's face sufficiently matches the reference file. Beneficially, optical recognition allows the one or more processors (314) to execute control operations only when one of the persons detected about the electronic device are sufficiently identified as the owner of the electronic device.

In addition to capturing photographs, the intelligent imager 810 can function in other ways as well. For example, in some embodiments the intelligent imager 810 can capture multiple successive pictures to capture more information that can be used to determine social cues. Alternatively, the intelligent imager 810 can capture or video frames, with or without accompanying metadata such as motion vectors. This additional information captured by the intelligent imager 810 can be used to detect richer social cues that may be inferred from the captured data.

A barometer 811 can sense changes in air pressure due to environmental and/or weather changes. In one embodiment, the barometer 811 includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

A gaze detector 812 can comprise sensors for detecting the user's gaze point. The gaze detector 812 can optionally include sensors for detecting the alignment of a user's head in three-dimensional space. Electronic signals can then be delivered from the sensors to the gaze detection processing for computing the direction of user's gaze in three-dimensional space. The gaze detector 812 can further be configured to detect a gaze cone corresponding to the detected gaze direction, which is a field of view within which the user may easily see without diverting their eyes or head from the detected gaze direction. The gaze detector 812 can be configured to alternately estimate gaze direction by inputting to the gaze detection processing images representing a photograph of a selected area near or around the eyes. It will be clear to those of ordinary skill in the art having the benefit of this disclosure that these techniques are explanatory only, as other modes of detecting gaze direction can be substituted in the gaze detector 812 of FIG. 8.

A light sensor 813 can detect changes in optical intensity, color, light, or shadow in the environment of an electronic device. This can be used to make inferences about context such as weather or other cues. For example, if the light sensor 813 detects low-light conditions in the middle of the day when the location detector 802 indicates that the electronic device is outside, this can be due to cloudy conditions, fog, or haze. An infrared sensor can be used in conjunction with, or in place of, the light sensor 813. The infrared sensor can be configured to detect thermal emissions from an environment about an electronic device. Where, for example, the infrared sensor detects heat on a warm day, but the light sensor detects low-light conditions, this can indicate that the electronic device is in a room where the air conditioning is not properly set. Similarly, a temperature sensor 814 can be configured to monitor temperature about an electronic device.

The physical sensors 320 can also include an audio capture device 815. In one embodiment, the audio capture device 815 includes one or more microphones to receive acoustic input. While the one or more microphones can be used to sense voice input, voice commands, and other audio input, in some embodiments they can be used as environmental sensors to sense environmental sounds such as rain, wind, and so forth.

In one embodiment, the one or more microphones include a single microphone. However, in other embodiments, the one or more microphones can include two or more microphones. Where multiple microphones are included, they can be used for selective beam steering to, for instance, determine from which direction a sound emanated. Illustrating by example, a first microphone can be located on a first side of the electronic device for receiving audio input from a first direction, while a second microphone can be placed on a second side of the electronic device for receiving audio input from a second direction. The one or more processors (314) can then select between the first microphone and the second microphone to beam steer audio reception toward the user. Alternatively, the one or more processors (314) can process and combine the signals from two or more microphones to perform beam steering.

In one embodiment, the audio capture device 815 comprises an "always ON" audio capture device. As such, the audio capture device 815 is able to capture audio input at any time that an electronic device is operational. As noted above, in one or more embodiments, the one or more processors, which can include a digital signal processor, can identify whether one or more device commands are present in the audio input captured by the audio capture device 815.

One further example of the physical sensors 320 is a hygrometer 816. The hygrometer 816 can be used to detect humidity, which can indicate that a user is outdoors or is perspiring. As noted above, the illustrative physical sensors of FIG. 8 are not comprehensive. Numerous others could be added. For example, a wind-speed monitor could be included to detect wind. Accordingly, the physical sensors 320 of FIG. 8 are illustrative only, as numerous others will be obvious to those of ordinary skill in the art having the benefit of this disclosure.

Turning briefly now to FIG. 9, illustrated therein are various examples of context sensors 321. As with FIG. 8, the examples shown in FIG. 9 do not constitute a comprehensive list. Numerous other context sensors 321 will be obvious to those of ordinary skill in the art having the benefit of this disclosure.

In one embodiment, a mood detector 901 can infer a person's mood based upon contextual information received from the physical sensors (320). For example, if the intelligent imager (701) captures a picture, multiple successive pictures, video, or other information from which a person can be identified as the owner of the electronic device, and she is crying in the picture, multiple successive pictures, video, or other information, the mood detector 901 can infer that she is either happy or sad. Similarly, if the audio capture device captures a user's voice and the user is yelling or cursing, the mood detector 901 can infer that the user is likely angry or upset.

The emotional detector 902 can function in a similar manner to infer a person's emotional state from contextual information received from the physical sensors (320). Illustrating by example, if the intelligent imager (701) captures a picture, multiple successive pictures, video, or other information relating to of the owner of an electronic device, the emotional detector 902 can infer their silently communicated emotional state, e.g., joy, anger, frustration, and so forth. This can be inferred from, for example, facial gestures such as a raised eyebrow, grin, or other feature. In one or more embodiments, such emotional cues can indicate the user is intending to issue a command to the electronic device. Alternatively, emotion can be detected from voice inflections, or words used. If someone screams, "I am mad at you," there are likely negative emotional issues involved, for example.

Calendar information and events 920 can be used to detect social cues. If, for example, a calendar event indicates that a birthday party is occurring, this can imply festive and jovial social cues. However, if a funeral is occurring, it is unlikely that a user will be issuing device commands to an electronic device as funerals tend to be quiet affairs.

Wellness information 903 can be used to detect social cues. If, for example, wellness information 903 indicates that a person's heart rate is high, and they are perspiring, and the location information 915 indicates that a person is in an alley of a city, and the time-of-day information 908 indicates that its 3 AM, the person may be under duress. Accordingly, the command "Call 911" is highly likely to be a device command.

Alarm information 904 can be used to detect social cues. If an alarm has just sounded at 6:00 AM, the command "snooze" is likely to be a device command. Personal identification information 905 can be used to detect social cues as well. If a person is a diabetic, and wellness sensors show them to be clammy and sweaty, this could be due to low insulin. Accordingly, the command "Call 911" is highly likely to be a device command.

Device usage data 906 can indicate social cues. If a person is searching the web, and an incoming call is received, the command "decline" is likely to be a device command. Energy storage 907 within an electronic device can be used to indicate a social cue. Device operating mode information 909 can be used in a similar fashion. When energy storage drops to, for example, ten percent, the command "shut down all non-critical apps" is likely to be a device command.

Consumer purchase information 911 can certainly indicate social cues. If, for example, a person is a sommelier and frequently purchases wine, when viewing a web browser and finding a bottle of '82 Lafite for under $1000, the command "buy that wine now" is likely to be a device command.

Device usage profiles 912 can be used to infer social cues as well. If, for example, a person never uses an electronic device between 10:00 PM and 6:00 AM due to the fact that they are sleeping, if they happen to talk in their sleep and say, "order a pizza—I'm starving," this is not likely to be a device command.

Organizations can have formal rules and policies 910, such as meetings cannot last more than an hour without a break, one must take a lunch break between noon and 2:00 PM, and brainstorming sessions occur every morning between 9:00 and 10:00 AM. Similarly, families can have similar rules and policies 913, such as dinner occurs between 6:00 and 7:00 PM. This information can be used to infer social cues such as whether a person is likely to be in conversation with other people. When this is the case, spoken questions are less likely to be device commands. By contrast, when a user is likely to be alone, spoken commands are more likely to be device commands.

Application data 934 can indicate social cues. If a person frequently interacts with word processing applications during the day, the commands "cut", and "paste" are more likely to be device commands that they would for someone who instead plays video games with flying birds. Device settings 916 can indicate social cues as well. If a user sets their electronic device to alarm clock mode, it may be likely that they are sleeping and are not issuing device commands.

Social media 918 in formation can indicate social cues. For example, in one embodiment information relating to multi-modal social cues from an environment about the electronic device can be inferred from retrieving information from a social media server. For example, real time searches, which may be a keyword search, image search, or other search, of social media services can find images, posts, and comments relating to a location determined by the location information 915. Images posted on a social media service server that were taken at the same location may reveal multi-modal social cues. Alternatively, commentary regarding the location may imply social cues. Information from third party servers 917 can be used in this manner as well.

One further example of the context sensors 321 is repetitive behavior information 919. If, for example, a person always stops at a coffee shop between 8:00 and 8:15 AM on their way to work, the command, "Pay for the coffee," is likely to be a device command. As with FIG. 8 above, the physical sensors of FIG. 8 do not constitute a comprehensive list. Context sensors 321 can be any type of device that infers context from data of the electronic device. The context sensors 321 can be configured as either hardware components, or alternatively as combinations of hardware components and software components. The context sensors 321 can analyze information to, for example, not only detect the user, but also to determine the social cues and emotional effect of other people in the vicinity of the electronic device, thereby further informing inferences about the user's intent and what executable control commands are appropriate given this composite social context.

The context sensors 321 can be configured to collect and analyze non-physical parametric data. While some are shown in FIG. 9, numerous others could be added. Accordingly, the context sensors 321 of FIG. 9 are illustrative only, as numerous others will be obvious to those of ordinary skill in the art having the benefit of this disclosure. It should be noted that one or both of the physical sensors (320) or the context sensors 321, when used in combination, can be cascaded in a predefined order to detect a plurality of multi-modal social cues to determine whether the device command is intended for the electronic device.

Turning now back to FIG. 3, in one or more embodiments a heuristic sensor processor 319 can be operable with both the physical sensors 320 and the context sensors 321 to detect, infer, capture, and otherwise determine when multi-modal social cues are occurring in an environment about an electronic device. In one embodiment, the heuristic sensor processor 319 determines, from one or both of the physical sensors 320 or the context sensors 321, assessed contexts and frameworks using adjustable algorithms of context assessment employing information, data, and events. These assessments may be learned through repetitive data analysis. Alternatively, a user may employ the user interface of the electronic device 101 to enter various parameters, constructs, rules, and/or paradigms that instruct or otherwise guide the heuristic sensor processor 319 in detecting multi-modal social cues, emotional states, moods, and other contextual information. The heuristic sensor processor 319 can comprise an artificial neural network or other similar technology in one or more embodiments.

In one or more embodiments, the heuristic sensor processor 319 is operable with the one or more processors 314. In some embodiments, the one or more processors 314 can control the heuristic sensor processor 319. In other embodiments, the heuristic sensor processor 319 can operate independently, delivering information gleaned from detecting multi-modal social cues, emotional states, moods, and other contextual information to the one or more processors 314. The heuristic sensor processor 319 can receive data from one or both of the physical sensors 320 or the context sensors 321. In one or more embodiments, the one or more processors 314 are configured to perform the operations of the heuristic sensor processor 319.

In one or more embodiments, the block diagram schematic 312 includes a voice interface engine 322. The voice interface engine 322 can include hardware, executable code, and speech monitor executable code in one embodiment. The voice interface engine 322 can include, stored in memory 315, basic speech models, trained speech models, or other modules that are used by the voice interface engine 322 to receive and identify voice commands that are received with audio input captured by an audio capture device. In one embodiment, the voice interface engine 322 can include a voice recognition engine. Regardless of the specific implementation utilized in the various embodiments, the voice interface engine 322 can access various speech models to identify speech commands.

In one embodiment, the voice interface engine 322 is configured to implement a voice control feature that allows a user to speak a specific device command to cause the one or more processors 314 to execute a control operation. For example, the user may say, "How tall is the Willis Tower?" This question comprises a device command requesting the one or more processors to retrieve, with the communication device 316, information from a remote server, perhaps across the Internet, to answer the question. Consequently, this device command can cause the one or more processors 314 to access an application module, such as a web browser, to search for the answer and then deliver the answer as audible output via an audio output of the other components 324. In short, in one embodiment the voice interface engine 322 listens for voice commands, processes the commands and, in conjunction with the one or more processors 314, returns an output that is the result of the user's intent.

The block diagram schematic 312 can also include an image/gaze detection-processing engine 323. The image/gaze detection-processing engine 323 can be operable with the physical sensors 320, such as a camera or intelligent imager, to process information to detect a user's gaze point. The image/gaze detection-processing engine 323 can optionally include sensors for detecting the alignment of a user's head in three-dimensional space. Electronic signals can then be delivered from the sensors to the image/gaze detection-processing engine 323 for computing the direction of user's gaze in three-dimensional space.

In one or more embodiments, the one or more processors 314 can cause the blade assembly 302 to transition to the peek position when an imager invocation request is received and the image/gaze detection-processing engine 323 determines that ta user is gazing at the front surface of the electronic device 101. The image/gaze detection-processing engine 323 can further be configured to detect a gaze cone corresponding to the detected gaze direction, which is a field of view within which the user may easily see without diverting their eyes or head from the detected gaze direction. This information can also be used to automatically transition the blade assembly 302 relative to the device housing 301. The image/gaze detection-processing engine 323 can be configured to alternately estimate gaze direction by inputting images representing a photograph of a selected area near or around the eyes.

The one or more processors 314 may also generate commands or execute control operations based upon information received from a combination of the physical sensors 320, the context sensors 321, the flexible display 304, the other components 324, and/or the other input devices. Alternatively, the one or more processors 314 can generate commands or execute control operations based upon information received from the one or more sensors or the flexible display 304 alone. Moreover, the one or more processors 314 may process the received information alone or in combination with other data, such as the information stored in the memory 315. As will be explained in more detail below with reference to FIGS. 28-29 and 32, this information can be used to automatically transition the blade assembly 302 such that the front-facing area amount of the flexible display 304 has dimensions corresponding to the aspect ratio of a content presentation companion device (102).

Other components 324 operable with the one or more processors 314 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

As noted above, in one or more embodiments a blade assembly 302 is coupled to the flexible display 304. In contrast to sliding devices that include multiple device housings, the electronic device 101 of FIG. 3 includes a single device housing 301 to which the blade assembly 302 is coupled. The blade assembly 302 is configured as a mechanical chassis that allows the flexible display 304 to translate along a translation surface defined by major and minor surfaces of the single device housing 301.

In one or more embodiments, the blade assembly 302 also provides a mechanical support for portions 330 of the flexible display 304 that extend beyond the top edge 331 of the single device housing 301 when the blade assembly 302 and flexible display 304 are in the extended position shown in FIG. 3. When the display roller mechanism 305 actuates, it causes the blade assembly 302 and the flexible display 304 to translate 501 along the rear major surface 303, the bottom minor surface, and the front major surface between the extended position shown in FIG. 4, the retracted position shown in FIG. 5, and the peek position shown in FIG. 7.

The blade assembly 302 can include a blade substrate 325 that includes both flexible portions and rigid portions, and that is positioned between the flexible display 304 and the translation surface defined by the single device housing 301. The blade substrate 325 can also comprise a silicone border 327 that surrounds and protects the edges of the flexible display 304. In one or more embodiments, the blade substrate 325 comprises a steel backer plate with the silicone border 327 co-molded around the perimeter of the steel backer plate. In one or more embodiments, a low-friction dynamic bending laminate stack 328 and blade 326 are positioned between the blade assembly 302 and the translation surfaces defined by the single device housing 301.

In one or more embodiments, the blade substrate 325 is partially rigid and partially flexible. Illustrating by example, portions of the blade substrate 325 that slide along the major surfaces of the single device housing 301 are configured to be substantially rigid, while portions of the blade substrate 325 that pass around the minor surfaces of the single device housing 301 are configured to be flexible so that they can curl around those minor surfaces. In one or more embodiments, some portions of the blade substrate 325 abut the translation surfaces defined by the single device housing 301 while other portions abut the display roller mechanism 305, which is positioned at the bottom minor surface of the single device housing 301 in this illustrative embodiment.

In one or more embodiments, the blade 326 and the low-friction dynamic bending laminate stack 328 are positioned between the blade assembly 302 and the translation surfaces defined by the single device housing 301. The blade 326 supports portions of the blade assembly 302 and flexible display 304 that extend beyond the top edge 331 of the single device housing 301 when the blade assembly 302 is transitioned to the extended position shown in FIG. 3. Since this blade 326 needs to be rigid to support those portions of the blade assembly 302 and the flexible display 304, it is not able to bend around the display roller mechanism 305. To prevent gaps or steps from occurring where the blade 326 terminates, in one or more embodiments a low-friction dynamic bending laminate stack 328 spans the remainder of the blade assembly 302 and abuts the transition surfaces defined by the single device housing 301.

The blade assembly 302 can be fixedly coupled to the flexible display 304 by an adhesive or other coupling mechanisms. Where the blade substrate 332 defines both rigid and flexible portions. The blade substrate 332 can define a first rigid section extending along the major surfaces of the single device housing 301 and a second flexible section extending configured to wrap around the minor surfaces of the single device housing 301 where the display roller mechanism 305 is positioned.

Figure 5:
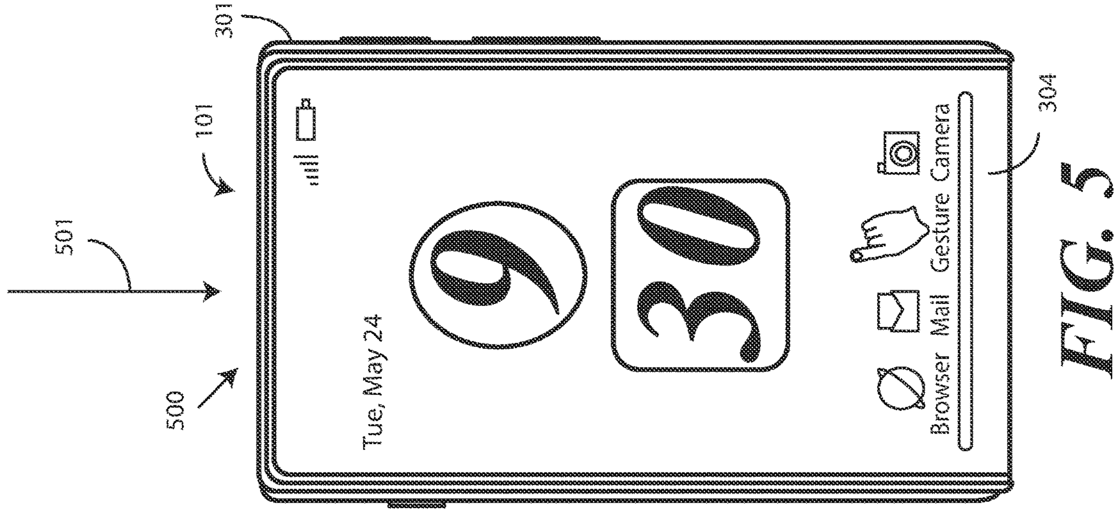
FIG. 5 illustrates the explanatory electronic device of FIG. 4 with the translating display moved to a second sliding position where the translating display wraps around, and abuts, the device housing of the electronic device.
Figure 4:
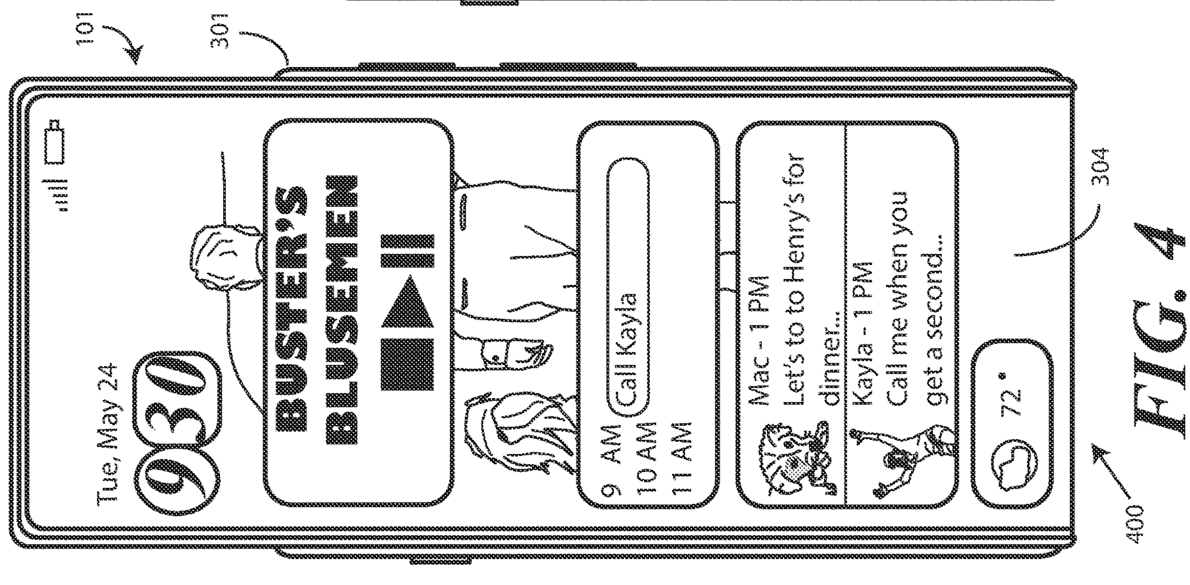
FIG. 4 illustrates one explanatory electronic device having a translating display moved to a first sliding position where portions of the translating display extend distally away from the device housing of the electronic device.
Figure 7:
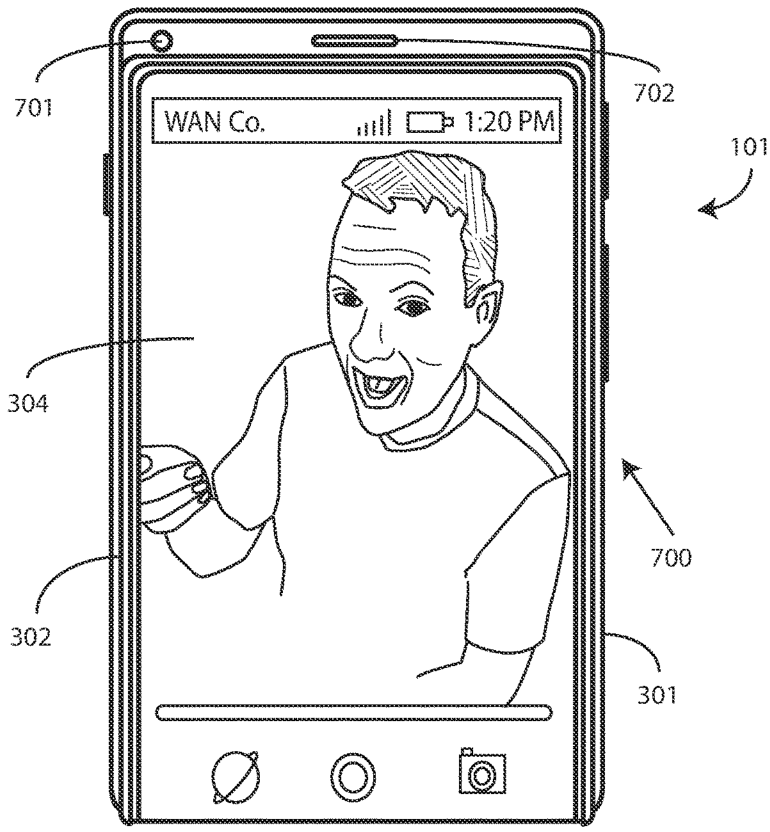
FIG. 7 illustrates the explanatory electronic device of FIG. 4 with the translating display moved to a third sliding position known as the "peek" position that exposes an image capture device positioned under the translating display when the translating display is in the first sliding position or second sliding position.

In one or more embodiments, the blade assembly 302 defines a mechanical assembly providing a slider framework that allows the flexible display 304 to move between the extended position of FIG. 4, the retracted position of FIG. 5, and the peek position of FIG. 7. As used herein, the term "framework" takes the ordinary English definition of a mechanical support structure supporting the other components coupled to the slider framework. These components can include the blade 326, the silicone border 327, and the low-friction dynamic bending laminate stack 328. Other components can be included as well. Illustrating by example, this can include electronic circuits for powering the flexible display 304. In one or more embodiments, it can further include a tensioner that ensures that the flexible display 304 remains flat against the single device housing 301 when translating.

In one or more embodiments, the display roller mechanism 305 that causes a first portion of the blade assembly 302 and the flexible display 304 display (shown on the rear side of the electronic device 101 in FIG. 3) and a second portion of the blade assembly 302 and the flexible display 304 (positioned on the front side of the electronic device 101 in FIG. 3) to slide symmetrically in opposite directions along the translation surfaces defined by the single device housing 301.

Thus, the electronic device 101 of FIG. 3 includes a single device housing 301 with a flexible display 304 incorporated into a blade assembly 302. The blade assembly 302 is then coupled to a translation mechanism defined by the display roller mechanism 305 and situated within the single device housing 301. In the explanatory embodiment of FIG. 3, the display roller mechanism 305 is situated at the bottom edge of the single device housing 301.

In one or more embodiments, the one or more processors 314 cause the blade assembly 302 to transition to the peek position in response to an application operating on the one or more processors 314 invoking an image capture operation and the one or more sensors 320,321 determining that the front-facing imager is oriented toward a user of the electronic device 101.

In one or more embodiments, the electronic device 101 includes a front-facing imager (shown below in FIG. 7) and a rear-facing imager 308. In one or more embodiments, the rear-facing imager 308 is exposed regardless of whether the blade assembly 302 is in the extended position, the retracted position, or the peek position, as shown in FIG. 3. By contrast, the front-facing imager is exposed only when the blade assembly 302 is in the peek position. It is instead concealed when the blade assembly 302 is in the retracted position, the extended position, or positions therebetween, as also shown in FIG. 3.

The one or more sensors 320,321 can determine that the front-facing imager is oriented toward the user in a variety of ways. Illustrating by example, in one or more embodiments the one or more processors 314 cause the rear-facing imager 308 to capture at least one image in response to an application operating on the one or more processors 314 invoking an image capture operation. If that at least one image fails to match a predefined criterion, the one or more processors 314 determine that the front-facing imager is oriented toward the user in one or more embodiments.

The predefined criterion can vary as well. In one or more embodiments, the predefined criterion comprises the at least one image depicting the user looking at the rear-facing imager. In other embodiments, the predefined criterion comprises the at least one depicting a face having a size exceeding a predefined image area threshold. Other predefined criteria will be described below. Still others will be obvious to those of ordinary skill in the art having the benefit of this disclosure.

In other embodiments, the one or more sensors 320,321 determine the front-facing imager is oriented toward the user of the electronic device 101 when the one or more processors 314 cause the rear-facing imager 308 to capture at least one image in response to the application operating on the one or more processors invoking the image capture operation and that at least one image matches a predefined criterion. In one or more embodiments, the predefined criterion comprises the at least one image depicting one or more of a hand, a finger, or an inanimate object. Other predefined criteria will be described below. Still others will be obvious to those of ordinary skill in the art having the benefit of this disclosure.

In other embodiments, as will be described below, translation of the blade assembly 302 can be initiated by the operation of a user interface component 310. Embodiments of the disclosure contemplate that in such an electronic device 101, manual actuation of the user interface component 310 potentially delays the usability of the electronic device 101 in the new state due to the time taken to manually "inject" the trigger causing transition of the blade assembly 302 and flexible display 304 by requiring the actuation of the user interface component 310.

Advantageously, embodiments of the disclosure provide systems and methods that automatically and pre-emptively move the flexible display 304 to a position where a front-facing area amount of the flexible display 304 has dimensions that correspond to the aspect ratio of a content presentation companion device (102) rather than requiring the operation of user interface components 310. Illustrating by example, in one or more embodiments when the communication device 316 is in electronic communication with a content presentation companion device (102), the one or more processors 314 can determine a front-facing area of the flexible display 304 required so that content can be presented with an aspect ratio equivalent to that of the content presentation companion device (102) with which the electronic device 101 is communicating.

Advantageously, embodiments of the disclosure provide intuitive operation of a translating display in an electronic device 101. In cases where automatic translation of the translating display is triggered by the need to cause the aspect ratio of the flexible display 304 and the display (201) of a content presentation companion device 102 to match, no user action is required for the electronic device 101 to take on the most compact form factor that still allows for the presentation of content with the aspect ratio of the content presentation companion device on the front-facing portion of the flexible display 304. The device just automatically changes to the position optimized for the presentation of content with the aspect ratio of the content presentation companion device (102).

As shown in FIG. 3, the blade assembly 302 is able to slide around the single device housing 301 such that the blade 326 slides away from the single device housing 301 to change the apparent overall length of the flexible display 304 as viewed from the front of the electronic device 101. By contrast, in other states (such as the one shown in FIG. 5) the blade assembly 302 can slide in an opposite direction around the single device housing 301 to a retracted position with similar amounts of the flexible display 304 visible on the front side of the electronic device 101 and the rear side of the electronic device 101.

In FIG. 3, the electronic device 101 includes a single device housing 301 with a blade assembly 302 coupled to two major surfaces of the single device housing 301 and wrapping around at least one minor surface of the electronic device 101 where the display roller mechanism 305 is situated. This allows the blade assembly 302 to slide relative to the single device housing 301 between a retracted position of FIG. 5, the extended position of FIG. 1, and the peek position of FIG. 7 revealing a front-facing image capture device.

A content presentation companion device integration manager 333 is operable to perform content redirection operations. In one or more embodiments, the content presentation companion device integration manager 333 allows the one or more processors 314 of the electronic device 101 to connect to a content presentation companion device such as a larger monitor, television, or other device having a larger screen. The content presentation companion device integration manager 333 then facilitates wireless streaming of content to the larger display of a content presentation companion device.

In one or more embodiments, neither a cable nor a docking station is required for the content presentation companion device integration manager 333 to redirect content to another device. Instead, the content presentation companion device integration manager 333 employs the communication device 316 and the one or more antennas 317 to transmit content to a content presentation companion device.

The inclusion of the content presentation companion device integration manager 333 allows the electronic device 101 to be used as a mouse, trackpad, or other control device while content is being presented on the content presentation companion device. The content presentation companion device integration manager 333 can be used for presenting pictures, videos, television shows, or movies on the larger display of a content presentation companion device. Additionally, the content presentation companion device integration manager 333 can facilitate gaming, video conferences, and other content presentation tasks using the display of a content presentation companion device as well.

It is to be understood that in both FIG. 2 and FIG. 3, the elements illustrated are provided for illustrative purposes only in accordance with embodiments of the disclosure. Neither is intended to be a complete schematic diagram of the various components required. Therefore, other electronic devices in accordance with embodiments of the disclosure may include various other components obvious to those of ordinary skill in the art having the benefit of this disclosure, but not shown in FIG. 2 or FIG. 3, or may include a combination of two or more components or a division of a particular component into two or more separate components, and still be within the scope of the present disclosure.

Turning now to FIG. 4, illustrated therein is the electronic device 101 in the extended position 400 that was also shown in FIG. 1. In the extended position 400, the blade (326) slides outward and away from the single device housing 301, thereby revealing more and more portions of the flexible display 304. In such a configuration, the portions of flexible display 304 passing around the display roller mechanism (305) elongated into a flat position as they pass along the translation surface defined by the front of the single device housing 301.

Figure 6:
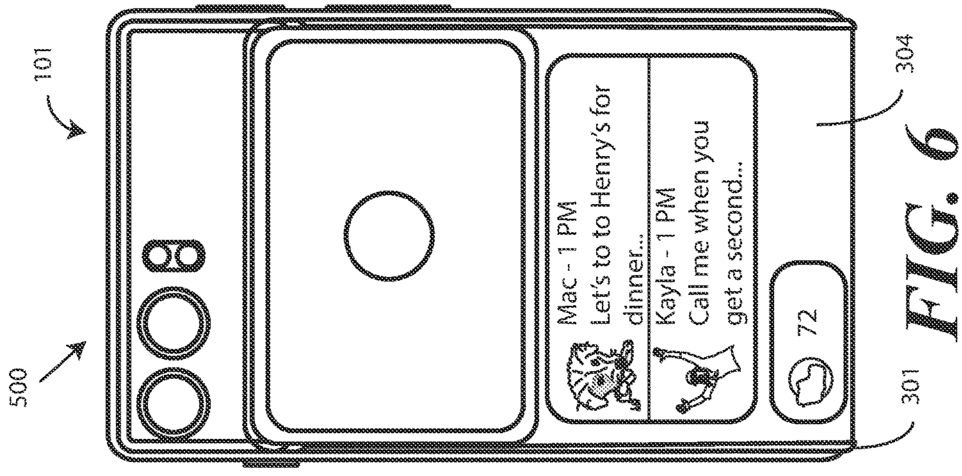
FIG. 6 illustrates the electronic device of FIG. 5 from the rear.

Turning now to FIGS. 5-6, illustrated therein is the electronic device 101 with the flexible display 304 in the retracted position 500. FIG. 3 illustrates the front side of the electronic device 101, while FIG. 6 illustrates the rear side.

In this state, blade (326) slides back toward, and then along, the translation surface defined by the single device housing 301. This causes the apparent overall length of the flexible display 304 to get shorter as more and more portions of the flexible display 304 pass around the display roller mechanism (305) positioned at the bottom of the single device housing 301 and across the translation surface defined by the rear side of the single device housing 301.

Turning now to FIG. 7, illustrated therein is the electronic device 101 with the flexible display in the peek position 700. When in the peek position, the blade assembly 302 and the flexible display 304 translate past the retracted position (500) of FIG. 5. In one or more embodiments, when this occurs, the blade assembly 302 and the flexible display 304 reveal an image capture device 701 or front-facing imager that is situated beneath, and concealed by, the blade assembly 302 and the flexible display 304 when they are in the retracted position (500) of FIG. 5. In this illustrative embodiment, a loudspeaker 702 is also revealed.

Advantageously, by positioning the image capture device 701 beneath the blade assembly 302 and the flexible display 304 when these components are in either the retracted position (500) of FIGS. 5-6, or the extended position (400) of FIG. 4, a user of the electronic device 101 is assured of privacy due to the fact that the image capture device 701 is not able to see through the blade (326) of the blade assembly 302. Accordingly, even if the electronic device 101 is accessed by a hacker or other nefarious actor, the user can be assured that the image capture device 701 cannot capture images or videos while the blade assembly 302 and flexible display 304 are in the retracted position (500), the extended position (400), or in positions therebetween. Only when the blade assembly 302 and the flexible display 304 transition to the peek position 700, thereby revealing the image capture device 701, can the image capture device 701 capture front-facing images or front-facing videos.

Referring collectively to FIGS. 4-7, it can be seen that the electronic device 101 includes a single device housing with a flexible display 304 incorporated into a blade assembly 302. The blade assembly 302 is coupled to a translation mechanism situated within the single device housing 301.

In response to actuation of a user interface device, one example of which is a button positioned on a side of the single device housing 301, or alternatively automatically in response to the determination of an aspect ratio of a content presentation companion device (102) as described below with reference to FIGS. 28-29 and 31, the translation mechanism is operable to transition the blade assembly 302 around the surfaces of the single device housing 301 between the extended position 400 where the blade (326) of the blade assembly 302 extends distally from the single device housing 301, the retracted position 300 where the blade assembly 302 abuts the single device housing 301 without extending beyond the edge of the device housing 301 and with the flexible display 304 and blade assembly 302 wrapping around the surfaces of the single device housing 301, the peek position 700 where movement of the translation mechanism causes the blade assembly 302 to reveal the image capture device 701 (and loudspeaker 702 in this example) situated beneath the blade assembly 302 on the front side of the single device housing 301, or even positions therebetween.

Another feature that can be seen in reviewing FIGS. 4-7 collectively is the how the presentation of content changes as a function of the position of the blade assembly 302. Embodiments of the disclosure contemplate that the position of the blade assembly 302 and flexible display 304 relative to the single device housing 301 change the amount of the flexible display 304 that is visible from the front, visible from the rear, and visible in the curved end portions. Said differently, the viewable size of the flexible display 304 from each side of the electronic device 101 will vary as a function of the position of the blade assembly 302 relative to the single device housing 301. Advantageously, embodiments of the disclosure provide applications, methods, and systems that dynamically resize and adjust the interface layouts and content presentations.

This can be accomplished by resizing a primary visible portion, e.g., the front-facing portion shown in FIGS. 4, 5, and 7, of the flexible display 304. Applications can be windowed on this primary area of the flexible display 304, which will resize as the flexible display 304 as it transitions between the extended position 400 of FIG. 4, the retracted position 500 of FIGS. 5-6, and the peek position 700 of FIG. 7.

In FIGS. 4-7, the one or more processors (314) of the electronic device 101 segment the flexible display 304 into three, individual, usable parts. These include the front-facing portion of the flexible display 304 shown in FIGS. 4, 5, and 7, the rear-facing portion of the flexible display 304 shown in FIG. 7, and the curvilinear portion of the flexible display 304 situated at the bottom of the electronic device 101 and wrapping around the rotor, shown in FIGS. 2-7. This curvilinear portion of the flexible display 304 is sometimes referred to as the "roll edge" portion of the display.

In one or more embodiments, each of these usable parts are dynamically remapped as the flexible display 304 changes position relative to the single device housing 301. In one or more embodiments, applications can request a window on the usable portion upon which it intends to present content.

In one or more embodiments, the orientation of the rear-facing portion and the roll edge portion is not the same as that of the front-facing portion when the flexible display 304 translates along the single device housing 301 from the extended position 400 shown in FIG. 4 to the retracted position 500 shown in FIGS. 5-6 or the peek position 700 of FIG. 7. To address this, as can be seen by comparing FIGS. 5-6, in one or more embodiments content presented on the rear-facing portion is rotated by 180-degrees so that its "up" side is the same as the "up" side on the front-facing portion.

In one or more embodiments, the orientation of content presented on the roll edge portion can change based upon the orientation of the electronic device 101. If, for example, the front-facing side is up the orientation of content presented on the roll edge will have a first orientation. By contrast, if the rear-facing side is up, the orientation of that same content presented on the roll edge will have a second orientation that is rotated 180-degrees relative to the first orientation.

In one or more embodiments, any content presented on the front-facing portion of the flexible display 304 is oriented in accordance with user preferences. In one or more embodiments, this front-facing portion is oriented in accordance with the orientation of the electronic device 101 in three-dimensional space.

On the roll edge portion of the translating display, in one or more embodiments this segment is oriented in the same orientation as the front-facing portion when the electronic device 101 is not oriented with the front-facing side facing the negative z-direction in three-dimensional space (it is rotated by 180-degrees when this is the case). In one or more embodiments, the roll edge portion does not obey user preferences for display orientation and auto rotate/device orientation.

In one or more embodiments, content presented on the rear-facing portion of the flexible display 304 is always rotated by 180-degrees relative to content presented on the front-facing portion when the electronic device 101 is being held vertically, as is the case, and as can be seen, in FIGS. 5-6. In one or more embodiments, the rear-facing portion does not obey user preferences for display orientation and auto-rotate/device orientation.

Accordingly, in one or more embodiments one or more processors (314) of the electronic device (101) dynamically remap multiple translating display root segments based upon the position of the flexible display 304 relative to the single device housing 301. The one or more processors 314 can independently manage orientation and rotation on each of the root segments of the flexible display 304, be they the front-facing portion, the rear-facing portion, or the roll edge portion. In one or more embodiments, this management occurs independently based upon which side of the electronic device 101 the segment is currently positioned upon, combined with sensor inputs to identify if the electronic device 101 is face down or face up.

As shown in FIG. 4, the blade assembly 302 is operable to slide around the single device housing 301 such that the blade 326 slides away from the single device housing 301 to change an overall length of the flexible display 304 as viewed from the front of the electronic device 101. As shown in FIGS. 5-6, the blade assembly 302 can slide in an opposite direction around the single device housing 301 to a retracted position 300, optionally in response to another swipe gesture, with similar amounts of the flexible display 304 being visible on the front side of the electronic device 101 and the rear side of the electronic device 101.

Accordingly, in one or more embodiments the electronic device 101 includes a single device housing 301 with a blade assembly 302 coupled to two major surfaces of the single device housing 301 and wrapping around at least one minor surface of the electronic device 101 such that the blade assembly 302 can slide relative to the single device housing 301 between the retracted position 500, the extended position 400, and the peek position 700 revealing a front-facing image capture device 701.

Figure 10:
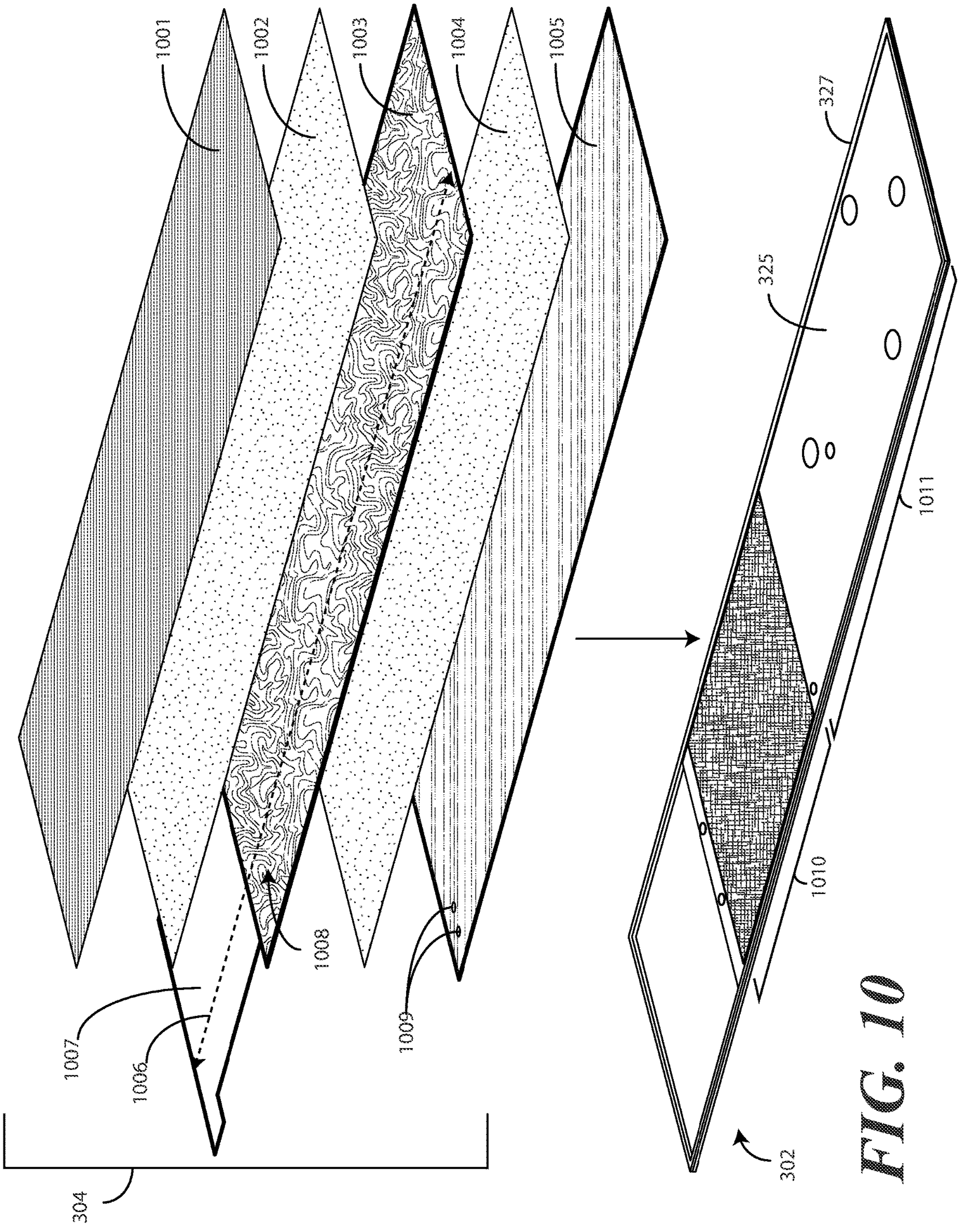
FIG. 10 illustrates portions of one explanatory display assembly in an exploded view in accordance with one or more embodiments of the disclosure.

Turning now to FIG. 10, illustrated therein is the flexible display 304 shown in an exploded view, along with the blade assembly 302. As shown in FIG. 10, in one or more embodiments the flexible display 304 comprises one or more layers that are coupled or laminated together to complete the flexible display 304. In one or more embodiments, these layers comprise a flexible protective cover 1001, a first adhesive layer 1002, a flexible display layer 1003, a second adhesive layer 1004, and a flexible substrate 1005. Other configurations of layers suitable for manufacturing the flexible display 304 will be obvious to those of ordinary skill in the art having the benefit of this disclosure.

Beginning from the top of the layer stack, in one or more embodiments the flexible protective cover 1001 comprises an optically transparent substrate. In one or more embodiments the flexible protective cover 1001 may be manufactured from an optically transparent material such a thin film sheet of a thermoplastic material. Illustrating by example, in one embodiment the flexible protective cover 1001 is manufactured from a layer of optically transparent polyamide having a thickness of about eighty microns. In another embodiment, the flexible protective cover 1001 is manufactured from a layer of optically transparent polycarbonate having a thickness of about eighty microns. Other materials suitable for manufacturing the flexible protective cover 1001 will be obvious to those of ordinary skill in the art having the benefit of this disclosure.

In one or more embodiments the flexible protective cover 1001 functions as a fascia by defining a cover for the flexible display layer 1003. In one or more embodiments the flexible protective cover 1001 is optically transparent, in that light can pass through the flexible protective cover 1001 so that objects behind the flexible protective cover 1001 can be distinctly seen. The flexible protective cover 1001 may optionally include an ultra-violet barrier. Such a barrier can be useful in improving the visibility of flexible display layer 1003 in one or more embodiments.

Beneath the flexible protective cover 1001 is a first adhesive layer 1002. In one or more embodiments, the first adhesive layer 1002 comprises an optically transparent adhesive. The optically transparent adhesive can be applied to two sides of a thin, optically transparent substrate such that the first adhesive layer 1002 functions as an optically transparent layer having optically transparent adhesive on both sides. Where so configured, in one or more embodiments the first adhesive layer 1002 has a thickness of about fifty microns. This optically transparent version of "double-sided tape" can then be spooled and applied between the flexible protective cover 1001 and the flexible display layer 1003 to couple the two together.

In other embodiments the first adhesive layer 1002 will instead be applied between the flexible protective cover 1001 and the flexible display layer 1003 as an optically transparent liquid, gel, as a homogeneous adhesive layer, or in the form of another medium. Where so configured, the first adhesive layer 1002 can optionally be cured by heat, ultraviolet light, or other techniques. Other examples of materials suitable for use as the first adhesive layer 1002 will be obvious to those of ordinary skill in the art having the benefit of this disclosure. In one or more embodiments, the first adhesive layer 1002 mechanically couples the flexible display layer 1003 to the flexible protective cover 1001.

In one or more embodiments, the flexible display layer 1003 is situated between the flexible substrate 1005 and the flexible protective cover 1001. In one or more embodiments, the flexible display layer 003 is longer along a major axis 1006 of the flexible display layer 1003, and thus the flexible display 304 itself, than is the image producing portion 1008 of the flexible display 304. For instance, as shown in FIG. 10 the flexible display layer 1003 includes a T-shaped tongue 1007 that extends beyond the image producing portion 1008 of the flexible display layer 003.

As will be shown in FIG. 12 below, in one or more embodiments electronic circuit components configured to operate the image producing portion 1008 of the flexible display layer 1003, connectors, and other components can be coupled to this T-shaped tongue 1007 in one or more embodiments. Thus, in this illustrative embodiment the T-shaped tongue 1007 extends distally beyond terminal ends of the other layers of the flexible display 304. While the T-shaped tongue 1007 is T-shaped in this illustrative embodiment, it can take other shapes as well as will be obvious to those of ordinary skill in the art having the benefit of this disclosure.

The flexible display layer 1003 can optionally be touch-sensitive. In one or more embodiments, the flexible display layer 1003 is configured as an organic light emitting diode (OLED) display layer. When coupled to the flexible substrate 1005, the flexible display layer 1003 can bend in accordance with various bending radii. For example, some embodiments allow bending radii of between thirty and six hundred millimeters. Other substrates allow bending radii of around five millimeters to provide a display that is foldable through active bending. Other displays can be configured to accommodate both bends and folds.

In one or more embodiments the flexible display layer 1003 may be formed from multiple layers of flexible material such as flexible sheets of polymer or other materials. Illustrating by example, the flexible display layer 1003 can include a layer of optically pellucid electrical conductors, a polarizer layer, one or more optically transparent substrates, and layers of electronic control circuitry such as thin film transistors to actuate pixels and one or more capacitors for energy storage. In one or more embodiments, the flexible display layer 1003 has a thickness of about 130 microns.

In one or more embodiments, to be touch sensitive the flexible display layer 1003 includes a layer including one or more optically transparent electrodes. In one or more embodiments, the flexible display layer 1003 includes an organic light emitting diode layer configured to images and other information to a user. The organic light emitting diode layer can include one or more pixel structures arranged in an array, with each pixel structure comprising a plurality of electroluminescent elements such as organic light emitting diodes. These various layers can be coupled to one or more optically transparent substrates of the flexible display layer 1003. Other layers suitable for inclusion with the flexible display layer 1003 will be obvious to those of ordinary skill in the art having the benefit of this disclosure.

In one or more embodiments, the flexible display layer 1003 is coupled to a flexible substrate 1005 by a second adhesive layer 1004. In other embodiments, a layer above the flexible display layer 1003 can be configured with enough stiffness to make the flexible substrate 1005 unnecessary. For example, in an embodiment where the flexible protective cover 1001 is configured with enough stiffness to provide sufficient protection for the flexible display 304 during bending, the flexible substrate 1005 may be omitted.

In one or more embodiments, the flexible substrate 1005 comprises a thin layer of steel. Illustrating by example, in one or more embodiments the flexible substrate 1005 comprises a steel layer with a thickness of about thirty microns. While thin, flexible steel works well in practice, it will be obvious to those of ordinary skill in the art having the benefit of this disclosure that other materials can be used for the flexible substrate 1005 as well. For instance, in another embodiment the flexible substrate 1005 is manufactured from a thin layer of thermoplastic material.

In one or more embodiments, to simplify manufacture, the second adhesive layer 1004 is identical to the first adhesive layer 1002 and comprises an optically transparent adhesive. However, since the second adhesive layer 1004 is coupled between the flexible display layer 1003 and the flexible substrate 1005, i.e., under the flexible display layer 1003, an optically transparent adhesive is not a requirement. The second adhesive layer 1004 could be partially optically transparent or not optically transparent at all in other embodiments.

Regardless of whether the second adhesive layer 1004 is optically transparent, in one or more embodiments the adhesive of the second adhesive layer 1004 is applied to two sides of a thin, flexible substrate. Where so configured, in one or more embodiments the second adhesive layer 1004 has a thickness of about fifty microns. This extremely thin version of "double-sided tape" can then be spooled and applied between the flexible display layer 1003 and the flexible substrate 1005 to couple the two together.

In other embodiments, as with the first adhesive layer 1002, the second adhesive layer 1004 will instead be applied between the flexible display layer 1003 and the flexible substrate as a liquid, gel, as a homogeneous layer, or in the form of another medium. Where so configured, the second adhesive layer 1004 can optionally be cured by heat, ultraviolet light, or other techniques. Other examples of materials suitable for use as the second adhesive layer 1004 will be obvious to those of ordinary skill in the art having the benefit of this disclosure.

In this illustrative embodiment, the flexible display 304 is supported by not only the flexible substrate 1005, but by the blade assembly 302 as well. As previously described, in one or more embodiments the blade assembly 302 includes a blade substrate 325. In one or more embodiments, the blade substrate 325 comprises a layer of steel. In one or more embodiments, the blade substrate 325 is thicker than the flexible substrate 1005. Illustrating by example, in one or more embodiments when the flexible substrate 1005 comprises a steel layer with a thickness of about thirty microns, the blade substrate 325 comprises a layer of steel having a thickness of about one hundred microns.

In one or more embodiments, the blade substrate 325 comprises a rigid, substantially planar support layer. Illustrating by example, the blade substrate 325 can be manufactured from stainless steel in one or more embodiments. In another embodiment, the blade substrate 325 is manufactured from a thin, rigid thermoplastic sheet. Other materials can be used in manufacturing the blade substrate 325 as well. For example, the material nitinol, which is a nickel-titanium alloy, can be used to manufacture the blade substrate 325. Other rigid, substantially planar materials will be obvious to those of ordinary skill in the art having the benefit of this disclosure.

Accordingly, the blade substrate 325 defines another mechanical support for the flexible display 304. In one or more embodiments, the blade substrate 325 is the stiffest layer of the overall assembly of FIG. 10. In one or more embodiments the blade substrate 325 is manufactured from stainless steel with a thickness of about one hundred microns. In another embodiment, the blade substrate 325 is manufactured from a flexible plastic. Other materials from which the blade substrate 325 can be manufactured will be obvious to those of ordinary skill in the art having the benefit of this disclosure. For instance, in another embodiment the blade substrate 325 is manufactured from carbon fiber, and so forth. In one or more embodiments, the blade substrate 325 includes a reinforcing border comprising a thicker layer of material to further protect the flexible display 304 when the blade assembly 302 is in the extended position (400).

In one or more embodiments, the flexible substrate 1005 is slightly longer along a major axis of the flexible substrate 1005 than is the image producing portion 1008 of the flexible display 304. Since the T-shaped tongue 1007 is T-shaped, this allows one or more apertures 1009 to be exposed on either side of the base of the T of the T-shaped tongue 1007. In one or more embodiments, this extra length along the major axis provided by the flexible substrate 1005 allows one or more fasteners to rigidly couple the first end of the flexible substrate 1005 to a tensioner.

Embodiments of the disclosure contemplate that some of the layers comprising the flexible display 304 are stiffer than others. Similarly, other layers of the flexible display 304 are softer than others. For example, where the flexible substrate 1005 is manufactured from a metal, one example of which is stainless steel, this layer is stiffer than either the first adhesive layer 1002 or the second adhesive layer 1004. In one or more embodiments, the stainless steel is stiffer than the flexible display layer 1003 as well. In one or more embodiments, the flexible substrate 1005 is the stiffest layer in the flexible display 304 while the first adhesive layer and the second adhesive layer 1004 are the softest layers of the flexible display 304. The flexible protective cover 1001 and the flexible display layer 1003 have a stiffness that falls between that of the flexible substrate 1005 and the adhesive layers in one or more embodiments.

In one or more embodiments, the various layers of the flexible display 304 are laminated together in a substantially planar configuration. Said differently, in one or more embodiments the flexible substrate 1005 is configured as a substantially planar substrate. The second adhesive layer 1004 can be attached to this substantially planar substrate, with the flexible display layer 1003 then attached to the second adhesive layer 1004. The first adhesive layer 1002 can be attached to the flexible display layer 1003, with the flexible protective cover 1001 attached to the first adhesive layer 1002.

To ensure proper coupling, the resulting flexible display layer 1003 can be cured, such as in an autoclave at a predefined temperature for a predefined duration. Where employed, such curing allows any air bubbles or other imperfections in the various layers to be corrected. In one or more embodiments, since the flexible substrate 1005 is configured as a substantially planar substrate, the resulting flexible display 304 is substantially planar as well.

In one or more embodiments, the blade substrate 325 of the blade assembly 302 includes both a flexible portion 1010 and a rigid portion 1011. Since the blade substrate 325 is manufactured from a metal in one or more embodiments, one example of which is steel having a thickness of one hundred microns, the rigid portion 1011 gets its rigidity from the material from which it is manufactured. If, for example, the blade substrate 325 were manufactured from a thermoplastic material, in one or more embodiments this thermoplastic material would have enough rigidity that the rigid portion 1011 would be rigid. Since the rigid portion 1011 only slides along flat major surfaces of the translation surfaces defined by the single device housing (301), it does not need to bend. Moreover, rigidity helps to protect portions of the flexible display 304 that extend beyond ends of the single device housing (301).

By contrast, the flexible portion 1010 need to wrap around minor faces of the single device housing (301) where the display roller mechanism (305) is situated. Since the flexible portion 1010 is manufactured from the same material as the rigid portion 1011 when the blade substrate 325 is manufactured as a single unitary part, in one or more embodiments it includes a plurality of apertures cut through the blade substrate 325 allowing the material to bend. Illustrating by example, in one or more embodiments where the blade substrate 325 is manufactured from steel, a plurality of chemically or laser etched apertures can allow the flexible portion 1010 to tightly wrap around minor faces of the single device housing (301) where the display roller mechanism (305) is situated.

Thus, in one or more embodiments the blade substrate 325 is partially rigid and partially flexible. Portions of the blade substrate 325 that slide along the major surfaces of the single device housing (301) are configured to be substantially rigid, while portions of the blade substrate 325 that pass around the minor surfaces of the single device housing (301) are configured to be flexible so that they can curl around those minor surfaces.

In one or more embodiments, the blade assembly 302 also includes a silicone border 327 positioned around a perimeter of the blade substrate 325. In one or more embodiments, the silicone border 327 surrounds and protects the edges of the flexible display 304 when the flexible display 304 is attached to the blade substrate 325 of the blade assembly 302. In one or more embodiments, the silicone border 327 is co-molded around the perimeter of the blade substrate 325.

In one or more embodiments, the rigid portion 1011 of the blade substrate 325 can define one or more apertures. These apertures can be used for a variety of purposes. Illustrating by example, some of the apertures can be used to rigidly fasten the blade assembly 302 to a translation mechanism, one example of which was the display roller mechanism (305) of FIG. 3. Additionally, some of the apertures can contain magnets. Hall-effect sensors positioned in the single device housing (301) to which the blade assembly 302 is coupled can then detect the positions of these magnets such that the one or more processors (314) can determine whether the blade assembly 302 and flexible display 304 are in the extended position (400), the retracted position (500), the peek position (700), or somewhere in between.

In one or more embodiments, the flexible display 304 coupled to the blade substrate 325 of the blade assembly 302 within the confines of the silicone border 327. Illustrating by example, in one or more embodiments a first end of the flexible display 304 is adhesively coupled to the rigid portion 1011 of the blade substrate 325 of the blade assembly 302. The other end of the flexible display 304 can then be rigidly coupled to a tensioner by passing fasteners through the apertures 1009 of the flexible substrate.

Figure 11:
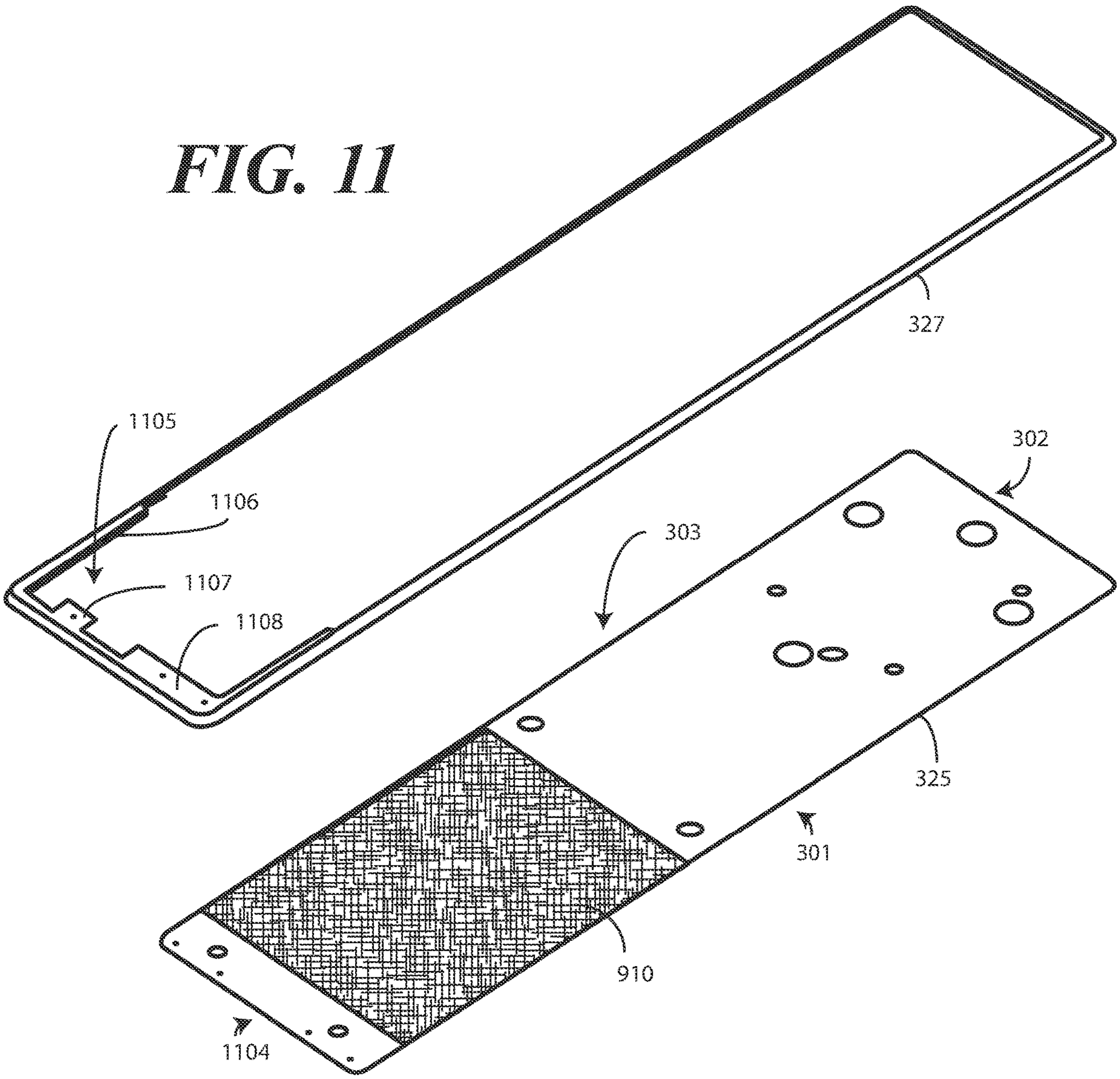
FIG. 11 illustrates portions of one explanatory display assembly in an exploded view in accordance with one or more embodiments of the disclosure.

Turning now to FIG. 11, illustrated therein is the blade substrate 325 and silicone border 327 shown in an exploded view. A shown, the silicone border 327 defines a singular, contiguous, unitary piece of silicone. In the illustrative embodiment of FIG. 11, the silicone border 327 surrounds three sides 1101,1102,1103 of the blade substrate 325, and extends beyond minor side 1104 to define a receiving recess 1105 that can accommodate mechanical and electrical components such as electronic circuit components to power and control the flexible display (304) that will situate within the perimeter defined by the silicone border 327, a tensioner to keep the flexible display (304) flat across the flexible portion 1109 of the blade substrate 325, flexible circuits, and other components.

In this illustrative embodiment, the portions 1106,1107, 1108 of the silicone border 327 extending beyond the minor side 1104 of the blade substrate 325 surrounding the receiving recess 1105 are thicker than are the other portions of the silicone border 327 that will surround the flexible display (304). This allows for components to be placed within the receiving recess 1105.

Figure 12:
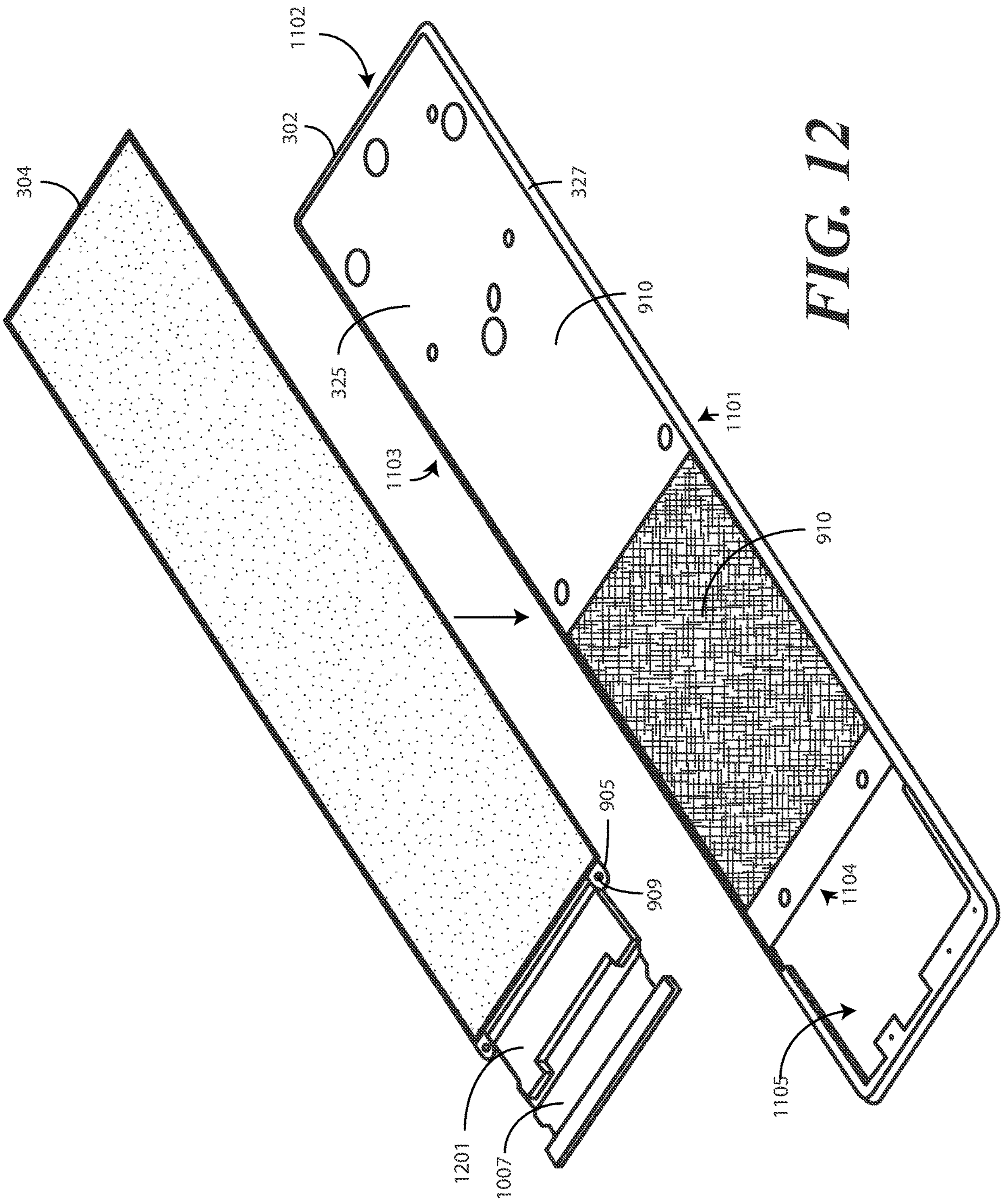
FIG. 12 illustrates one explanatory display assembly in an exploded view in accordance with one or more embodiments of the disclosure.

Turning now to FIG. 12, illustrated therein is the flexible display 304 and the blade assembly 302 with the silicone border 327 over-molded on the blade substrate 325. As shown, the silicone border 327 surrounds three sides 1101, 1102,1103 of the blade substrate 325 and extends beyond minor side 1104 to define a receiving recess 1105 that can accommodate mechanical and electrical components.

Electronic circuits 1201 operable to power and control the flexible display 304 have been coupled to the T-shaped tongue 1007 of the flexible display layer (1003). Additionally, a mechanical connector 1202 has been connected to the top of the T on the T-shaped tongue 1007. In this illustrative embodiment, the flexible substrate 1005 extends beyond a distal end of the flexible display layer (1003) so that the apertures 1009 defined therein can be coupled to a tensioner to ensure that the flexible display 304 stays flat around the flexible portion 1010 of the blade substrate 325 when the flexible portion 1010 of the blade substrate 325 passes around a rotor positioned at the end of a single device housing (301).

The blade assembly 302 can be fixedly coupled to the flexible display 304 in one or more embodiments. Illustrating by example, where the blade substrate 325 defines both a rigid portion 1011 and a flexible portion 1010, in one or more embodiments the flexible display 304 is coupled to the rigid portion 1011 by an adhesive or other coupling mechanism. A tensioner can then be positioned in the receiving recess 1105. In one or more embodiments, the tensioner rigidly couples with fasteners to the apertures 1009 of the flexible substrate 1005 to keep the flexible display 304 flat across the flexible portion 1010, regardless of how the flexible portion 1010 is being bent around the minor surface of a single device housing or its corresponding rotor.

Figure 13:
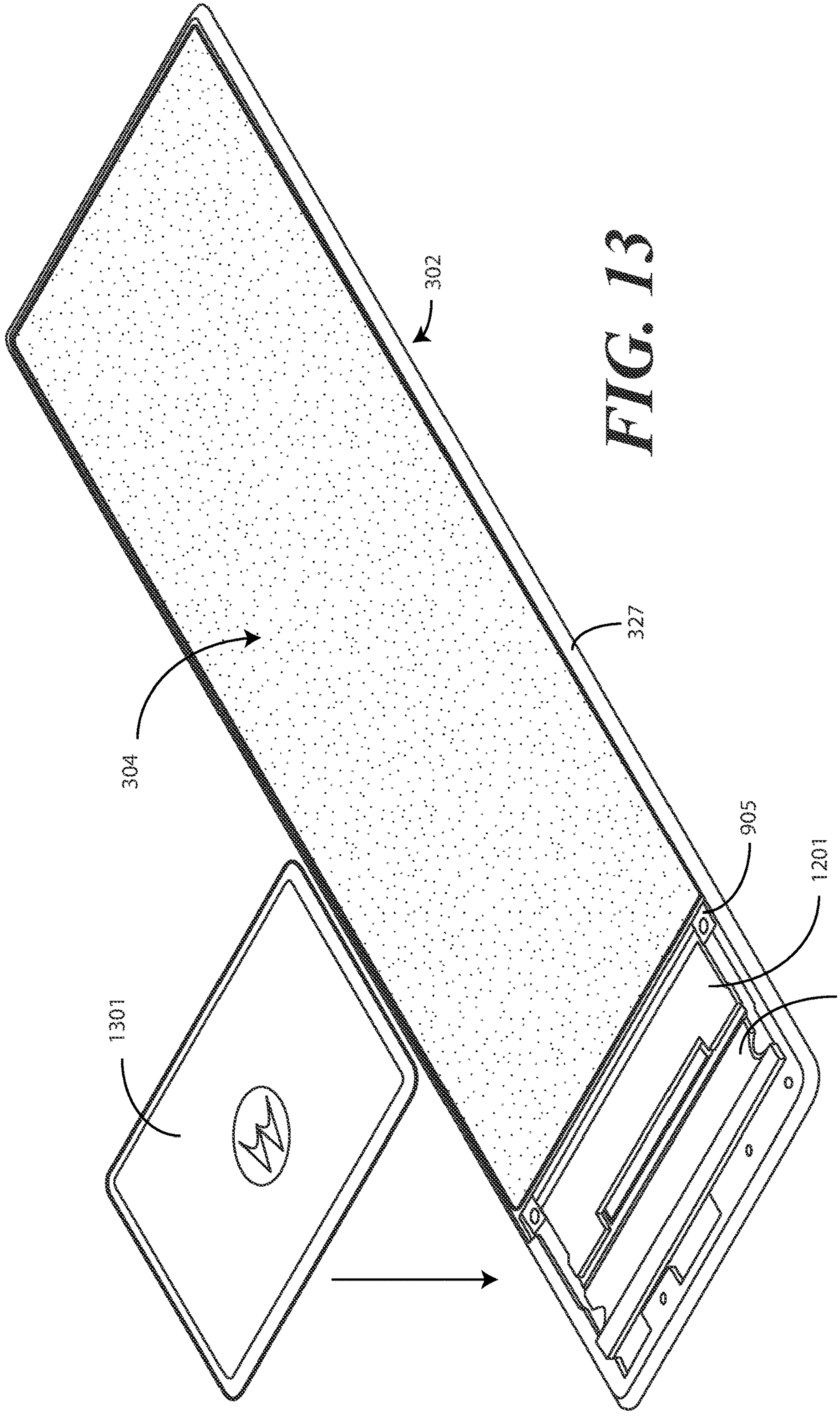
FIG. 13 illustrates explanatory display components in accordance with one or more embodiments of the disclosure.

Turning now to FIG. 13, illustrated therein is the flexible display 304 after being coupled to the blade assembly 302. As shown, the silicone border 327 surrounds the flexible display 304, with the silicone border 327 surrounding and abutting three sides of the flexible display layer.

Figure 14:
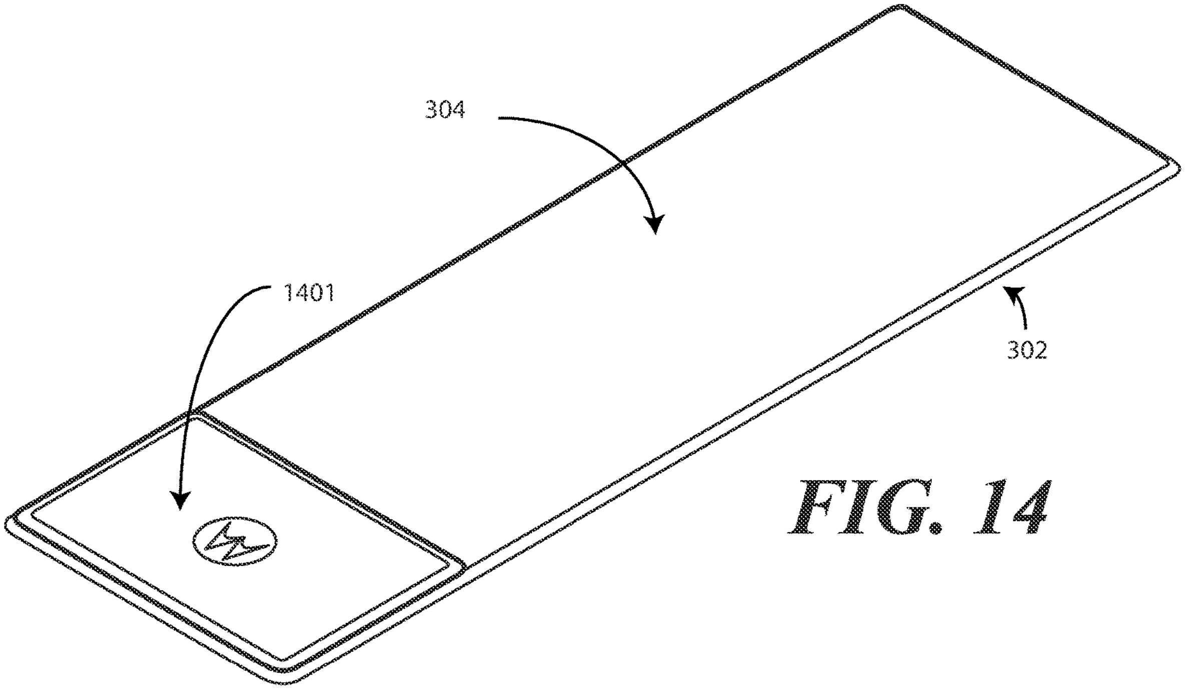
FIG. 14 illustrates one explanatory display assembly in an undeformed state.

A flexible substrate is then connected to the electronic circuits 1201 carried by the T-shaped tongue 1007. Additionally, a tensioner can be coupled to the flexible substrate. Thereafter, a cover 1301 is attached to the silicone border 327 atop the electronic circuits 1201 and other components situated on or around the T-shaped tongue. This portion the blade assembly 302 where the components are stored beneath the cover 1301 is affectionately known as the "backpack." Turning to FIG. 14, illustrated therein is the blade assembly 302 with its backpack 1401 completely configured.

In one or more embodiments, the flexible display 304 and blade assembly 302 are configured to wrap around a minor surface of a device housing where a display roller mechanism is situated. In one or more embodiments, the display roller mechanism includes a rotor that is positioned within a curvilinear section of the flexible display 304 and blade assembly 302. When placed within a device housing of an electronic device, translation of a translation mechanism causes translation of the blade assembly 302, which in turn causes rotation of the rotor. The result is a linear translation of the flexible display 304 and blade assembly 302 across a translation surface of the device housing by drawing the flexible display 304 and the blade assembly 302 around the rotor.

Figure 15:
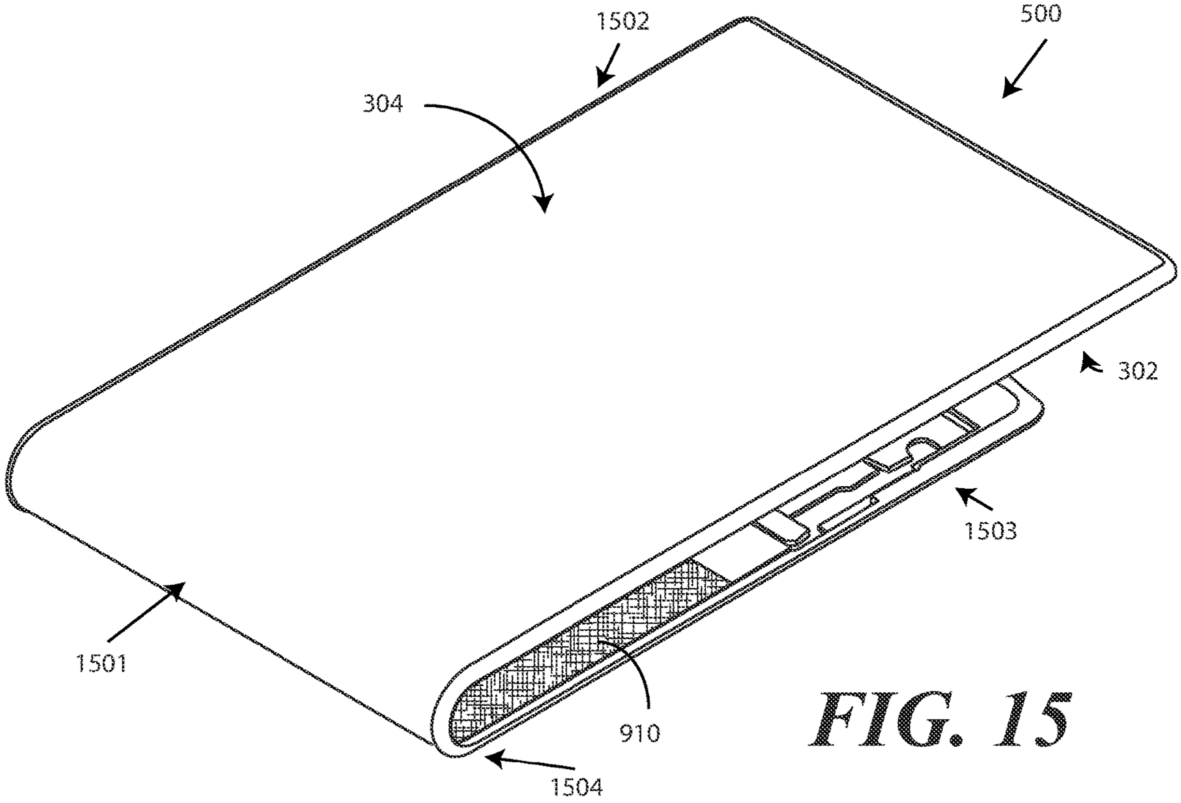
FIG. 15 illustrates the explanatory display assembly of FIG. 14 in a deformed state.
Figure 16:
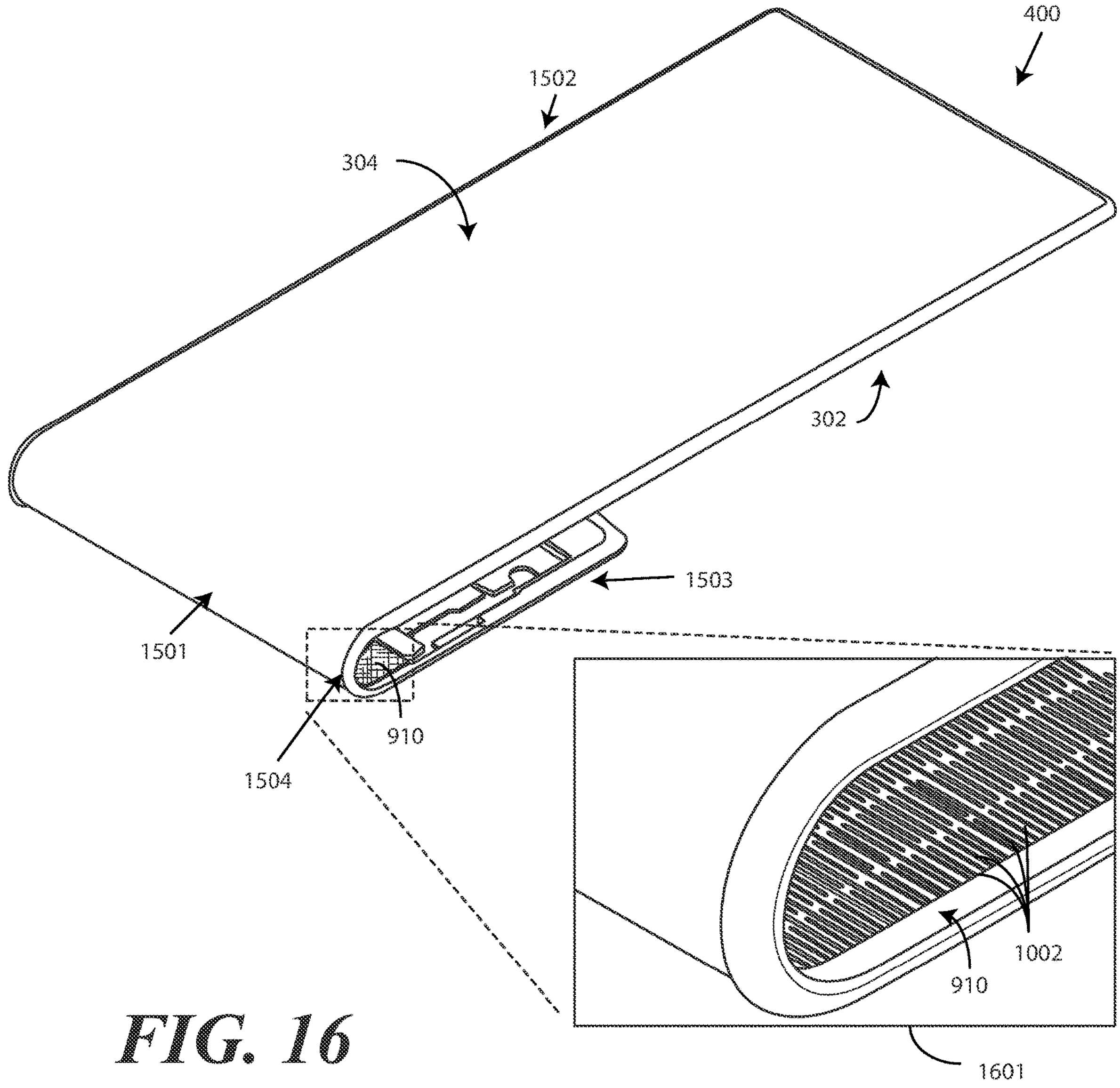
FIG. 16 illustrates the explanatory display assembly of FIG. 14 in another deformed state with an exploded view of a deformable portion of the display assembly shown in a magnified view.

That the blade substrate (325) of the blade assembly 302 includes a flexible portion (1010) allows the blade assembly 302 and flexible display 304 to deform around a device housing, one example of which is the single device housing (301) of FIG. 3. Illustrating by example, turning now to FIGS. 15-16, illustrated therein is the blade assembly 302 and flexible display deformed to create a curvilinear section 1501 and two linear sections 1502,1503. The flexible display 304 and blade assembly 302 are shown as they would be in the retracted position 300 in FIG. 15. The flexible display 304 and the blade assembly 302 are shown as they would be in the extended position 400 in FIG. 16. The enlarged view 1601 of FIG. 16 shows how the apertures defined by the chemical etching of the blade substrate 325 easily allow the blade substrate 325 to bend around the curvilinear section 1501 while maintaining a rigid support structure beneath the flexible display 304 in the two linear sections 1502,1503.

In one or more embodiments, the first linear section 1502 and the second linear section 1503 are configured to slide between the retracted position 300 of FIG. 15 and the extended position 400 of FIG. 16. The flexible display 304 is coupled to the blade assembly 302 and therefore translates with the blade assembly 302 along a translation surface defined by a device housing of an electronic device.

In one or more embodiments, the linear sections 1502, 1503 of the blade assembly 302 are positioned between the flexible display 304 and the translation surface. A rotor is then positioned within a curvilinear section 1501 of the blade assembly 302. When a translation mechanism causes the linear sections 1502,1503 of the blade assembly 302 to move across the translation surface defined by the device housing, the rotor rotates with the flexible portion 1010 passing along the rotor while the rotor rotates.

As shown in FIGS. 15-16, in one or more embodiments a cross section of both the blade assembly 302 and the flexible display 304 defines a J-shape with a curved portion of the J-shape, defined by the curvilinear section 1501, configured to wrap around a rotor and an upper portion of the J-shape, defined by linear section 1502, passing across a translation surface defined by a device housing. When the translators of a translation mechanism drive the blade assembly 302, the upper portion of the J-shape becomes longer as the flexible display 304 translates around the rotor with the blade assembly 302 extending further from of the device housing. This can be seen in FIGS. 15-16 by comparing the extended position 400 of FIG. 16 to the retracted position 300 of FIG. 15.

When the translators of the translation mechanism drive the blade assembly 302 in the opposite direction, e.g., driving the blade assembly 302 from the extended position 400 of FIG. 16 to the retracted position 500 of FIG. 15, the upper portion of the J-shape becomes shorter as the reverse operation occurs. Thus, when the translation mechanism drives the blade assembly 302 carrying the flexible display 304, the flexible display 304 deforms at different locations as it wraps and passes around the rotor.

It should be understood that a more traditional "J-shape" is principally defined when the blade assembly 302 is transitioned to the extended position 400 of FIG. 16. Depending upon the length of the blade assembly 302 and flexible display 304, combined with the amount the translation mechanism can cause the blade assembly 302 to slide around the rotor, the J-shape may transition to other shapes as well, including a U-shape where the upper and lower portions of the blade assembly 302 and/or flexible display 304 are substantially symmetrical. Such a U-shape forms when the blade assembly is in the peek position but is substantially formed in the retracted position 500 of FIG. 5. In other embodiments, depending upon construction, the blade assembly 302 may even transition to an inverted J-shape where the upper portion of the blade assembly 302 and/or flexible display 304 is shorter than the lower portion of the blade assembly 302 and/or flexible display 304, and so forth.

In one or more embodiments, the translators and rotor of the translation mechanism not only facilitate the "extension" of the flexible display 304 that occurs during an extending or "rising" operation, but also works to improve the reliability and usability of the flexible display 304 as well. This is true because the rotor defines a service loop 1504 in the curvilinear section 1501 with a relatively large radius compared to the minimum bending radius of the flexible display 304. The service loop 1504 prevents the flexible display 304 from being damaged or developing memory in the curved state occurring as the flexible display 304 defines the curvilinear section 1501 wrapping around the rotor in the extended position 400, retracted position 500, and peek position (700).

Using such a mechanical assembly, the flexible display 304 maintains a flat upper portion of the J-shape defined by the first linear section 1502 when sliding. Additionally, the flexible display 304 wraps tightly around the rotor with the lower portion of the J-shape defined by the second linear section 1503 remaining flat against the lower surface of a device housing as well. The blade assembly 302 and tensioner combination, which are rigidly affixed to the translation mechanism, precludes the flexible display 304 from crumpling or bunching when sliding around the device housing between the extended position 400, the retracted position 500, and the peek position (700). This rigid coupling combined with moving tensioner ensures a straight and true translation of the flexible display 304 across a first major surface of an electronic device, around the rotor of the electronic device positioned at a minor surface of the device housing, and across a second major surface of the electronic device.

In one or more embodiments additional support components can be attached to the blade assembly 302 to one or more of provide additional support for the flexible display 304, ease translation of the blade assembly 302 around a device housing, or combinations thereof.

As noted above, in one or more embodiments a blade assembly 302 is coupled to the flexible display 304. In contrast to sliding devices that include multiple device housings, embodiments of the disclosure provide an electronic device with a sliding display that includes only on device housing. The blade assembly 302 is configured as a mechanical chassis that allows the flexible display 304 to translate along a translation surface defined by major and minor surfaces of the single device housing.

In one or more embodiments, the blade assembly 302 also provides a mechanical support for portions of the flexible display 304 that extend beyond the top edge of the single device housing when the blade assembly 302 and flexible display 304 are in the extended position. The blade assembly 302 can include a blade substrate (325) that is unitary, but that defines both flexible portions and rigid portions. The blade substrate (325) can comprise the silicone border 327 that surrounds and protects the edges of the flexible display 304.

A low-friction dynamic bending laminate stack (328) and blade (326) can be positioned between the blade assembly 302 and the translation surfaces defined by the single device housing (301). In one or more embodiments, the blade (326) and the low-friction dynamic bending laminate stack (328) are positioned between the blade assembly 302 and the translation surfaces defined a device housing to which the blade assembly 302 is attached. The blade (326) supports portions of the blade assembly 302 and flexible display 304 that extend beyond the top edge of the device housing when the blade assembly 302 is transitioned to the extended position. Since this blade (326) needs to be rigid to support those portions of the blade assembly 302 and the flexible display 304, it is not able to bend around the flexible portions of the blade substrate (325) of the blade assembly 302. To prevent gaps or steps from occurring where the blade (326) terminates, in one or more embodiments a low-friction dynamic bending laminate stack (328) spans the remainder of the blade assembly 302 and abuts the transition surfaces defined by the single device housing.

In one or more embodiments, the blade (326) comprises a layer of steel. In one or more embodiments, the blade (326) has a thickness that is greater than the thickness of either the blade substrate (325) of the blade assembly 302 or the flexible substrate (1005) of the flexible display 304. Illustrating by example, in one or more embodiments the blade (326) comprises a layer of steel having a thickness of five hundred microns or 0.5 mils.

In one or more embodiments, the blade (326) comprises a rigid, substantially planar support layer. Illustrating by example, the blade (326) can be manufactured from aluminum, steel, or stainless steel in one or more embodiments. In another embodiment, the blade (326) is manufactured from a rigid thermoplastic sheet. Other materials can be used in manufacturing the blade substrate (325) as well. For example, nitinol can be used to manufacture the blade (326) as well.

In one or more embodiments, the blade (326) is the stiffest layer of the overall assembly. In one or more embodiments the blade (326) is manufactured from stainless steel with a thickness of about five hundred microns. In another embodiment, the blade (326) is manufactured from carbon fiber. Other materials from which the blade (326) can be manufactured will be obvious to those of ordinary skill in the art having the benefit of this disclosure.

In one or more embodiments, the low-friction dynamic bending laminate stack (328) comprises a plurality of layers. When assembled, the low-friction dynamic bending laminate stack (328) adds a layer to the blade assembly 302 that improves the lubricity of the overall assembly to allow for smooth motion of the blade assembly 302 and flexible display 304 across the translation surfaces of a device housing. Moreover, when abutting a blade (326), the low-friction dynamic bending laminate stack (328) prevents features on other layers of the assembly from degrading the ability of the blade assembly 302 and flexible display 304 to translate across those translation surfaces.

In one or more embodiments, the low-friction dynamic bending laminate stack (328) allows for "low-friction" sliding across a stationary surface combined with the ability to cyclically bend and/or roll around a rotor. In one or more embodiments, the low-friction dynamic bending laminate stack (328) interfaces and abuts the blade (326) to improve lubricity.

In one or more embodiments, the uppermost layer of the low-friction dynamic bending laminate stack (328) is a pressure sensitive adhesive layer. This pressure sensitive adhesive layer allows the low-friction dynamic bending laminate stack (328) to adhere to the underside of the blade assembly 302.

Beneath this pressure sensitive adhesive layer is a strain tolerant foam layer in one or more embodiments. Examples of strain tolerant foams suitable for use as the strain tolerant foam layer include silicone, low-density polyethylene, or other materials that provide sufficient thickness so as to allow the low-friction dynamic bending laminate stack (328) to match the thickness of the blade (326) while reducing internal stresses and allowing bending.

Beneath the strain tolerant foam layer is another pressure sensitive adhesive layer in one or more embodiments. This pressure sensitive adhesive layer couples a flexible substrate having a strain relief cutout pattern formed therein. The flexible substrate can be manufactured from metal or plastic or other materials. Illustrating by example, in one or more embodiments the flexible substrate comprises a steel layer with a thickness of about thirty microns. While thin, flexible steel works well in practice, it will be obvious to those of ordinary skill in the art having the benefit of this disclosure that other materials can be used for the flexible substrate as well. For instance, in another embodiment the flexible substrate is manufactured from a thin layer of thermoplastic material.

Another layer of pressure sensitive adhesive then couples the flexible substrate to a low-friction layer in one or more embodiments. In one or more embodiments, the low-friction layer comprises a substrate with Teflon.sup.™ attached thereto. In another embodiment, the low-friction layer comprises a layer of polytetrafluoroethylene, which is a synthetic fluoropolymer of tetrafluoroethylene. This material is best known for its non-stick properties and adds a lubricity to the low-friction dynamic bending laminate stack (328) that allows the overall assembly to slide smoothly. Moreover, the low-friction layer prevents the strain relief cutout pattern in the flexible substrate from snagging on surface imperfections and transitions on the device housing to which the assembly is attached. In short, the low-friction layer greatly improves the lubricity of the overall assembly.

FIGS. 17-22 illustrate the electronic device 101 of FIG. 3 as fully assembled in both the extended position 400 and retracted position 500. Embodiments of the disclosure contemplate that in addition to having distinctly unique utilitarian features, electronic devices configured in accordance with embodiments of the disclosure have distinctly unique ornamental features as well. Many of these ornamental features are visible in FIGS. 17-22.

Figure 17:
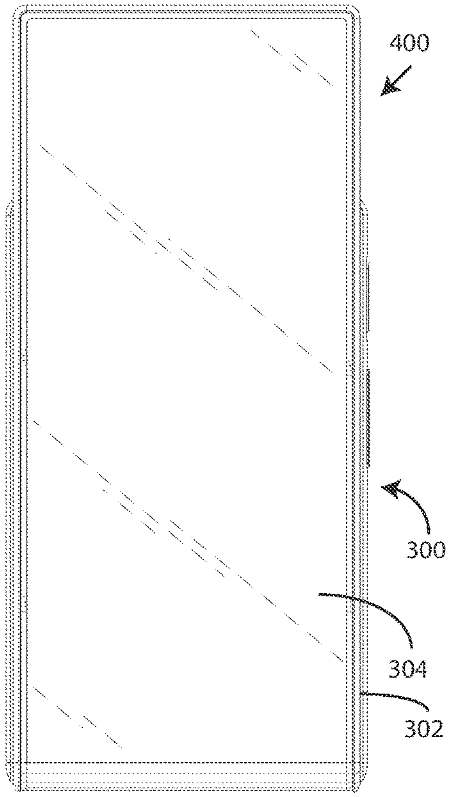
FIG. 17 illustrates a front elevation view of one explanatory electronic device in accordance with one or more embodiments of the disclosure with the blade assembly in an extended position.
Figure 18:
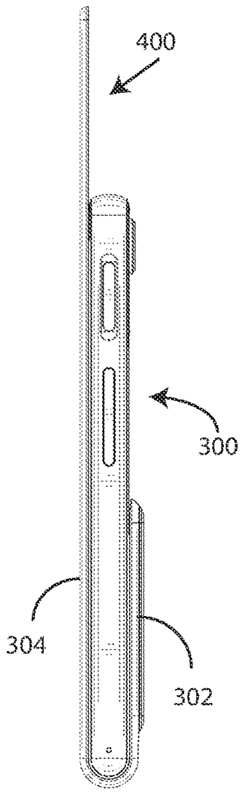
FIG. 18 illustrates a left side elevation view of one explanatory electronic device in accordance with one or more embodiments of the disclosure with the blade assembly in an extended position.
Figure 19:
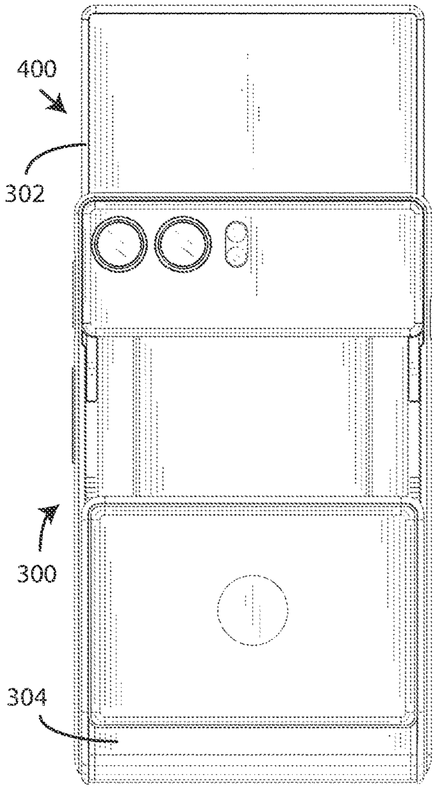
FIG. 19 illustrates a rear elevation view of one explanatory electronic device in accordance with one or more embodiments of the disclosure with the blade assembly in an extended position.

FIG. 17 illustrates a front elevation view of the electronic device 101 in the extended position 400, while FIG. 18 illustrates a side elevation view of the electronic device 101 in the extended position 400. FIG. 19 then provides a rear elevation view of the electronic device 101 in the extended position 400 as well.

Figure 20:
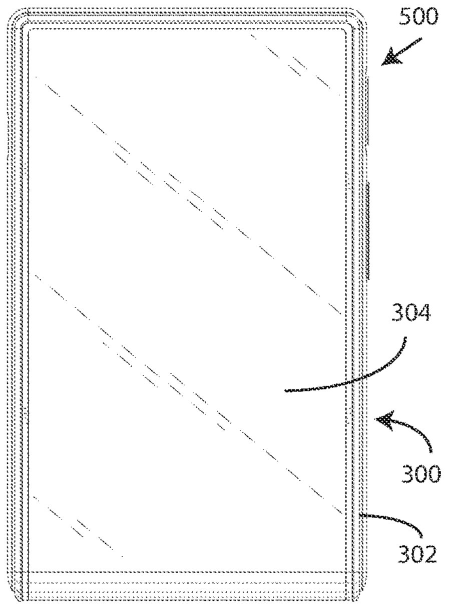
FIG. 20 illustrates a front elevation view of one explanatory electronic device in accordance with one or more embodiments of the disclosure with the blade assembly in a retracted position.
Figure 21:
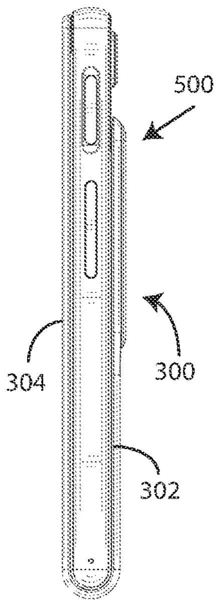
FIG. 21 illustrates a left elevation view of one explanatory electronic device in accordance with one or more embodiments of the disclosure with the blade assembly in a retracted position.
Figure 22:
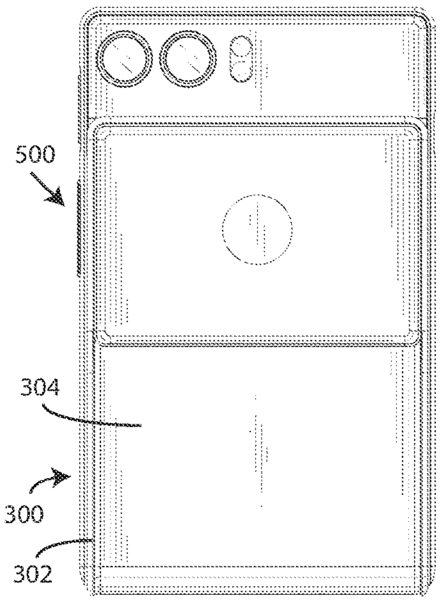
FIG. 22 illustrates a rear elevation view of one explanatory electronic device in accordance with one or more embodiments of the disclosure with the blade assembly in a retracted position.

FIG. 20 illustrates a front elevation view of the electronic device 101 in the retracted position 500, while FIG. 21 illustrates a side elevation view of the electronic device 101 in the retracted position 500. FIG. 22 then provides a rear elevation view of the electronic device 101 in the retracted position 500.

As can be seen by comparing these figures, the blade assembly 302 is able to slide around the single device housing 301 such that the blade 326 slides away from the single device housing 301 to change the apparent overall length of the flexible display 304 as viewed from the front of the electronic device 101. The blade assembly 302 can also slide in an opposite direction around the single device housing 301 to the retracted position 500, where similar amounts of the flexible display 304 are visible on the front side of the electronic device 101 and the rear side of the electronic device 101. Graphics, images, user actuation targets, and other indicia can be presented anywhere on the flexible display 304, including on the front side of the electronic device 101, the rear side of the electronic device 101, or the lower end of the electronic device 101.

Figure 24:
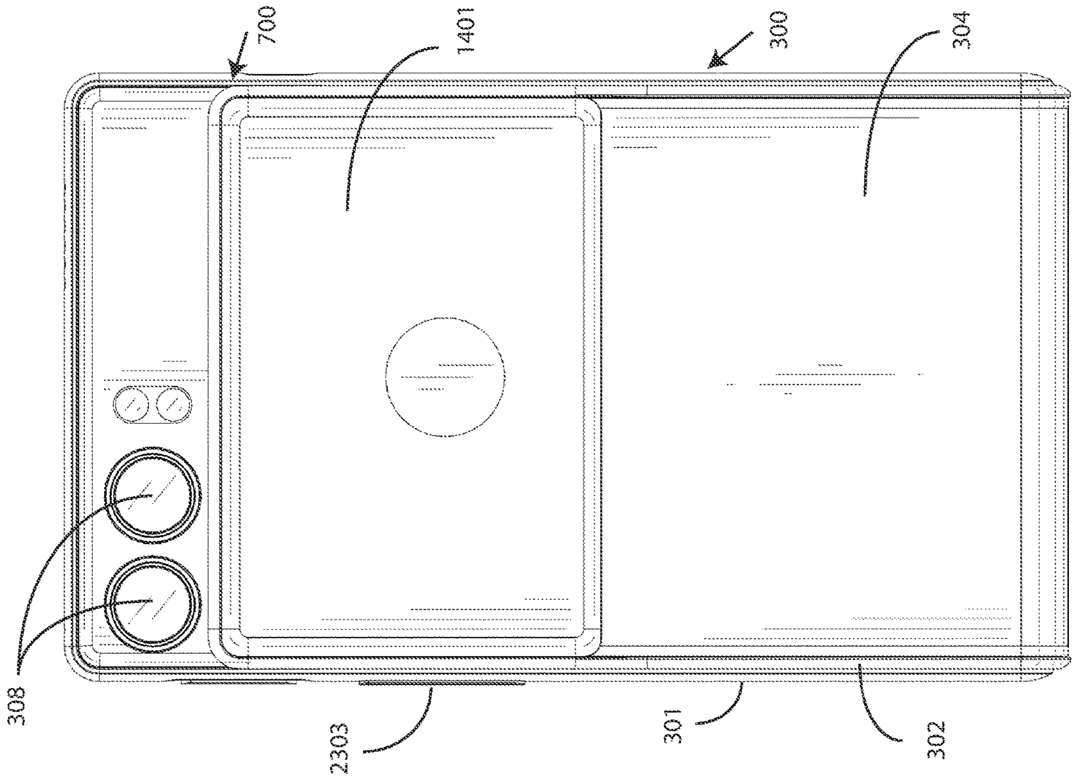
FIG. 24 illustrates a rear elevation view of one explanatory electronic device in accordance with one or more embodiments of the disclosure with the blade assembly in a peek position revealing a front facing image capture device.
Figure 23:
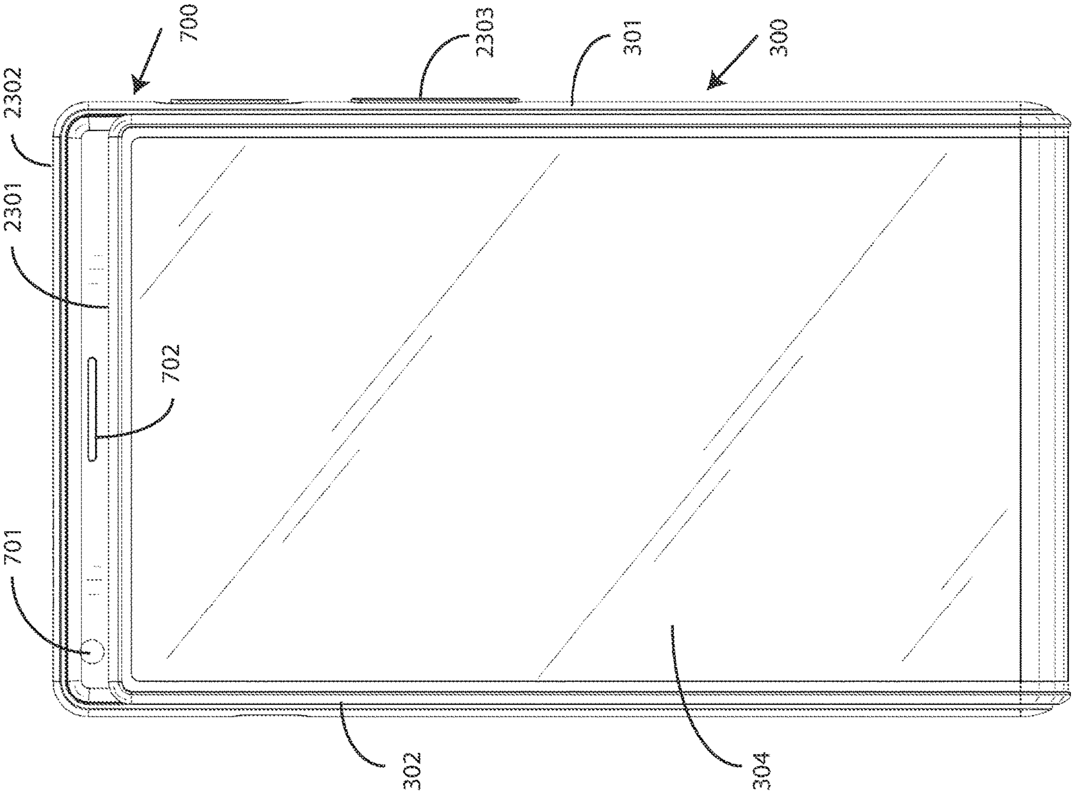
FIG. 23 illustrates a front elevation view of one explanatory electronic device in accordance with one or more embodiments of the disclosure with the blade assembly in a peek position revealing a front facing image capture device.

While much attention to this point has been paid to the unique translation of the blade assembly and flexible display between the extended position and the retracted position, one of the other truly unique features offered by embodiments of the disclosure occur when the blade assembly and flexible display transition to the peek position. Turning now to FIGS. 23-24, illustrated therein is the electronic device 101 in this peek position 700.

As shown in FIG. 23, in one or more embodiments when the blade assembly 302 and flexible display 304 transition to the peek position 700, the backpack 1401 moves toward beyond the retracted position (500) toward the rear-facing image capture devices. When this occurs, an upper edge 2301 of the blade assembly 302 moves below an upper edge 2302 of the single device housing 301. In one or more embodiments, this reveals a front-facing image capture device 701 or imager that situates beneath the blade assembly 302 when the blade assembly 302 is in the retracted position (500).

In one or more embodiments, the translation of the blade assembly 302 and flexible display 304 to the peek position 700 occurs automatically. Illustrating by example, in one or more embodiments when the front-facing image capture device 701 is actuated, the one or more processors (314) of the electronic device 101 cause the blade assembly 302 to translate to the peek position 700, thereby revealing this image capture device 701. (In the explanatory embodiment of FIGS. 23-24, a loudspeaker 702 is also revealed.) Once image capture operations utilizing the image capture device 701 are complete, the one or more processors (314) can cause the blade assembly 302 to transition back to the retracted position, which again covers and occludes the image capture device 701.

In other embodiments, the transition to the peek position 700 is manually initiated through actuation of a button or other user interface control. Illustrating by example, a single press of the button 2303 might cause the blade assembly 302 to transition to the extended position (400), while a double press of the button 2303 causes the blade assembly 302 to return to the retracted position (500). A long press of the button 2303 may cause the blade assembly 302 to transition to the peek position 700 of FIG. 7, and so forth. Other button operation schema will be obvious to those of ordinary skill in the art having the benefit of this disclosure. In other embodiments, delivery of user input to the flexible display 304 in the form of a swipe gesture can be used to cause the transition to the peek position 700 as well.

By positioning the front-facing image capture device 701 beneath the blade assembly 302 and its corresponding opaque blade (326) when in normal operation, embodiments of the disclosure provide a privacy guarantee to users of the electronic device 101. Said differently, by positioning the image capture device 701 beneath the blade assembly 302 and the flexible display 304 when these components are in either the retracted position (500) or the extended position (400), a user of the electronic device 101 is mechanically assured of privacy due to the fact that it is physically impossible for the image capture device 701 to perform image capture operations through the blade (326) of the blade assembly 302.

Accordingly, even if the electronic device 101 is accessed by a hacker or other nefarious actor, the user can be assured that the image capture device 701 cannot capture images or videos while the blade assembly 302 and flexible display 304 are in the retracted position (500), the extended position (400), or in positions therebetween. Only when the blade assembly 302 and the flexible display 304 transition to the peek position 700, thereby revealing the image capture device 701, can the image capture device 701 capture front-facing images or front-facing videos.

Embodiments of the disclosure contemplate that in an electronic device having a translating display, the user generally must manually select whether the display is transitioned to the extended position, the retracted position, or the peek position. Illustrating by example, the user might have to press a button once to cause the translating display to transition to the extended position and twice to cause the translating display to transition to the retracted position. A "long press" of the button may be required to cause the translating display to transition to the peek position, and so forth.

This manual actuation requires the user to take a manual action to change the state of the electronic device. Additionally, this requirement potentially delays the usability of the electronic device in the new state due to the time taken to manually "inject" the trigger causing transition of the translating display by pressing the button.

Advantageously, the embodiments of the disclosure can automatically and pre-emptively move the translating display to the optimal state as a function of an aspect ratio of a content presentation companion device. As noted above, when an electronic device is equipped with a translating display, the position of the translating display relative to the device housing will change the amount of the translating display that is visible from the front, visible from the rear, and visible in the curved end portions. This translation of the translating display can also change the ability to present content in a particular aspect ratio. Whereas electronic devices with non-moving displays have a fixed aspect ratio, electronic devices with a translating display have available display space that changes as the translating display moves around the device housing.

With electronic devices having displays with fixed aspect ratios, applications operating on such displays try to adapt to whatever that fixed aspect ratio might be. They might crop, scale, or stretch content, for example. However, most of the time this is a compromise as the application generally is designed with an optimal aspect ratio for the best user experience. Scaling, filling, and stretching can result in multiple usability issues. These include black and white borders on the edges of the display, gaming or application controls not placed in optimal positions, or, worse, the graphics being skewed to adjust the display size. Working around these problems using cropping, scaling, or stretching generally results in either a loss in image quality or a loss of portions of the image.

Illustrating by example, as anyone who has ever owned a "wide screen" television with a 16:9 aspect ratio understands, scaling does not result in a change of the aspect ratio. To be sure, when viewing content created at a 4:3 aspect ratio on a 16:9 aspect ratio device, attempting to scale the content to fit causes the content appears with black bars at the left and right sides of the image. Said differently, when the height of the 4:3 content is scaled to match the height of the 16:9 device, black bars appear to the left and right of the image.

Prior art systems in devices having fixed displays with fixed aspect ratios have tried to develop solutions to this "black bar" issue. However, none of them cause the image to fill the screen without distortion. This is true because each is a scaling operation. Using these scaling operations, distortion is introduced.

Illustrating by example, fixed aspect ratio device manufacturers typically offer the user an alternate selection to the standard "fit" mode, allowing the user to choose between either "zoom" mode or "stretch" mode. "Zoom" mode, which is also known as a "fill" mode or a "crop" mode, scales the 4:3 content larger. With this option, the 4:3 content is scaled until the width of the 4:3 content matches the width of the 16:9 screen. This scaling operation keeps the content of the image in the proper perspective. However, this results in the top and bottom of the 4:3 content being "cut off" when they spill beyond the visible area of the screen.

With the "stretch" option, the perspective is completely destroyed, as the height of the 4:3 content is held constant while the width is stretched to match the 16:9 display. This results in distortion of the image, causing things to become wider, fatter, and flatter.

By contrast, changing the aspect ratio changes the proportional relationship of the height and width of the image itself. Thus, the aspect ratio is not simply a measurement of height and width. To the contrary, it is the smallest usable ratio of the major dimension to the minor dimension.

Figure 25:
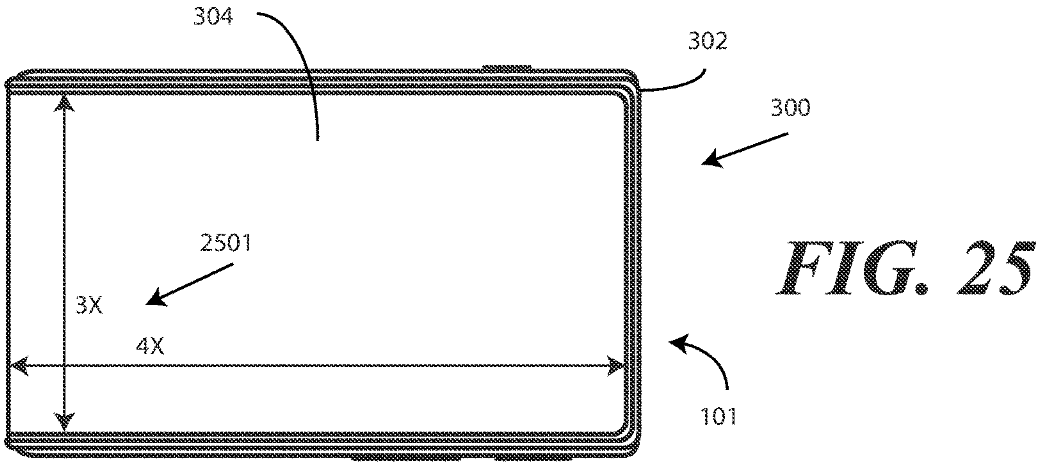
FIG. 25 illustrates an explanatory electronic device in accordance with one or more embodiments of the disclosure with a translating display in a retracted position and having a front-facing portion having a first aspect ratio.
Figure 26:
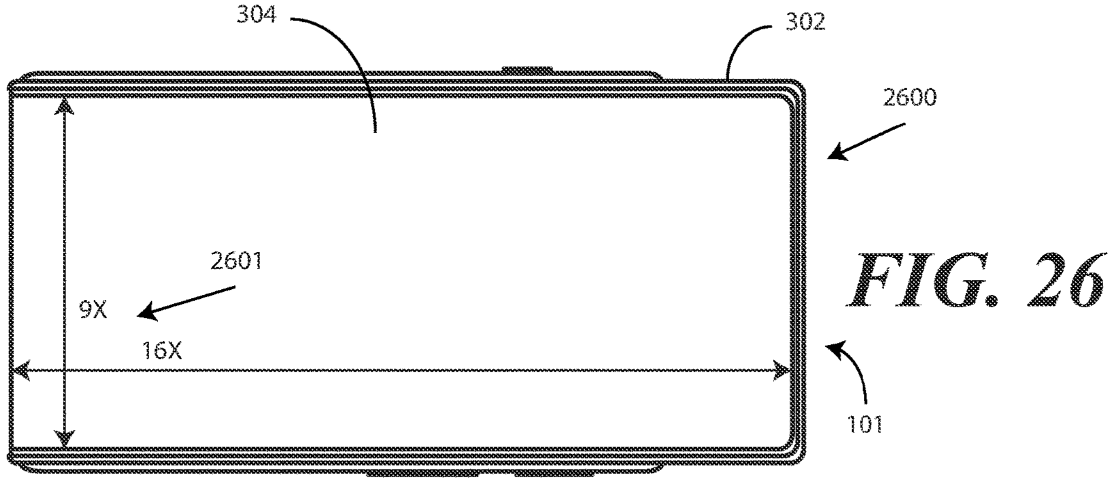
FIG. 26 illustrates an explanatory electronic device in accordance with one or more embodiments of the disclosure with a translating display in a partially extended position and having a front-facing portion having a second aspect ratio.
Figure 27:
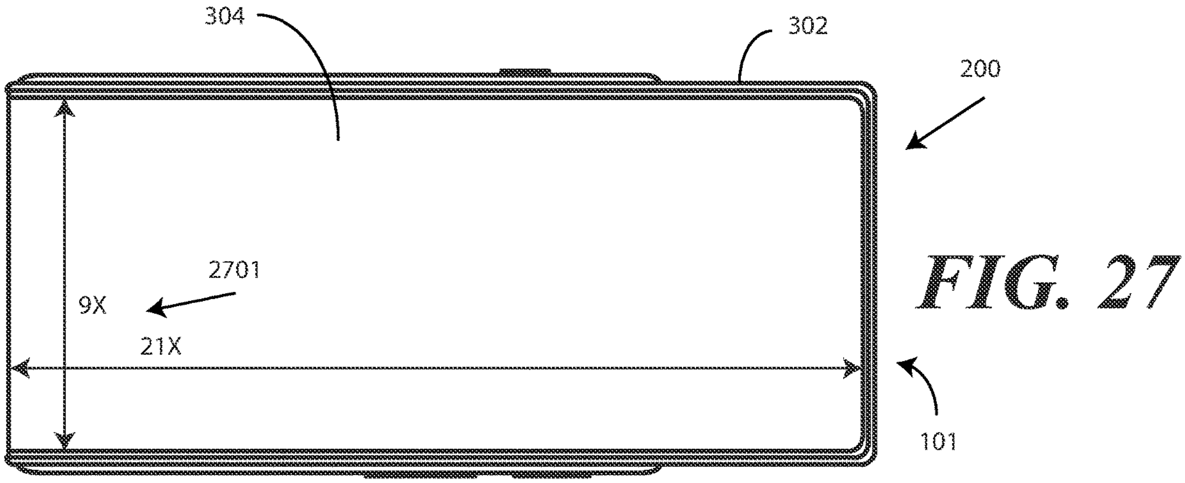
FIG. 27 illustrates an explanatory electronic device in accordance with one or more embodiments of the disclosure with a translating display in an extended position and having a front-facing portion having a third aspect ratio.

Since electronic devices configured in accordance with embodiments of the disclosure have a translating display, one or more processors of the electronic device can cause the translating display to transition to different positions relative to the single device housing with those positions corresponding to a myriad of different aspect ratios. Turning now to FIGS. 25-27, illustrated therein are three such examples.

Beginning with FIG. 25, in this configuration the flexible display 304 and blade assembly 302 of the electronic device 101 are transitioned to the retracted position 300 with the electronic device 101 being turned to the landscape orientation in three-dimensional space. As shown in FIG. 25, this results in the portion of the flexible display 304 that is visible from the front of the electronic device having an aspect ratio 2501 that is a 3:4 or "conventional" aspect ratio.

By contrast, in FIG. 26 the flexible display 304 and blade assembly 302 of the electronic device 101 have been transitioned to an intermediate position 2600 between the retracted position 300 and the extended position 200. This results in the portion of the flexible display 304 that is visible from the front of the electronic device having an aspect ratio 2601 that is a 9:16 or "widescreen" aspect ratio.

In FIG. 27 the flexible display 304 and blade assembly 302 of the electronic device 101 have been transitioned to the extended position 200. This results in the portion of the flexible display 304 that is visible from the front of the electronic device having an aspect ratio 2701 that is a 9:20 or "novel" aspect ratio.

Advantageously, in one or more embodiments one or more processors (314) of the electronic device 101 have knowledge of the position of the translating display relative to the device housing. In one or more embodiments, the one or more processors (314) can then adjust the display size to accommodate a wide range of aspect ratios 2501,2601,2701 suitable for presentation on a portion of the translating display in a particular position. In one or more embodiments, the one or more processors (314) leverage this capability to automatically adapt the display size to the most optimal aspect ratio as a function of the aspect ratio of a content presentation companion device and presenting content on the translating display.

Advantageously, this ability to accommodate multiple aspect ratios on a single translating display by changing the position of the translating display relative to the device housing completely avoids the black bars and cropping and stretching problems plaguing the prior art. After determining the aspect ratio of a content presentation companion device (102) that is in communication with the electronic device 101, the one or more processors (314) can cause the translation mechanism to move the translating display to the proper position to match that content presentation companion device aspect ratio. Advantageously, this allows content to be presented in accordance with the optimal user experience based upon the type of content presentation companion device being used.

Accordingly, in one or more embodiments one or more processors facilitate an automatic optimal display size adjustment based upon an aspect ratio of a content presentation companion device. As will be explained below with reference to FIG. 30, in other embodiments the one or more processors facilitate an automatic display size adjustment based upon the aspect ratio of another electronic device in communication with a content presentation companion device such that each electronic device in communication with the content presentation companion device has the same aspect ratio.

This "optimal aspect ratio" position of the flexible display 304 and blade assembly 302 can be determined in multiple ways. In one or more embodiments. The one or more processors (314) of the electronic device 101 determine the aspect ratio by extracting a display size of the content presentation companion device from EDID received by the communication device (316) of the electronic device from the content presentation companion device.

Alternatively, the one or more processors (314) determine the aspect ratio of the content presentation companion device by parsing a product identification code from EDID received by the communication device from the content presentation companion device in response to the query. The one or more processors (314) can parse the product identification code by transmitting an aspect ratio query comprising the product identification code to a remote electronic device. The remote electronic device can then send response comprising the aspect ratio of the content presentation companion device. In still other embodiments, an application operating on the one or more processors (314) of the electronic device 101 can request an aspect ratio of the content presentation companion device.

Now that various hardware components have been described, attention will be turned to methods of using electronic devices in accordance with one or more embodiments of the disclosure, operating steps performed by electronic devices in accordance with one or more embodiments of the disclosure, and advantages, features, and benefits provided by electronic devices configured in accordance with embodiments of the disclosure. Attention will now be turned to methods for using the electronic devices described above, and more particularly, to automatic movement of the flexible display 304 and blade assembly 302 in response a controller user interface that is to be presented on the flexible display 304 when the electronic device 101 is operating in a control mode of operation controlling content being delivered to a content presentation companion device 102 in accordance with one or more embodiments of the disclosure.

In one or more embodiments, when coupled by an electrical communication channel to an electronic device 101, the content presentation companion device 102 can function as a primary display for the electronic device 101. The electronic device 101 can receive content from a terrestrial broadcast network, cable television network, Internet streaming service, or combinations thereof, and redirect this content to the content presentation companion device 102, using the content presentation companion device integration manager (208) since its display (201) is larger than the display of the electronic device 101. When a gaming application, for example, is operating on one or more processors (314) of the electronic device 101, the output of the gaming application, examples of which include characters, scenes, and other depictions, can be presented on the display (201) of the content presentation companion device 102.

Effectively, the electronic device 101 is the source of content that could be presented on the display 304 of the electronic device 101, but that is instead redirected to the content presentation companion device 102. This allows people within the environment of the electronic device 101 or content presentation companion device 102 to more easily see the content. In one or more embodiments, content flows from the electronic device 101 to the content presentation companion device 102 through the communication device (316).

As will be described in more detail below with reference to the subsequent methods and method steps, the electronic device 101 can establish, with the communication device (316), an electrical communication channel with the content presentation companion device 102. Either automatically or, alternatively, in response to queries from the electronic device 101, the content presentation companion device 102 can transmit an EDID file structure describing the aspect ratio of the content presentation companion device 102. The electronic device 101 can then cause a translation mechanism to transition the blade assembly 302 to a position where a front-facing portion of the flexible display has dimensions corresponding to the aspect ratio of the content presentation companion device 102.

Figure 28:
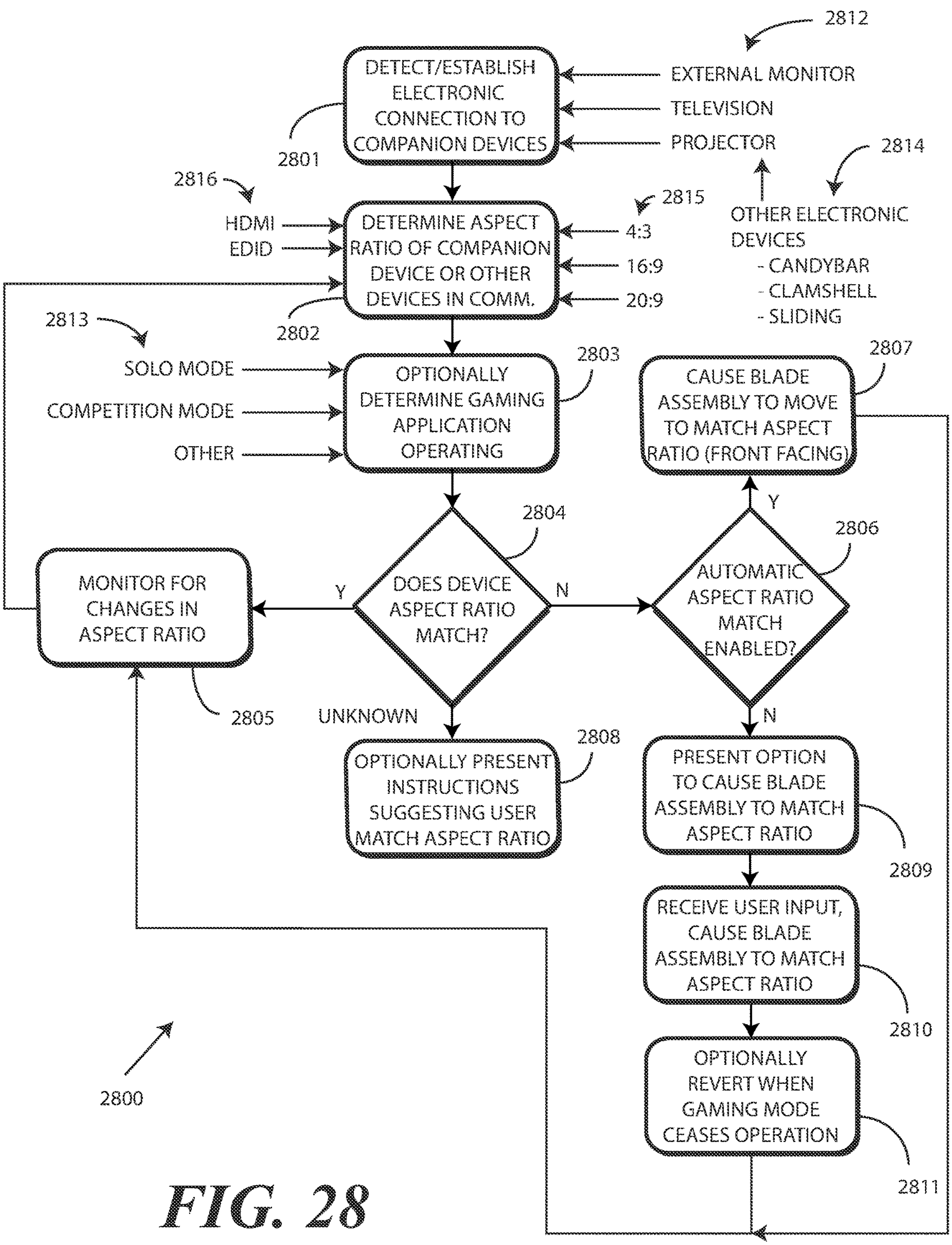
FIG. 28 illustrates one explanatory method in accordance with one or more embodiments of the disclosure.

Turning now to FIG. 28, illustrated therein is one explanatory method 2800 suitable for use with and/or in an electronic device in accordance with one or more embodiments of the disclosure. Beginning at step 2801, a communication device of the electronic device detects the establishment of an electrical communication channel with content presentation companion device 2812, examples of which include an external monitor, a television, or a projector. These examples of a content presentation companion device 2812 are illustrative only, as numerous others will be obvious to those of ordinary skill in the art having the benefit of this disclosure.

In one or more embodiments, the content presentation companion device 2812 may be in communication with another electronic device 2814. Illustrating by example, a first smartphone operated by a first user may be in communication with a television monitor while a second smartphone operated by a second user may be in communication with the same television monitor. Such may be the case, for example, when the first user and the second user are playing a game with the game being visible on the television monitor while the first and second smartphones are used as controllers.

In one or more embodiments as will be explained below, the translation mechanism of a smartphone having a device housing and a blade assembly supporting a flexible display that is slidable around the device housing between an extended position where the blade assembly extends beyond an edge of the device housing and a retracted position where a major surface of the blade assembly abuts a major surface of the device housing without extending beyond the edge of the device housing can have its translation mechanism transition the blade assembly to a position where a front-facing portion of the flexible display has dimensions corresponding to an aspect ratio of the second smartphone rather than that of the content presentation companion device. Accordingly, if the first user is using a sliding device and the second user is using a candy bar device, the translation mechanism of the sliding device can cause the aspect ratio of the front-facing portion of the flexible display to match the aspect ratio of the candy bar device so that neither player is disadvantaged by controller screen size. An example of how this can occur is illustrated below with reference to FIG. 31.

In one or more embodiments, the electrical communication channel between the content presentation companion device 2812 and the electronic device comprises a wireless electrical communication channel. In other embodiments, the electrical communication channel between the content presentation companion device 2812 and the electronic device occurs through a wire, one example of which is an HDMI cable.

When the electronic device is electronically in communication with the content presentation companion device 2812, the content presentation companion device integration manager of the electronic device is able to leverage the larger display of the content presentation companion device 2812 to present content. If, for example, a gaming application is operating on the content presentation companion device 2812, one or more processors of the electronic device can cause a communication device of the electronic device to deliver content in the form of a game to the content presentation companion device 2812 for presentation on the larger display of the content presentation companion device 2812. Meanwhile, the electronic device can be used as a controller to control the game being presented on the content presentation companion device 2812.

At step 2802, the method 2800 determines an aspect ratio 2815 of one or both of the content presentation companion device 2812 and/or any other electronic devices 2814 that are electronically communicating with the content presentation companion device 2812. Examples of typical aspect ratios 2815 that the content presentation companion device 2812 and/or the other electronic devices 2814 may have include 4:3, 16:9, or 20:9, although other aspect ratios 2815 will be obvious to those of ordinary skill in the art having the benefit of this disclosure. Illustrating by example, in one or more embodiments the content presentation companion device 2812 comprises a projector and the aspect ratio is fixed at 20:9.

The determination of the aspect ratio 2815 of one or both of the content presentation companion device 2812 and/or any other electronic devices 2814 that are electronically communicating with the content presentation companion device 2812 can occur in a variety of ways. In one or more embodiments, the electronic device determines the aspect ratio 2815 of one or both of the content presentation companion device 2812 and/or any other electronic devices 2814 that are electronically communicating with the content presentation companion device 2812 by receiving data 2816 from the content presentation companion device 2812. In one or more embodiments, this data 2816 comprises an EDID file structure. In other embodiments, this data 2816 comprises data in accordance with an HDMI standard that provides content presentation companion device information upon establishment of an HDMI connection. Other examples of data 2816 will be obvious to those of ordinary skill in the art having the benefit of this disclosure.

In some embodiments, the electronic device will query the content presentation companion device 2812 to determine the aspect ratio 2815. Embodiments of the disclosure contemplate that many monitors (defined as having a display of less than forty-three inches and a wired interface for coupling to a companion device) will use the HDMI standard since they are coupled to any source device by a wire. Accordingly, in one or more embodiments this standard is used to deliver the aspect ratio of the content presentation companion device 2812 to the electronic device. In other embodiments, an EDID file structure can transmit the aspect ratio 2815 of the content presentation companion device 2812. Where the EDID standard is used to transmit the aspect ratio 2815 of other electronic devices 2814 in electronically in communication with the content presentation companion device 2812, an EDID extension can be used as will be described below.

In one or more embodiments the content presentation companion device 2812 identifies its aspect ratio 2815 by transmitting an EDID file structure to the electronic device. Said differently, in one or more embodiments one or more processors of the electronic device determine the aspect ratio 2815 of the content presentation companion device 2812 by extracting a display size of the content presentation companion device 2812 from EDID received by the communication device of the electronic device from the content presentation companion device 2812.

When ascertaining the aspect ratio 2815 of the other electronic devices 2814 electronically in communication with the content presentation companion device 2812, these aspect ratios 2815 can be determined using a modified EDID communication. In one or more embodiments, this modified EDID communication comprises the transmission of an EDID file structure and an EDID extension that identifies the aspect ratios 2815 of the other electronic devices 2814 in communication with the content presentation companion device 2812. Accordingly, in one or more embodiments step 2802 comprises extracting the aspect ratios 2815 from an EDID extension.

Turning briefly to FIG. 30, illustrated therein is an EDID file structure 3000. The EDID file structure 3000 is a standardized communication protocol that allows a display to inform a source as to the operating capabilities it possesses. Using the EDID file structure 3000, a content presentation companion device can inform a source device regarding operating characteristics such as native resolution, display size, aspect ratio, color definition, and other supported features. The EDID file structure 3000 can even identify the manufacturer and serial number of the content presentation companion device.

As shown in FIG. 30, one of the standard fields included with the EDID file structure 3000 are the dimensions 3002 of the display of the content presentation companion device. These dimensions 3002 define the aspect ratio of the display. Accordingly, in one or more embodiments one or more processors of an electronic device can determine the aspect ratio of a content presentation companion device by extracting these dimensions 3002 of the content presentation companion device from the EDID file structure 3000 when the same is received by the communication device from the content presentation companion device.

Communication of the EDID file structure 3000 allows the electronic device to cause its translation mechanism to transition the blade assembly of the electronic device to a position where a front-facing portion of the flexible display has dimensions corresponding to the aspect ratio defined by these dimensions 3002. Developed by the Video Electronic Standards Association (VESA), the EDID file structure 3000 allows for far more information to be delivered from a content presentation companion device to a source device than, for example, having dedicated pins attempt to carry information using binary signals.

As shown in FIG. 30, the EDID file structure 3000 defines a 128-byte data structure that includes manufacturer and operation-related data. This information includes a vendor/product identification block, an EDID structure version and revision, basic display parameters and features, color characteristics, established timings, standard timing information, and detailed timing descriptions.

Relevant to embodiments of the disclosure where an electronic device is attempting to adjust its aspect ratio to that of other electronic devices in communication with a content presentation companion device, the EDID file structure 3000 also allows for an extension flag 3001 to be set. The extension flag 3001, when set, indicates that an extension, which is an additional 128-byte block of data, will be included with the EDID file structure 3000 to describe increased capabilities. Such an EDID extension is used in accordance with one or more embodiments of the disclosure.

Turning now to FIG. 31, illustrated therein is one explanatory EDID extension 3100 configured in accordance with one or more embodiments of the disclosure. As shown, the EDID extension 3100 includes a payload field 3101 comprising the identity of the aspect ratios of other electronic devices that are in communication with the content presentation companion device. Accordingly, an electronic device can parse this the payload field 3101 to determine the same.

Turning now back to FIG. 28, step 2802 can also comprise reading the EDID file structure (3000) to extract a product identification code, examples of which include the manufacturer and serial number of the content presentation companion device. Step 2802 can then parse this product identification code by sending the product identification code to a remote electronic device, examples of which include servers operated by the manufacturer, public information servers, service servers, content presentation companion device support servers, social media servers, and so forth, seeking a response regarding what exactly is the aspect ratio 2815 of the content presentation companion device 2812. A response can be received thereafter indicating the same.

In still other embodiments, step 2802 can comprise an electronic device determining the aspect ratio 2815 using one or more sensors. Illustrating by example, an image capture device might capture one or more images of the content presentation companion device to determine the aspect ratio 2815. Other techniques for determining the aspect ratio 2815 of the content presentation companion device 2812 and/or other electronic devices 2814 in communication with the content presentation companion device 2812 will be obvious to those of ordinary skill in the art having the benefit of this disclosure.

Step 2803 optionally determines that a gaming application is actively operating on one or more processors of the electronic device. Step 2803 can also include confirming that the gaming application is generating content for presentation to a user. The content can include a gaming control interface, characters of the game, scenes of the game, scores of the game, and so forth.

In one or more embodiments, step 2803 further comprises querying, with a communication device, the content presentation companion device 2812 for an identification of operating modes 2813 available on the electronic device. Examples of the operating modes 2813 include a normal mode of operation, a solo gaming mode of operation where one person is playing a game, and a competition gaming mode where more than one person is playing a game. An example of the solo gaming mode of operation will be illustrated below with reference to FIG. 29, while an example of a competition gaming mode will be illustrated below with reference to FIG. 31. Other operating modes will be obvious to those of ordinary skill in the art having the benefit of this disclosure.

Decision 2804 then determines whether the aspect ratio of the electronic device and the aspect ratio 2815 of the content presentation companion device 2812 and/or the electronic devices 2814 in communication with the content presentation companion device 2812 match. Where they do, step 2805 monitors for any changes that may occur, such as might be the case when an electronic device 2814 in communication with the content presentation companion device 2812 is a sliding device and changes its aspect ratio 2815. Otherwise, the position of the blade assembly on the electronic device is left alone.

Embodiments of the disclosure contemplate that there can be instances where an electronic device is unable to determine the aspect ratio 2815 of the content presentation companion device 2812 and/or the electronic devices 2814 in communication with the content presentation companion device 2812. In such situations, step 2808 can present prompt that one or both of inform the user that there may be a mismatch between the aspect ratio of the electronic device and the aspect ratio 2815 of the content presentation companion device 2812 and/or the electronic devices 2814 in communication with the content presentation companion device 2812 and/or suggest that the user look into checking to see whether the aspect ratio of the electronic device and the aspect ratio 2815 of the content presentation companion device 2812 and/or the electronic devices 2814 in communication with the content presentation companion device 2812 match. The prompt may suggest adjusting the position of the blade assembly of the electronic device such that the aspect ratio of the front-facing portion of the flexible display and the aspect ratio 2815 of the content presentation companion device 2812 and/or the electronic devices 2814 in communication with the content presentation companion device 2812 match.

Where there is a mismatch in the aspect ratio of the electronic device and the aspect ratio 2815 of the content presentation companion device 2812 and/or the electronic devices 2814 in communication with the content presentation companion device 2812, decision 2806 determines whether an automatic adjustment mode of the blade assembly is enabled. Where it is, step 2807 comprises causing a translation mechanism to transition a blade assembly carrying a flexible display to slide around a device housing sufficiently to reveal a front-facing area amount of the flexible display having dimensions corresponding to the aspect ratio 2815 of the content presentation companion device 2812 and/or the electronic devices 2814 in communication with the content presentation companion device 2812.

Otherwise, step 2809 comprises presenting an option on a user interface of the electronic device asking whether the blade assembly should be transitioned to a position where a front-facing area amount of the flexible display has dimensions corresponding to the aspect ratio 2815 of the content presentation companion device 2812 and/or the electronic devices 2814 in communication with the content presentation companion device 2812. When user input in the form of blade assembly transition user input signals requesting the same is received at step 2810, the blade assembly can be so transitioned.

As noted above, optional step 2803 comprises determining whether the content presentation companion device supports a gaming mode of operation. Embodiments of the disclosure are particularly well suited for such gaming modes of operation because they allow for electronic devices in communication with the content presentation companion device 2812 to be used as controllers.

Accordingly, in one or more embodiments some of the steps of the method 2800 of FIG. 28 can be contingent on whether the content presentation companion device 2812 is in a gaming mode of operation. Illustrating by example, in one or more embodiments step 2807 comprises causing the blade assembly to transition matching the aspect ratio 2815 of the other electronic devices 2814 in communication with the content presentation companion device 2812, rather than the content presentation companion device 2812 itself, only when a gaming application is operating on the one or more processors while the content presentation companion device 2812 is in communication with the electronic device. This may be the case because it keeps the game fair to have everyone's controller device present the controller with a constant aspect ratio. When the gaming mode of operation ends, the blade assembly can optionally return to its initial position at step 2811.

In some embodiments, even the querying to determine the aspect ratio 2815 can be set to occur only in response to a gaming mode of operation operating on one or more processors of the electronic device. Recall from above that the steps of any method described herein can be performed in any order. Accordingly, step 2802 could follow step 2803 and may be contingent on the latter.

To further illustrate how the method 2800 of FIG. 28 functions, a few use cases will be described. Turning now to FIG. 29, illustrated therein are one or more method steps in accordance with one or more embodiments of the disclosure when a user is using an electronic device configured in accordance with one or more embodiments as a gaming controller while a gaming application operates on one or more processors of the electronic device.

Beginning at step 2901, an electronic device 101 is electronically in communication with the content presentation companion device 102. This electronic communication is detected at step 2902. The content presentation companion device integration manager of the electronic device 101 leverages the larger display of the content presentation companion device 102 to present content.

Step 2903 optionally detects, using a communication device of the electronic device 101, whether another electronic device having another aspect ratio has established an electrical communication channel with the content presentation companion device 102. In this particular illustration, this is not the case as the user is going to play a game solo. However, as will be described below with reference to FIG. 32, in other situations two or more players may play a game.

Step 2904 confirms that the electronic device 101 comprises a device housing, a blade assembly supporting a flexible display that is slidable around the device housing between an extended position where the blade assembly extends beyond an edge of the device housing and a retracted position where a major surface of the blade assembly abuts a major surface of the device housing without extending beyond the edge of the device housing.

Step 2905 then queries the content presentation companion device 102 for an identification of an aspect ratio of the content presentation companion device 102. In one or more embodiments. This querying occurs in response to a gaming application operating on one or more processors of the electronic device 101.

Decision 2906 determines whether the aspect ratio of the electronic device 101 and the aspect ratio of the content presentation companion device 102 match. Said differently, in one or more embodiments decision 2906 determines whether a front-facing area amount of the flexible display of the electronic device 101 has dimensions corresponding to the aspect ratio of the content presentation companion device 102, which is fixed in this example. Where it is, step 2907 can comprise the communication device of the electronic device 101 monitoring to see if other gainers used other electronic devices to establish electrical communication channels with the content presentation companion device 102.

Otherwise, step 2908 determines an amount of translation of the blade assembly required for the front-facing area amount of the flexible display of the electronic device 101 to have dimensions corresponding to the aspect ratio of the content presentation companion device 102. Step 2909 then comprises, in response to determining the aspect ratio of the content presentation companion device 102 at step 2905, translating the blade assembly of the electronic device 101 to a position where a front-facing portion of the flexible display has dimensions corresponding to the aspect ratio of the content presentation companion device 102.

Step 2910 can then comprise presenting an application user interface on the display of the electronic device 101. In this illustrative embodiment, the user is playing a game. Accordingly, at step 2911 a gaming controller 2912 is presented on the front-facing portion of the flexible display of the electronic device 101 within boundaries of the front-facing area amount available given the position of the blade assembly. The gaming controller 2912 has the same aspect ratio as does the game being presented on the display of the content presentation companion device 102. As shown, the user is wowed and amazed, as there are no blank spaces on either side of the gaming controller 2912.

Figure 32:
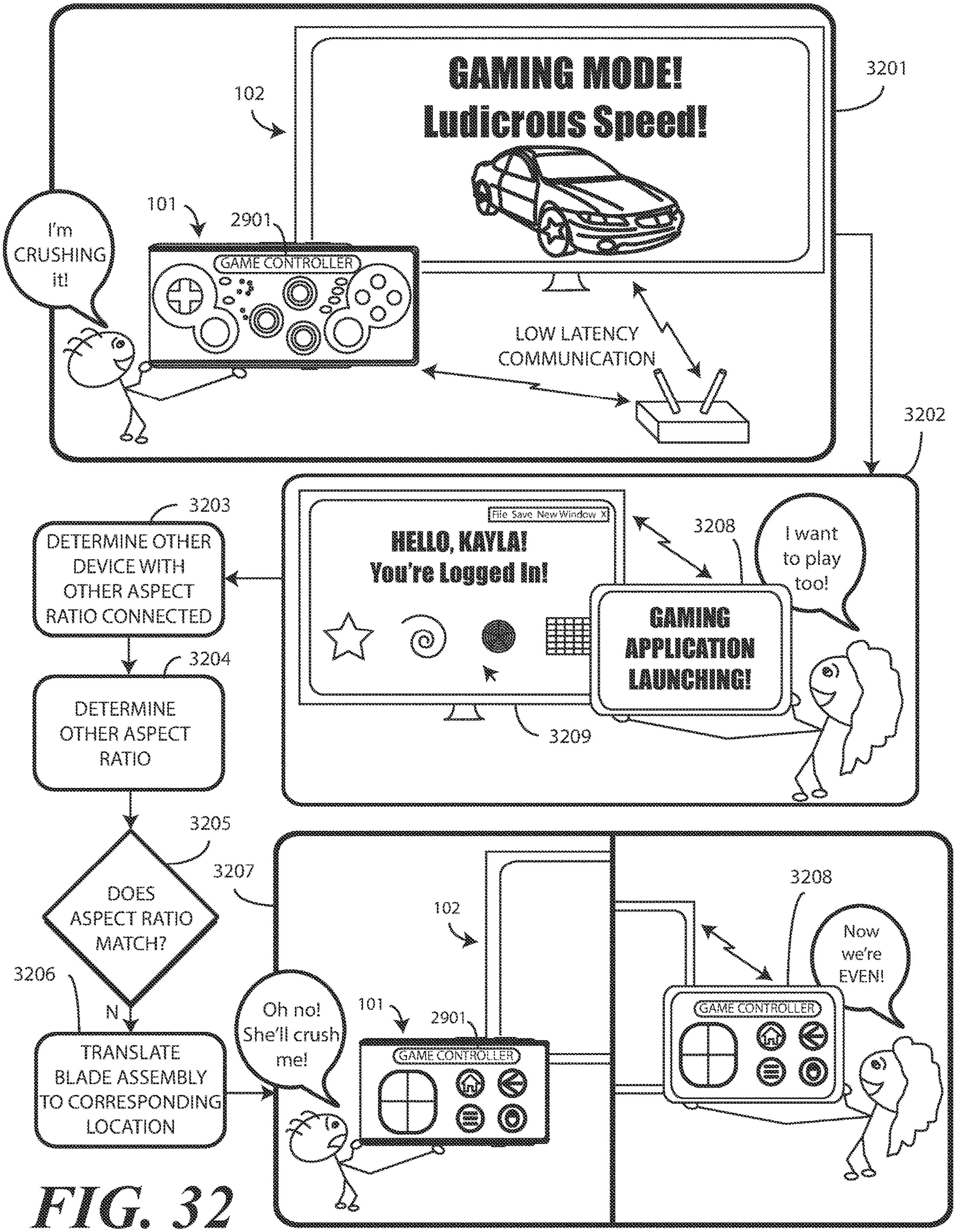
FIG. 32 illustrates still another explanatory method in accordance with one or more embodiments of the disclosure.

Turning now to FIG. 32, illustrated therein are one or more method steps that show what can happen when a second user decides to join the game. Recall from the discussion of FIG. 29 above that at step (2907) a communication device of the electronic device 101 can monitor for such activities. Well, one is about to occur in FIG. 32.

Figure 29:
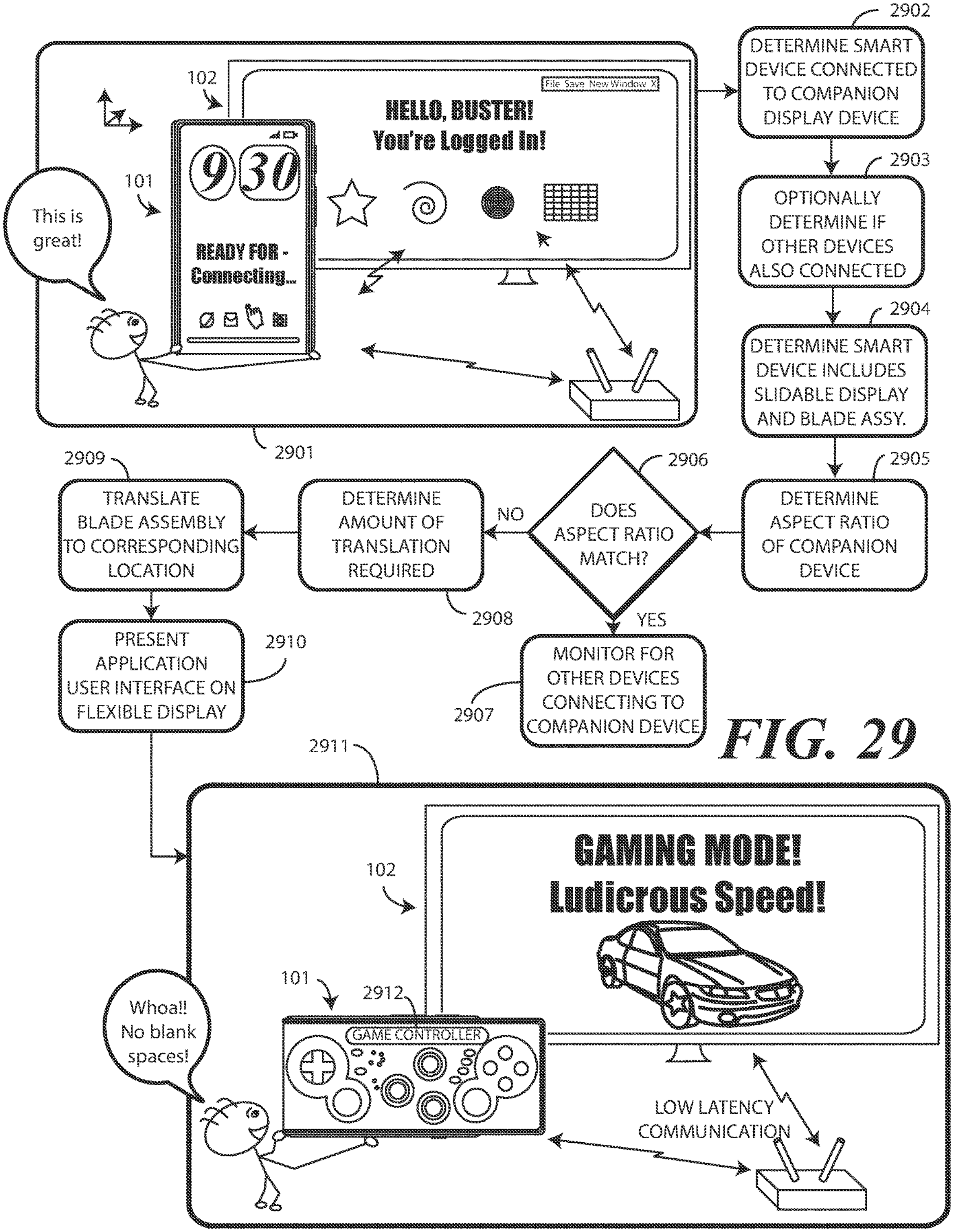
FIG. 29 illustrates another explanatory method in accordance with one or more embodiments of the disclosure.

Beginning at step 3201, our user from FIG. 29 is employing the gaming controller 2912 presented on the front-facing portion of the flexible display of electronic device 101 to play a game being presented on the content presentation companion device 102. The content presentation companion device 102 is operating in a gaming mode of operation, so the game is occurring at ludicrous speed without latency. As shown, the user is really playing well.

At step 3202, a second user wants to join the game. The second user is using her own content presentation companion device 3209 operating in a gaming mode of operation, with this content presentation companion device 3209 being in communication with content presentation companion device 102 so that both users can play the game interactively.

The electronic device 3208 that the second user is using as a controller is a candy bar device. Accordingly, its aspect ratio is fixed. Embodiments of the disclosure contemplate that the first user may be advantaged with his fancy sliding display because his gaming controller 2912 may be larger and easier to navigate given the larger aspect ratio available from the blade assembly being in the extended position at step 3201. Accordingly, in such a situation it can be more important for the aspect ratio of electronic device 101 and the aspect ratio of electronic device 3208 to match that it would be for either electronic device 101,3208 to have an aspect ratio matching the content presentation companion device 102,3209 with which it is communicating. This keeps the game nice and fair.

Accordingly, at step 3203 the content presentation companion device of electronic device 101 detects another electronic device, namely, electronic device 3208, which has another aspect ratio, establishing another electrical communication channel with the content presentation companion device 102 via content presentation companion device 3209. At step 3204, electronic device 101 determines the aspect ratio of electronic device 3208. This can be done in accordance with any of the techniques described above with reference to FIG. 28. Other techniques will be obvious to those of ordinary skill in the art having the benefit of this disclosure.

Decision 3205 comprises determining whether the aspect ratio of electronic device 101 and the other aspect ratio of electronic device 3208 match. Here, they do not because the blade assembly of electronic device 101 is in the extended position at step 3201 while the aspect ratio of electronic device 3208, which is fixed, is different from the aspect ratio of electronic device 101.

Accordingly, step 3206 comprises again causing, with the translation mechanism of electronic device 101, the blade assembly to slide around the device housing to match the aspect ratio of electronic device 3208. While initially matching that of the content presentation companion device 102, when electronic device 3208 joins the game, this allows electronic device 101 and electronic device 3208 to present gaming controllers with the same aspect ratio. If electronic device 3208 had been a sliding device, with the second user attempting to gain advantage by adjusting her blade assembly to expand the aspect ratio, the process outlined at step 3204, decision 3205, and step 3206 could repeat whenever the aspect ratio of electronic device 3208 changes.

Apparently the first user was not as good at the game as initially suspected. As shown at step 3207, once the aspect ratio of electronic device 101 is reduced to match the aspect ratio of electronic device 3208, the second user starts beating him severely at the game. While good with a large aspect ratio, when the gaming controller 2912 gets reduced at step 3207, he starts to lose and lose mightily. Alas. Better practice more with that smaller game controller, buddy!

Figure 33:
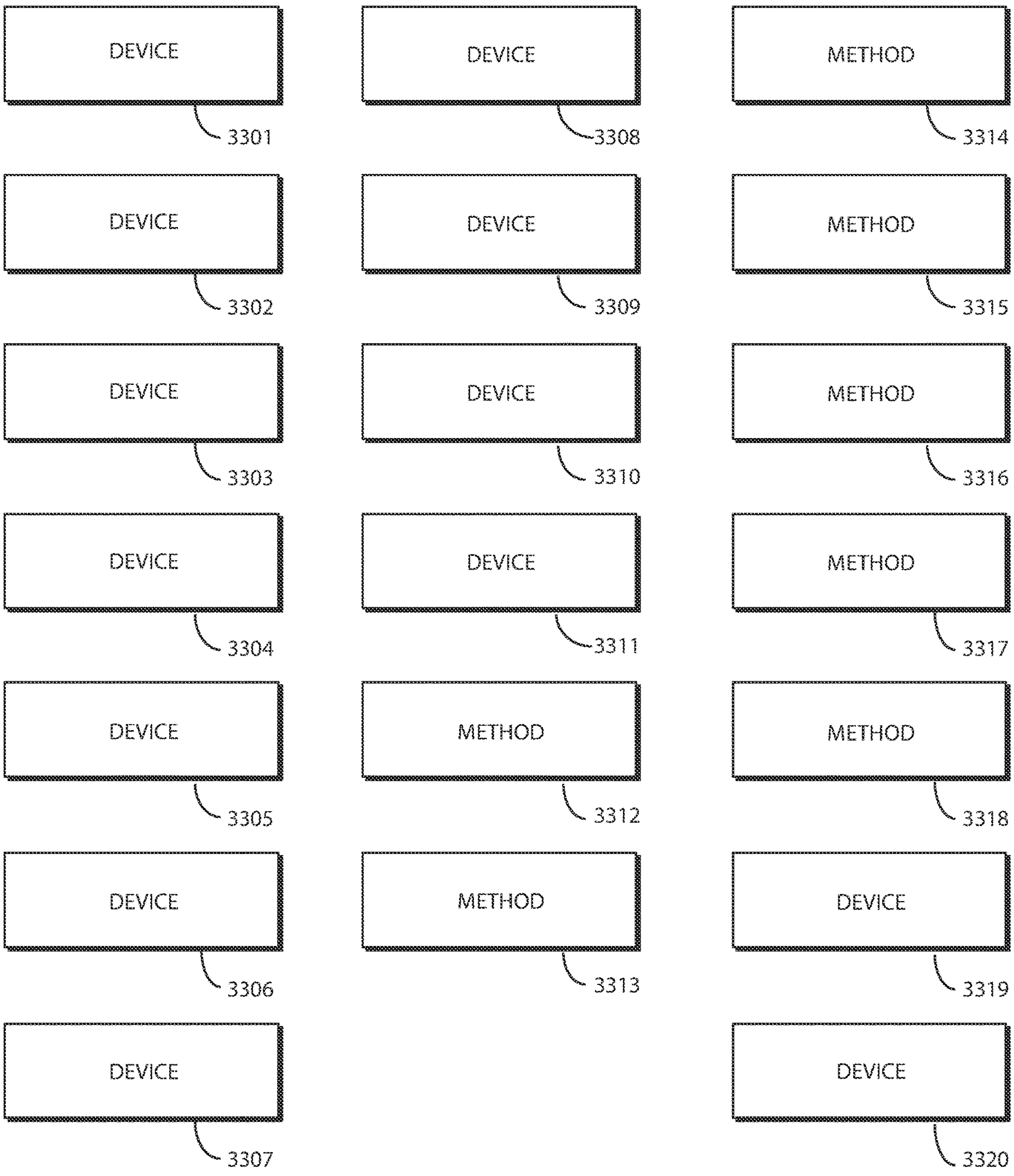
FIG. 33 illustrates various embodiments of the disclosure.

Turning now to FIG. 33, illustrated therein are various embodiments of the disclosure. The embodiments of FIG. 33 are shown as labeled boxes in FIG. 33 due to the fact that the individual components of these embodiments have been illustrated in detail in FIGS. 1-32, which precede FIG. 33. Accordingly, since these items have previously been illustrated and described, their repeated illustration is no longer essential for a proper understanding of these embodiments. Thus, the embodiments are shown as labeled boxes.

At 3301, an electronic device comprises a device housing. At 3301, the electronic device comprises a blade assembly supporting a flexible display. At 3301, the blade assembly is slidable around the device housing between an extended position where the blade assembly extends beyond an edge of the device housing and a retracted position where a major surface of the blade assembly abuts a major surface of the device housing without extending beyond the edge of the device housing.

At 3301, the electronic device comprises a communication device. At 3301, the communication device detects establishment of an electrical communication channel with a content presentation companion device. At 3301, the electronic device comprises one or more processors operable with the communication device.

At 3301, the one or more processors, in response to determining an aspect ratio of the content presentation companion device, cause the blade assembly to transition to a position where a front-facing portion of the flexible display has dimensions corresponding to the aspect ratio. At 3302, the aspect ratio of 3301 is 4:3. At 3303, the aspect ratio of 3301 is 16:9. At 3304, the aspect ratio of 3301 is 20:9. At 3305, the one or more processors of 3301 determine the aspect ratio by extracting a display size of the content presentation companion device from EDID received by the communication device from the content presentation companion device.

At 3306, the one or more processors of 3301 cause, in response to another electronic device having another aspect ratio establishing another electrical communication channel with the content presentation companion device, the blade assembly to transition to another position where the front-facing portion of the flexible display has dimensions corresponding to the other aspect ratio. At 3307, the aspect ratio of 3306 and the other aspect ratio are different.

At 3308, the content presentation companion device of 3307 is a projector. At 3309, the other aspect ratio of 3307 is fixed. At 3310, the one or more processors of 3307 cause the blade assembly to transition to the other position only when a gaming application is operating on the one or more processors while the communication device is communicating with the content presentation companion device across the electrical communication channel.

At 3311, the electronic device of 3301 further comprises a user interface. At 3311, the one or more processors cause the blade assembly to transition to the position where the front-facing portion of the flexible display has dimensions corresponding to the aspect ratio in response to causing the user interface to present a prompt requesting the blade assembly be transitioned to the position where the front-facing portion of the flexible display has dimensions corresponding to the aspect ratio and receiving blade assembly transition user input signals from the user interface in response to presentation of the prompt.

At 3312, a method in an electronic device comprises establishing, with a communication device, an electrical communication channel with a content presentation companion device. At 3312, the method comprises querying, with the communication device, the content presentation companion device for an identification of an aspect ratio of the content presentation companion device. At 3312, the method comprises causing, by a translation mechanism, a blade assembly carrying a flexible display to slide around a device housing sufficiently to reveal a front-facing area amount of the flexible display having dimensions corresponding to the aspect ratio.

At 3313, the querying of 3312 occurs in response to a gaming application operating on one or more processors of the electronic device. At 3314, the method of 3313 further comprises presenting a gaming controller on the flexible display within boundaries of the front-facing area amount.

At 3315, the method of 3314 further comprises detecting, with the communication device, another electronic device having another aspect ratio establishing another electrical communication channel with the content presentation companion device. At 3315, the method further comprises causing, with the translation mechanism, the blade assembly to slide around the device housing to reveal another front-facing area amount of the flexible display having other dimensions corresponding to the other aspect ratio.

At 3316, the method of 3315 further comprises again causing, with the translation mechanism, the blade assembly to slide around the device housing when the other aspect ratio of the other electronic device changes. At 3317, the other aspect ratio of 3315 is 20:9.

At 3318, the method of 3312 further comprises presenting, by a user interface of the electronic device, a prompt indicating that the blade assembly should slide around the device housing sufficiently to reveal the front-facing area amount. At 3318, the method comprises receiving, by the user interface in response to the prompt, user input. At 3318, the causing of the blade assembly to slide around the device housing to reveal the front-facing area amount of the flexible display having the dimensions corresponding to the aspect ratio occurs in response to the user input.

At 3319, an electronic device comprises a device housing and a blade assembly. At 3319, the blade assembly is slidable around the device housing between an extended position where the blade assembly extends beyond an edge of the device housing and a retracted position where a major surface of the blade assembly abuts a major surface of the device housing without extending beyond the edge of the device housing.

At 3319, the electronic device comprises a communication device. At 3319, the communication device detects establishment of an electrical communication channel with a content presentation companion device electrically communicating with another electronic device.

At 3319, the electronic device comprises one or more processors operable with the communication device. At 3319, the one or more processors, in response to a determining an aspect ratio of the other electronic device, cause the blade assembly to transition to a position where a front-facing portion of the flexible display has dimensions corresponding to the aspect ratio. At 3320, the content presentation companion device of 3319 comprises a projector and the aspect ratio is fixed at 20:9.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising: device housing; a blade assembly supporting a flexible display, the blade assembly slidable around the device housing between: an extended position where the blade assembly extends beyond an edge of the device housing; and a retracted position where a major surface of the blade assembly abuts a major surface of the device housing without extending beyond the edge of the device housing; a communication device, the communication device detecting establishment of an electrical communication channel with a content presentation companion device; and one or more processors operable with the communication device; the one or more processors, in response to determining an aspect ratio of the content presentation companion device, causing the blade assembly to transition to a position where a front-facing portion of the flexible display has dimensions corresponding in accordance to the aspect ratio.

2. The electronic device of claim 1, wherein the aspect ratio is 4:3.

3. The electronic device of claim 1, wherein the aspect ratio is 16:9.

4. The electronic device of claim 1, wherein the aspect ratio is 20:9.

5. The electronic device of claim 1, the one or more processors determining the aspect ratio by extracting a display size of the content presentation companion device from extended display identification data (EDID) received by the communication device from the content presentation companion device.

6. The electronic device of claim 1, wherein the one or more processors cause, in response to another electronic device having another aspect ratio establishing another electrical communication channel with the content presentation companion device, the blade assembly to transition to another position where the front-facing portion of the flexible display has dimensions corresponding to the another aspect ratio.

7. The electronic device of claim 6, wherein the aspect ratio and the another aspect ratio are different.

8. The electronic device of claim 7, wherein the content presentation companion device is a projector.

9. The electronic device of claim 7, wherein the another aspect ratio of the another electronic device is fixed.

10. The electronic device of claim 7, wherein the one or more processors cause the blade assembly to transition to the another position only when a gaming application is operating on the one or more processors while the communication device is communicating with the content presentation companion device across the electrical communication channel.

11. The electronic device of claim 1, further comprising a user interface, wherein the one or more processors cause the blade assembly to transition to the position where the front-facing portion of the flexible display has dimensions corresponding to the aspect ratio in response to:

causing the user interface to present a prompt requesting the blade assembly be transitioned to the position where the front-facing portion of the flexible display has dimensions corresponding to the aspect ratio; and receiving blade assembly transition user input signals from the user interface in response to presentation of the prompt.

12. A method in an electronic device, the method comprising: establishing, with a communication device, an electrical communication channel with a content presentation companion device; querying, with the communication device, the content presentation companion device for an identification of an aspect ratio of the content presentation companion device; and causing, by a translation mechanism, a blade assembly carrying a flexible display to slide around three surfaces of a device housing sufficiently to reveal a front-facing area amount of the flexible display having dimensions in accordance to the aspect ratio.

13. The method of claim 12, wherein the querying occurs in response to a gaming application operating on one or more processors of the electronic device.

14. The method of claim 13, further comprising presenting a gaming controller on the flexible display within boundaries of the front-facing area amount.

15. The method of claim 14, further comprising:

detecting, with the communication device, another electronic device having another aspect ratio establishing another electrical communication channel with the content presentation companion device; and causing, with the translation mechanism, the blade assembly to slide around the device housing to reveal another front-facing area amount of the flexible display having other dimensions corresponding to the another aspect ratio.

16. The method of claim 15, further comprising again causing, with the translation mechanism, the blade assembly to slide around the device housing when the another aspect ratio of the another electronic device changes.

17. The method of claim 12, wherein the blade assembly slides across two major surfaces of the device housing and passes around a minor surface of the device housing situated between the two major surfaces of the device housing.

18. The method of claim 12, further comprising:

presenting, by a user interface of the electronic device, a prompt indicating that the blade assembly should slide around the device housing sufficiently to reveal the front-facing area amount; and receiving, by the user interface in response to the prompt, user input;

wherein the causing the blade assembly to slide around the device housing to reveal the front-facing area amount of the flexible display having the dimensions corresponding to the aspect ratio occurs in response to the user input.

19. An electronic device, comprising: a device housing; a blade assembly supporting a flexible display, the blade assembly slidable around the device housing between an extended position where the blade assembly extends beyond an edge of the device housing and a retracted position where a major surface of the blade assembly abuts a major surface of the device housing without extending beyond the edge of the device housing; a communication device, the communication device detecting establishment of an electrical communication channel with a content presentation companion device electrically communicating with another electronic device; and one or more processors operable with the communication device; the one or more processors, in response to a determining an aspect ratio of the another electronic device, causing the blade assembly to transition to a position where a front-facing portion of the flexible display has dimensions in accordance to the aspect ratio.

20. The electronic device of claim 19, wherein the content presentation companion device comprises a projector and the aspect ratio is fixed at 20:9.

* * * * *